(12) United States Patent
Ito et al.

(10) Patent No.: US 10,311,553 B2
(45) Date of Patent: Jun. 4, 2019

(54) IMAGE-PROCESSING DEVICE

(71) Applicant: OLYMPUS CORPORATION, Hachioji-shi, Tokyo (JP)

(72) Inventors: Dai Ito, Tokyo (JP); Tatsuki Tadenuma, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 99 days.

(21) Appl. No.: 15/689,150

(22) Filed: Aug. 29, 2017

(65) Prior Publication Data
US 2017/0358060 A1    Dec. 14, 2017

Related U.S. Application Data

(63) Continuation of application No. PCT/JP2015/056322, filed on Mar. 4, 2015.

(51) Int. Cl.
*G06T 5/00* (2006.01)
*G06T 7/60* (2017.01)
(Continued)

(52) U.S. Cl.
CPC ............. *G06T 5/002* (2013.01); *G06F 9/50* (2013.01); *G06T 5/003* (2013.01); *G06T 7/11* (2017.01);
(Continued)

(58) Field of Classification Search
CPC . G06T 5/002; G06T 7/187; G06T 7/11; G06T 7/13; G06T 5/003; G06T 7/60; G06F 9/50
See application file for complete search history.

(56) References Cited

U.S. PATENT DOCUMENTS

| | | | | | |
|---|---|---|---|---|---|
| 4,972,495 | A | * | 11/1990 | Blike | ................. G06T 5/20 |
| | | | | | 382/199 |
| 5,590,063 | A | * | 12/1996 | Golio | ................. G06Q 10/04 |
| | | | | | 702/119 |

(Continued)

FOREIGN PATENT DOCUMENTS

| JP | 9-16805 A | 1/1997 |
|---|---|---|
| JP | 2002-251610 A | 9/2002 |

(Continued)

OTHER PUBLICATIONS

Hai-fang Zhou et al, "An Improved Parallel Watershed Algorithm for Distributed Memory System", 2007, IEEE Transactions on Parallel and Distributed Systems, vol. 18, No. 1, pp. 44-56 (Year: 2007).*

(Continued)

*Primary Examiner* — David F Dunphy
(74) *Attorney, Agent, or Firm* — Westerman, Hattori, Daniels & Adrian, LLP

(57) ABSTRACT

An image-processing device includes: a gradient data generation unit which sequentially targets pixels, and on the basis of a luminance value, generates gradient data in which each pixel is represented using a first label of a value indicating a direction toward a pixel having a higher luminance value or a second label of a value indicating that the luminance value of the pixel is higher than all pixels located around the pixel; a plurality of region label generation units which set each pixel represented by the second label as a peak pixel, divide regions into regions including pixels belonging to the same peak pixel on the basis of peak coordinates indicating the positions of peak pixels, and generate region label data; and a peak pixel distribution unit which distributes each peak pixel to each of the region label (Continued)

generation units such that loads of computations are approximately equalized.

13 Claims, 30 Drawing Sheets

(51) Int. Cl.
*G06T 7/13* (2017.01)
*G06F 9/50* (2006.01)
*G06T 7/11* (2017.01)
*G06T 7/187* (2017.01)

(52) U.S. Cl.
CPC ............... *G06T 7/13* (2017.01); *G06T 7/187* (2017.01); *G06T 7/60* (2013.01); *G06T 2207/20156* (2013.01); *G06T 2207/20192* (2013.01)

(56) References Cited

U.S. PATENT DOCUMENTS

| | | | | |
|---|---|---|---|---|
| 8,040,351 | B1* | 10/2011 | Diard | G06T 15/005 345/426 |
| 9,626,576 | B2* | 4/2017 | Grujic | G06K 9/00986 |
| 2008/0056610 | A1 | 3/2008 | Kanda | |
| 2010/0169576 | A1* | 7/2010 | Chen | G06F 12/0897 711/122 |
| 2010/0192148 | A1* | 7/2010 | Chen | G06F 16/278 718/1 |
| 2013/0156314 | A1* | 6/2013 | Pham | G06T 7/155 382/173 |
| 2016/0239956 | A1* | 8/2016 | Kang | G06T 17/005 |

FOREIGN PATENT DOCUMENTS

| | | |
|---|---|---|
| JP | 2011-8382 A | 1/2011 |
| WO | 2006/080239 A1 | 8/2006 |

OTHER PUBLICATIONS

Lindner et al, "Optimal parallel watershed algorithm based on image integration and sequential scannings", 1997, Proc. SPIE 3166, Parallel and Distributed Methods for Image Processing, 13 pages (Year: 1997).*

Galilée et al, "Parallel Asynchronous Watershed Algorithm-Architecture", 2002, Proceedings of the Fifth International Conference on Algorithms and Architectures for Parallel Processing (ICA3PP'02), 4 pages (Year: 2002).*

International Search Report dated May 19, 2015, issued in counterpart of International Application No. PCT/JP2015/056322 (1 page).

* cited by examiner

FIG. 1A
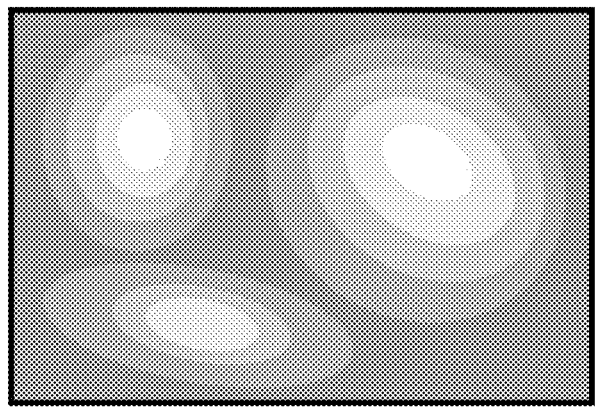
FIG. 1B
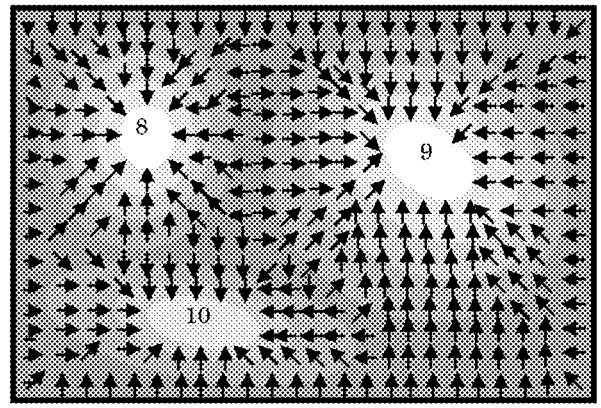
FIG. 1C

FIG. 3A

| 99 | 81 | 63 |
|----|----|----|
| 72 | (54) | 36 |
| 44 | 28 | 18 |

GRADIENT DIRECTION : ↖
GRADIENT LABEL     : 0

FIG. 3B

| 81 | 99 | 63 |
|----|----|----|
| 72 | (54) | 36 |
| 44 | 28 | 18 |

GRADIENT DIRECTION : ↑
GRADIENT LABEL     : 1

FIG. 3C

| 63 | 81 | 99 |
|----|----|----|
| 72 | (54) | 36 |
| 44 | 28 | 18 |

GRADIENT DIRECTION : ↗
GRADIENT LABEL     : 2

FIG. 3D

|    |    |    |
|----|----|----|
| 72 | 81 | 63 |
| 99 | (54)| 36 |
| 44 | 28 | 18 |

GRADIENT DIRECTION : ←
GRADIENT LABEL : 3

FIG. 3E

|    |    |    |
|----|----|----|
| 63 | 81 | 72 |
| 36 | (54)| 99 |
| 18 | 28 | 44 |

GRADIENT DIRECTION : →
GRADIENT LABEL : 4

FIG. 3F

|    |    |    |
|----|----|----|
| 44 | 28 | 18 |
| 72 | (54)| 36 |
| 99 | 81 | 63 |

GRADIENT DIRECTION : ↗
GRADIENT LABEL : 5

FIG. 3G

| 44 | 28 | 18 |
|----|----|----|
| 72 | (54) | 36 |
| 81 | 99 | 63 |

GRADIENT DIRECTION : ↓
GRADIENT LABEL : 6

FIG. 3H

| 44 | 28 | 18 |
|----|----|----|
| 72 | (54) | 36 |
| 63 | 81 | 99 |

GRADIENT DIRECTION : ↘
GRADIENT LABEL : 7

FIG. 3I

| 63 | 81 | 72 |
|----|----|----|
| 36 | (99) | 54 |
| 18 | 28 | 44 |

GRADIENT DIRECTION : ·
PEAK LABEL : 8~

DISTRIBUTION SIGNAL  0  1  2  2  1  0

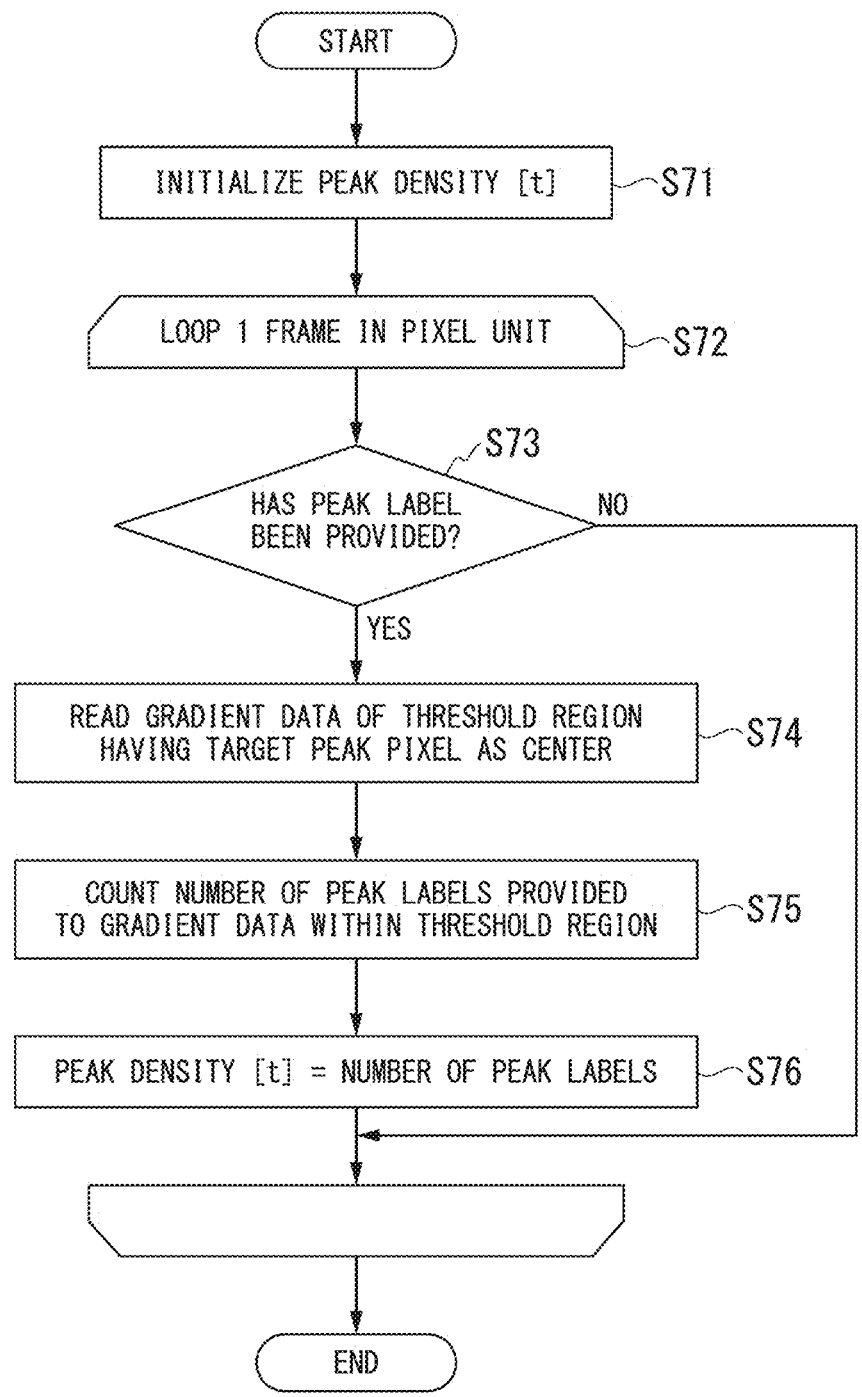

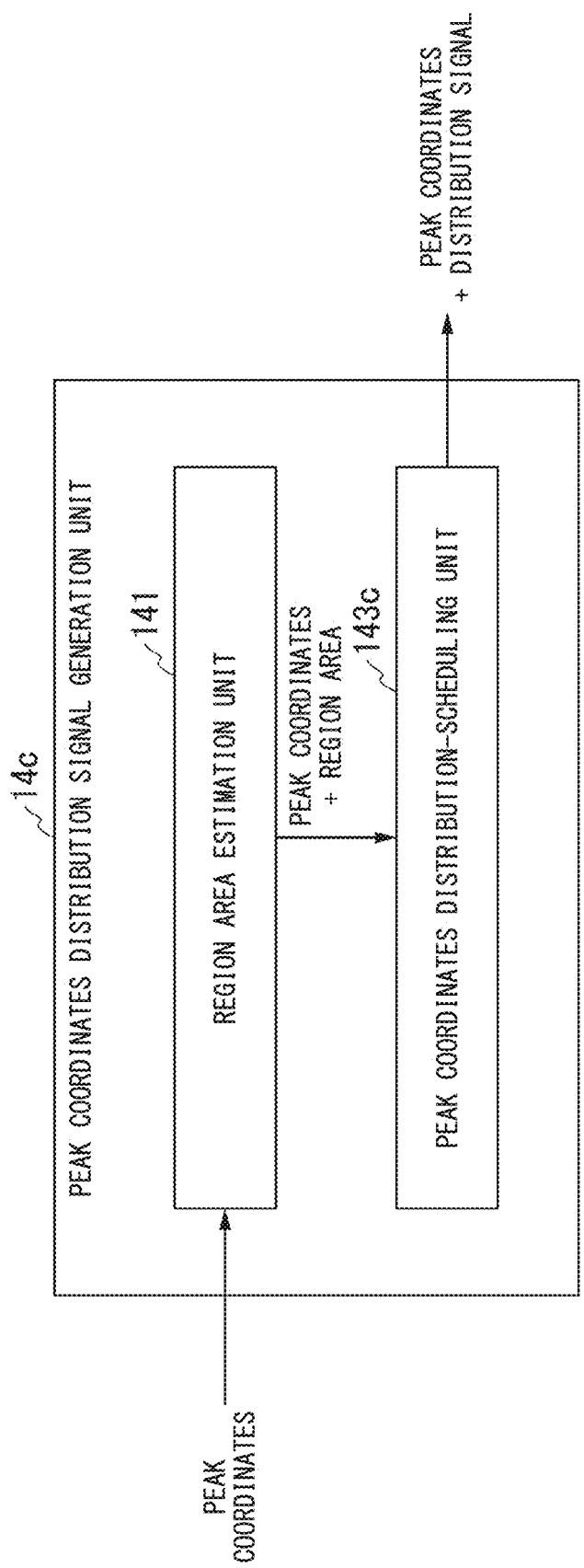

IMAGE-PROCESSING DEVICE

The present invention relates to an image-processing device. This application is a continuation application based on a PCT International Application No. PCT/JP2015/056322. The content of the PCT International Application is incorporated herein by reference.

FIELD OF THE INVENTION

Description of Related Art

In conventional image processing, the processing time depends on the amount of data. Accordingly, a method of distributing data such that the loads of computations performed by a plurality of computation resources included in an image-processing device are equalized and the total processing time is reduced by performing computations with the computation resources in parallel has been proposed.

For example, Japanese Patent Publication No. 1997-016805 discloses a technology of a three-dimensional image generation apparatus which can operate each computation resource without making each computation resource idle by dividing voxels constituting volume data so that the number of surface voxels positioned on a surface viewed from a projection plate side are approximately the same when a display target is projected.

In addition, a process called an area division process is known which divides image data into a plurality of areas on the basis of data such as luminance values in the image-processing field. This area division process is applied in various fields, such as cell analysis.

SUMMARY OF THE INVENTION

An image-processing device of a first aspect of the present invention includes: a gradient data generation unit which sequentially targets pixels included in an input image, and on the basis of a luminance value of a target pixel and luminance values of other surrounding pixels located around the target pixel, generates gradient data in which a pixel included in the image is represented using a first label which is a value indicating a direction toward one of the surrounding pixels having a higher luminance value than the target pixel or a second label which is a value indicating that the luminance value of the target pixel is higher than all surrounding pixels located around the target pixel; a plurality of region label generation units which set pixels represented by the second label as peak pixels, divide regions within the image into regions including pixels belonging to the same peak pixel on the basis of peak coordinates indicating the positions of the peak pixels, and generate region label data in which pixels included in a divided region are represented by a third label which is a value indicating that the pixels belong to the same peak pixel; and a peak pixel distribution unit which distributes the peak pixels which are a target on which computation will be executed to each of the region label generation units such that loads of computations performed by the region label generation units to divide regions within the image into regions including the pixels belonging to the same peak pixel are approximately equalized.

According to a second aspect of the present invention, in the image-processing device of the first aspect, the peak pixel distribution unit may include: a region area estimation unit which estimates region area representing the sizes of regions of pixels belonging to a peak pixel set as a center on the basis of the number of other peak pixels located in a region within a predetermined range from the peak pixel set as a center for each of the peak pixels when the peak pixels are set as centers; a peak coordinates distribution-scheduling unit which allocates the peak pixels to the region label generation units on the basis of the region areas such that differences in the region areas corresponding to the peak pixels which are pixels on which computation will be executed are minimized, and provides distribution signals indicating the allocated region label generation units to the peak coordinates corresponding to the peak pixels; and a peak coordinates distribution unit which outputs the peak coordinates to the region label generation units indicated by the distribution signals on the basis of the distribution signals provided for the peak coordinates.

According to a third aspect of the present invention, in the image-processing device of the second aspect, the region area estimation unit may calculate, on the basis of the peak coordinates of the peak pixel set as a center and the peak coordinates of another peak pixel, a distance between the two peak pixels, count the number of other peak pixels located in a region within a range of a predetermined distance from the position of the peak pixel set as a center on the basis of the calculated distance between the two peak pixels, and estimate the region area corresponding to each of the peak pixels using a reciprocal of the counted number of other peak devices.

According to a fourth aspect of the present invention, in the image-processing device of the second or third aspect, the region area estimation unit may estimate, on the basis of the number of other peak pixels located in the region within the predetermined range from the peak pixel set as the center and the number of the peak pixels represented by threshold values of a plurality of predetermined region areas, the region area corresponding to each of the peak pixels as any one of the threshold values of the plurality of predetermined region areas.

According to a fifth aspect of the present invention, in the image-processing device of any one of the second to fourth aspects, the peak coordinates distribution-scheduling unit may allocate the peak pixels to the region label generation units in a predetermined order.

According to a sixth aspect of the present invention, in the image-processing device of the fifth aspect, the peak coordinates distribution-scheduling unit may include a sorting unit which rearranges the peak pixels in a predetermined order on the basis of the corresponding region areas, and the sorting unit allocates the peak pixels rearranged by the sorting unit to the region label generation units.

According to a seventh aspect of the present invention, in the image-processing device of the fourth aspect, the region area estimation unit may rearrange the peak pixels of which the corresponding region areas are estimated in a predetermined order when the region areas corresponding to the peak pixel are estimated, and the peak coordinates distribution-scheduling unit may allocate the rearranged peak pixels to the region label generation units in a predetermined order.

According to an eighth aspect of the present invention, in the image-processing device of any one of the fifth to seventh aspects, the peak coordinates distribution-scheduling unit may allocate the peak pixels to the region label generation units such that the order of the plurality of region label generation units alternately repeats an ascending order and a descending order.

According to a ninth aspect of the present invention, in the image-processing device of any one of the fifth to eighth aspects, the peak coordinates distribution-scheduling unit may divide a difference between a largest total sum of the region areas and a smallest total sum of the region areas among total sums of the region areas allocated to the region label generation units by the number of the region label generation units, and reallocate the peak pixels corresponding to the region areas of the division result to the region label generation units other than the region label generation unit having the largest total sum of the region areas.

According to a tenth aspect of the present invention, in the image-processing device of any one of the second to fourth aspects, the peak coordinates distribution-scheduling unit may sequentially allocate the peak pixels to the region label generation units to which the peak pixels have not been allocated, and when there are no region label generation units to which the peak pixels have not been allocated, sequentially allocate the peak pixels to the region label generation unit having the smallest total sum of the allocated region areas.

According to an eleventh aspect of the present invention, in the image-processing device of any one of the first to tenth aspects, each of the region label generation units may include: a gradient data acquisition unit which sets the peak pixel corresponding to the peak coordinates as a center and acquires the gradient data representing each of the pixels located around the peak pixel; and a gradient determination unit which determines whether the value of the first label representing each of the pixels included in the acquired gradient data is a value indicating a direction toward the peak pixel, and generate the region label data in which the pixels represented using the first label which is the value indicting a direction toward the peak pixel are expressed using the third label which is the same value as the second label representing the peak pixel.

According to a twelfth aspect of the present invention, in the image-processing device of the eleventh aspect, the gradient data acquisition unit may sequentially set each of the pixels determined to correspond to the first label which is the value indicating a direction toward the peak pixel by the gradient determination unit as a center, and further acquire the gradient data representing each of the pixels located around the pixel set as a center, and the gradient determination unit may sequentially determine whether the value of the first label representing each of the pixels included in the further acquired gradient data is a value indication a direction toward the peak pixel set as a center, and sequentially generate the region label data in which the pixels represented by the first label of the value indicating a direction toward the pixel set as a center are expressed by the third label of the same value as the third label representing the pixel set as a center.

According to a thirteenth aspect of the present invention, in the image-processing device of the twelfth aspect, the gradient data acquisition unit may acquire the gradient data representing each of the pixels such that the region of each of the pixels sequentially set as centers is sequentially extended from the position of the peak coordinates corresponding to the peak pixel to the other pixels, and the gradient determination unit may generate the region label data in which the region represented using the third label of the same value as the second label representing the peak pixel is sequentially extended from the position of the peak coordinates corresponding to the peak pixel to the outer pixels.

BRIEF DESCRIPTION OF THE DRAWINGS

FIG. 1A is a diagram describing the concept of an area division process in an image-processing device of a first embodiment of the present invention.

FIG. 1B is a diagram describing the concept of the area division process in the image-processing device of the first embodiment of the present invention.

FIG. 1C is a diagram describing the concept of the area division process in the image-processing device of the first embodiment of the present invention.

FIG. 3A is a diagram describing an example of a gradient label provided for a pixel on which a process is performed in the image-processing device of the first embodiment of the present invention.

FIG. 3B is a diagram describing an example of a gradient label provided for a pixel on which a process is performed in the image-processing device of the first embodiment of the present invention.

FIG. 3C is a diagram describing an example of a gradient label provided for a pixel on which a process is performed in the image-processing device of the first embodiment of the present invention.

FIG. 3D is a diagram describing an example of a gradient label provided for a pixel on which a process is performed in the image-processing device of the first embodiment of the present invention.

FIG. 3E is a diagram describing an example of a gradient label provided for a pixel on which a process is performed in the image-processing device of the first embodiment of the present invention.

FIG. 3F is a diagram describing an example of a gradient label provided for a pixel on which a process is performed in the image-processing device of the first embodiment of the present invention.

FIG. 3G is a diagram describing an example of a gradient label provided for a pixel on which a process is performed in the image-processing device of the first embodiment of the present invention.

FIG. 3H is a diagram describing an example of a gradient label provided for a pixel on which a process is performed in the image-processing device of the first embodiment of the present invention.

FIG. 3I is a diagram describing an example of a peak label provided for a pixel on which a process is performed in the image-processing device of the first embodiment of the present invention.

FIG. 21 is a flowchart illustrating a processing procedure in the region area estimation unit included in the image-processing device of the second embodiment of the present invention.

FIG. 22 is a block diagram illustrating a configuration of a peak coordinates distribution signal generation unit included in an image-processing device of a third embodiment of the present invention.

DETAILED DESCRIPTION OF THE INVENTION

First Embodiment

Figure 2:
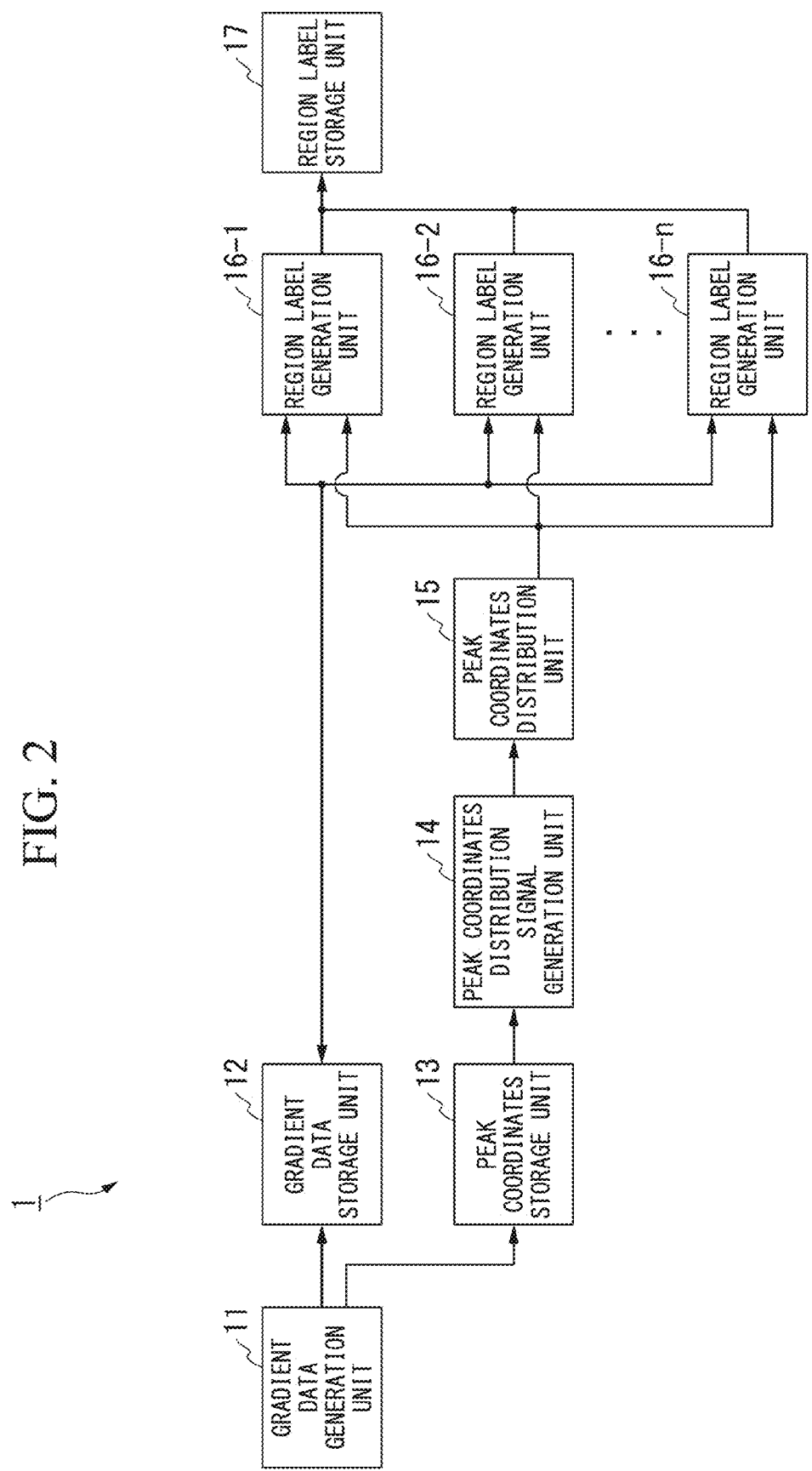
FIG. 2 is a block diagram illustrating an example of a schematic configuration of the image-processing device in the first embodiment of the present invention.

Embodiments of the present invention will be described below with reference to the attached drawing. For example, an image-processing device (referred to as "image-processing device 1" hereinafter) of a first embodiment divides a region of an image (referred to as "luminance image" hereinafter) which includes only a luminance value as a value of each pixel, such as a grayscale image, into a plurality of regions and performs computations of a region division process in parallel using a plurality of computation resources.

Initially, the concept of the region division process performed by the image-processing device 1 of the first embodiment will be described. FIGS. 1A to 1C are diagrams describing the concept of the region division process performed by the image-processing device 1 of the first embodiment of the present invention. FIG. 1A illustrates an example of a luminance image which is a region division process target in the image-processing device 1. The luminance image illustrated in FIG. 1A is a grayscale image having three pixels (referred to as "peak pixels" hereinafter) having higher luminance values among surrounding pixels.

When the luminance image as illustrated in FIG. 1A is input, first, the image-processing device 1 generates gradient data in which each pixel included in the luminance image is represented using a value (referred to as "gradient label" hereinafter) indicating a gradient toward a peak pixel. Here, "gradient" indicates a direction toward a pixel having a higher luminance value among pixels located in the surroundings of a certain pixel when the certain pixel is targeted. FIG. 1B illustrates an example of gradient data generated by the image-processing device 1. As illustrated in FIG. 1B, the gradient data is data in which a gradient label directed toward a peak pixel is provided to each of pixels (referred to as "surrounding pixels" hereinafter) located in the surroundings of each peak pixel. Although gradient data is data in which each pixel is represented using a value which is a gradient label, the gradient data is illustrated in FIG. 1B in such a manner that gradient labels schematically indicating gradients using arrows are superposed on the luminance image shown in FIG. 1A for easy understanding. Further, pixels located at positions indicated by "8," "9" and "10" in FIG. 1B are peak pixels. In this manner, with respect to peak pixels, values referred to as "peak labels" hereinafter) indicating peaks are represented in gradient data, instead of gradient labels. In the gradient data illustrated in FIG. 1B, each of "8," "9" and "10" is a peak label.

Subsequently, the image-processing device 1 performs a region division process for dividing the region within the luminance image into regions each including pixels belonging to the same peak pixel on the basis of gradient labels and peak labels included in the gradient data. In the region division process, the image-processing device 1 performs computations for providing, to each of surrounding pixels belonging to the same peak pixel, a value (referred to as "region label" hereinafter) indicating that the corresponding pixels are pixels belonging to the same region in parallel using a plurality of computation resources. FIG. 1C illustrates an example of region label data which is a result of computations for providing region labels performed by the image-processing device 1. As illustrated in FIG. 1C, the region label data is data in which each of surrounding pixels belonging to the same peak pixel has been provided with the same value as the peak label provided to the peak pixel as a region label. FIG. 1C illustrates the region label data in such a manner that region labels are superposed on the luminance image illustrated in FIG. 1A for easy understanding.

In this manner, the image-processing device 1 performs the region division process for providing the same region label to surrounding pixels belonging to the same peak pixel in parallel through a plurality of computation resources.

Next, the configuration of the image-processing device 1 will be described. FIG. 2 is a block diagram illustrating an example of a schematic configuration of the image-processing device 1 in the first embodiment of the present invention. The image-processing device 1 illustrated in FIG. 2 includes a gradient data generation unit 11, a gradient data storage unit 12, a peak coordinates storage unit 13, a peak coordinates distribution signal generation unit 14, a peak coordinates distribution unit 15, n region label generation units 16-1 to 16-n, and a region label storage unit 17.

The gradient data generation unit 11 generates gradient data corresponding to an input luminance image and outputs the generated gradient data to the gradient data storage unit 12. More specifically, the gradient data generation unit 11 determines whether each pixel included in the luminance image is a peak pixel or a surrounding pixel and generates gradient data by providing a peak label to a peak pixel and providing a gradient label to a surrounding pixel. Then, the gradient data generation unit 11 outputs the generated gradient data to the gradient data storage unit 12. In addition, the gradient data generation unit 11 outputs coordinates (referred to as "peak coordinates" hereinafter) indicating the positions of peak pixels included in the generated gradient data to the peak coordinates storage unit 13.

The gradient data storage unit 12 stores the gradient data output from the gradient data generation unit 11.

The peak coordinates storage unit 13 stores the peak coordinates output from the gradient data generation unit 11.

The peak coordinates distribution signal generation unit 14 distributes computations for providing a region label to surrounding pixels belonging to the same peak pixel in the luminance image to each of computation resources included in the image-processing device 1 on the basis of the peak coordinates stored in the peak coordinates storage unit 13. In addition, the peak coordinates distribution signal generation unit 14 outputs information about the distribution of computations to the computation resources to the peak coordinates distribution unit 15. More specifically, the peak coordinates distribution signal generation unit 14 simply estimates the size of a region of surrounding pixel belonging to each peak pixel, that is, the area of each region on the basis of the peak coordinates read from the peak coordinates storage unit 13. In addition, the peak coordinates distribution signal generation unit 14 allocates a computation resource which performs a computation for each peak pixel on the basis of the estimated area of the region. Further, the peak coordinate distribution signal generation unit 14 provides a distribution signal indicating the allocated computation resource to each set of peak coordinates and outputs the distribution signal to the peak coordinates distribution unit 15.

The peak coordinates distribution unit 15 distributes (apportions) each of input peak coordinates to a corresponding computation resource on the basis of distribution signals provided to peak coordinates input from the peak coordinates distribution signal generation unit 14.

Each of the region label generation units 16-1 to 16-n is a computation resource included in the image-processing device 1, which performs the computation for providing a region label to surrounding pixels belonging to the same peak pixel in the luminance image. Each of the region label generation units 16-1 to 16-n provides a region label having the same value as a peak label provided to a peak pixel to each of surrounding pixels belonging to the peak pixel located at peak coordinates input from the peak coordinates distribution unit 15. Here, each of the region label generation units 16-1 to 16-n computes a region of surrounding pixels belonging to the same peak pixel on the basis of the gradient data stored in the gradient data storage unit 12. In addition, each of the region label generation units 16-1 to 16-n outputs the region label provided to the surrounding pixels belonging to the same peak pixel to the region label storage unit 17. When the region label generation units 1601 to 16-n are represented without being distinguished in the following description, the region label generation units 16-1 to 16-n will be represented as "region label generation unit 16."

The region label storage unit 17 stores the region label output from each of the region label generation units 16-1 to 16-n. Accordingly, the region label data as illustrated in FIG. 1C is stored in the region label storage unit 17.

In this configuration, the image-processing device 1 performs the region division process for generating region label data by proving a region label identical to the peak label to surrounding pixels belonging to the same peak pixel in parallel using a plurality of computation resources.

Next, each component included in the image-processing device 1 will be described. First, the gradient data generation unit 11 will be described. The gradient data generation unit 11 determines whether a pixel is a peak pixel or a surrounding pixel from the pixel located at the top left of an input luminance image in the raster order. In the following description, a current pixel on which determination of whether a pixel is a peak pixel or a surrounding pixel is performed is called "target pixel." In addition, the gradient data generation unit 11 provides a peak label or a gradient label for each target pixel depending on a result of determination of whether a target pixel is a peak pixel or a surrounding pixel. Here, the value of the peak label or the gradient label provided to each target pixel by the gradient data generation unit 11 is predetermined on the basis of a relationship between a luminance value of the target pixel and luminance values of pixels (referred to as "surrounding pixels" hereinafter) located in the surroundings of the target pixel.

FIGS. 3A to 3I are diagrams describing examples of peak labels or gradient labels provided to pixels (target pixels) on which a process is performed in the image-processing device 1 of the first embodiment of the present invention. Each of FIGS. 3A to 3I illustrates an example of a value of a peak label or a gradient label provided to a target pixel by the gradient data generation unit 11 on the basis of a relationship between a luminance value of the target pixel encircled by a circle and luminance values of eight surrounding pixels located around the target pixel. FIG. 3A to 3H illustrate examples of values of gradient labels provided by the gradient data generation unit 11 when target pixels are surrounding pixels, and FIG. 3I illustrates an example of a value of a peak label provided by the gradient data generation unit 11 when a target pixel is a peak pixel.

As described above, a gradient label indicates a direction toward a pixel having a higher luminance value among pixels located around a target pixel. Accordingly, the gradient data generation unit 11 provides, to a target pixel, a gradient label having any one of eight values as illustrated in FIGS. 3A to 3H depending on the direction in which a pixel having a higher luminance value than the target pixel is located. For example, in the example illustrated in FIG. 3A, there are four surrounding pixels having higher luminance values than a luminance value (="54") of a target pixel in eight surrounding pixels located around the target pixel. In addition, a surrounding pixel located in the left obliquely upward direction has a highest luminance value (="99") in the four surrounding pixels. In this case, the gradient data generation unit 11 determines that the gradient direction viewed from the target pixel is the left obliquely upward direction, that is, the target pixel is a surrounding pixel, and a peak pixel to which the target pixel belongs is located in the left obliquely upward direction. When the luminance value of the target pixel and the luminance values of the surrounding pixels have a relationship therebetween as illustrated in FIG. 3A, the gradient data generation unit 11 provides a gradient label having a value "0" for the target pixel.

Similarly, the gradient data generation unit 11 provides, to respective target pixels, gradient labels having values ("1" to "7") corresponding to direction in which surrounding pixels having higher luminance values are located, viewed from the target pixels. FIG. 3B illustrates an example in which the gradient data generation unit 11 determines that a peak pixel to which a target pixel belongs is located in the upward direction and provides a gradient label having a value "1" to the target pixel. In addition, FIG. 3C illustrates an example in which the gradient data generation unit 11 determines that a peak pixel to which a target pixel belongs is located in the right obliquely upward direction and provides a gradient label having a value "2" to the target pixel. Furthermore, FIG. 3D illustrates an example in which the gradient data generation unit 11 determines that a peak pixel to which a target pixel belongs is located in the left direction and provides a gradient label having a value "3" to the target pixel. In addition, FIG. 3E illustrates an example in which the gradient data generation unit 11 determines that a peak pixel to which a target pixel belongs is located in the right direction and provides a gradient label having a value "4" to the target pixel. Further FIG. 3F illustrates an example in which the gradient data generation unit 11 determines that a peak pixel to which a target pixel belongs is located in the left obliquely downward direction and provides a pixel label having a value "5" to the target pixel. Further FIG. 3G illustrates an example in which the gradient data generation unit 11 determines that a peak pixel to which a target pixel belongs is located in the downward direction and provides a gradient label having a value "6" to the target pixel. Further, FIG. 3H illustrates an example in which the gradient data generation unit 11 determines that a peak pixel to which a target pixel belongs is located in the right obliquely downward direction and provides a gradient label having a value "7" to the target pixel.

Furthermore, as described above, the peak label indicates that a target pixel is a pixel having a highest luminance value among pixels located around the target pixel. Accordingly, when a target pixel is a peak pixel, the gradient data generation unit 11 provides a peak label having a different value from a gradient label to the target pixel, as illustrated in FIG. 3I. For example, in the example of FIG. 3I, the target pixel has a higher pixel value than pixel values of eight surrounding pixels located around the target pixel. In this case, the gradient data generation unit 11 determines that the target pixel is a peak pixel having a higher luminance value than the pixels located therearound. when the luminance value of the target pixel and the luminance values of the surrounding pixels have a relationship therebetween as illustrated in FIG. 3I, the gradient data generation unit 11 provides a peak label having a value equal to or greater than "8" to the target pixel. The gradient data generation unit 11 provides peak labels which are different values to respective peak pixels. For example, a peak label having a value "9" is provided to a target pixel determined next to be a peak pixel.

Figure 4:
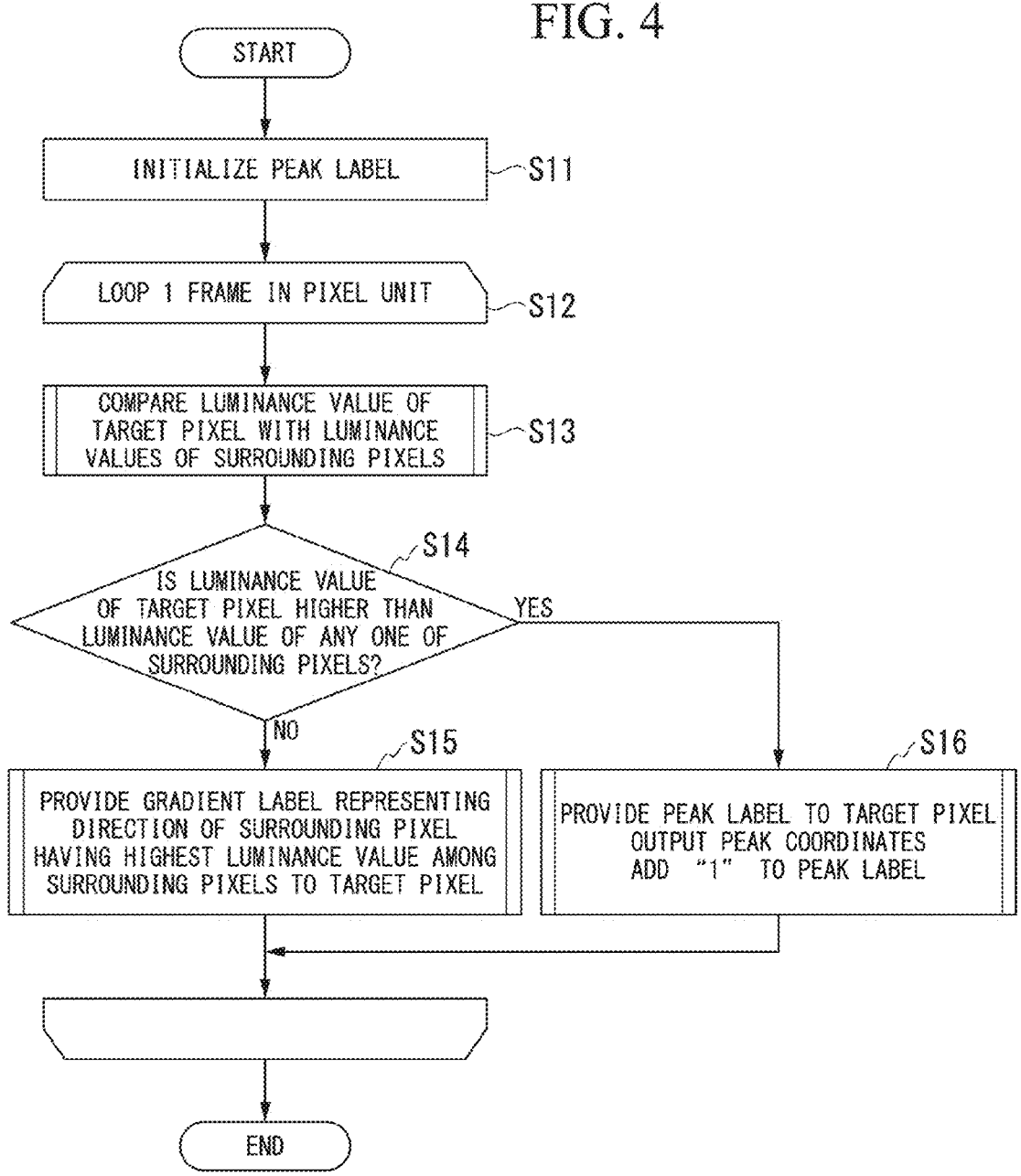
FIG. 4 is a flowchart illustrating a processing procedure in a gradient data generation unit included in the image-processing device of the first embodiment of the present invention.

FIG. 4 is a flowchart illustrating a processing procedure in the gradient data generation unit 11 included in the image-processing device 1 of the first embodiment of the present invention. When a luminance image is input and generation of gradient data is initiated, first, the gradient data generation unit 11 initializes the values of peak labels (step S11). Here, the gradient data generation unit 11 sets an initial value of the peak labels to "8" shown in FIG. 3I.

Subsequently, the gradient data generation unit 11 regards pixels from a pixel located at the top left of the input luminance image in the raster order as target pixels and performs a process of determining whether each of the target pixels is a peak pixel or a surrounding pixel for one frame of the luminance image, that is, all pixels included in the luminance image in the loop of step S12.

In the target pixel determination process in the gradient data generation unit 11, first, luminance values of target pixels and luminance values of each of surrounding pixels located around the target pixels are obtained from the luminance image, and the luminance value of a current target pixel is compared with the luminance value of each surrounding pixel (step S13).

Subsequently, the gradient data generation unit 11 determines whether the luminance value of the current target pixel is higher than the luminance value of any one of the surrounding pixels (step S14). That is, the gradient data generation unit 11 determines whether the current target pixel is a peak pixel in step S14.

When it is determined that the luminance value of the current target pixel is not higher than the luminance value of any of the surrounding pixels, that is, the current target pixel is a surrounding pixel in step S14 ("NO" in step S14), the gradient data generation unit 11 generates gradient data to which a gradient label of a value corresponding to a direction in which a surrounding pixel having a highest luminance value among surrounding pixels having higher luminance values than the current target pixel is located has been provided, and outputs the gradient data to the gradient data storage unit 12 in step S15. Then, the gradient data generation unit 11 returns to step S12 and performs the determination process on the next target pixel.

On the other hand, when it is determined that the luminance value of the current target pixel is higher than the luminance value of any one of the surrounding pixels, that is, the current target pixel is a peak pixel in step S14 ("YES" in step S14), the gradient data generation unit 11 generates gradient data in which a peak label of a current value (initially the initial value (="8")) has been provided for the current target pixel and outputs the gradient data to the gradient data storage unit 12 in S16. In addition, the gradient data generation unit 11 outputs the position of the current target pixel, that is, peak coordinates indicating the position of the peak pixel to the peak coordinates storage unit 13. Further, the gradient data generation unit 11 adds "1" to the value of the current peak label to change the value of the next peak label to a different value (initially "9" obtained by adding "1" to the initial value (="8")). Then, the gradient data generation unit 11 returns to step S12 and performs the determination process on the next target pixel.

In this manner, the gradient data generation unit 11 performs the target pixel determination process represented by the loop of step S12 on all pixels included in the luminance image, that is, one frame of the luminance image, to generate gradient data corresponding to the input luminance image. Accordingly, gradient data in which a gradient label or a peak label has been provided to each pixel is stored in the gradient data storage unit 12. In addition, each set of peak coordinates indicating the position of each peak pixel included in the gradient data stored in the gradient data storage unit 12 is stored in the peak coordinates storage unit 13.

The peak coordinates distribution signal generation unit 14 performs a process of allocating the region label generation unit 16 which performs a computation for a peak pixel corresponding to each set of peak coordinates on the basis of peak coordinates stored in the peak coordinates storage unit 13.

Figure 5:
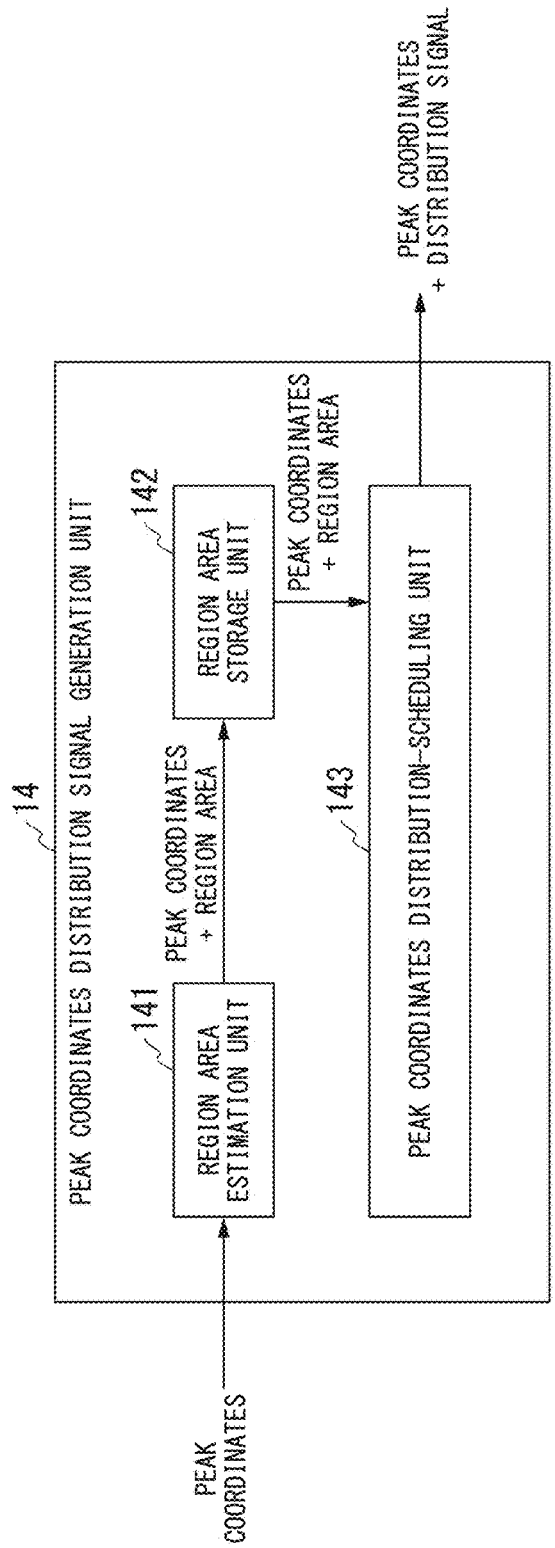
FIG. 5 is a block diagram illustrating a configuration of a peak coordinates distribution signal generation unit included in the image-processing device of the first embodiment of the present invention.

Next, the peak coordinates distribution signal generation unit 14 included in the image-processing device 1 will be described. FIG. 5 is a block diagram illustrating a configuration of the peak coordinates distribution signal generation unit 14 included in the image-processing device 1 of the first embodiment of the present invention. The peak coordinates distribution signal generation unit 14 illustrated in FIG. 5 includes a region area estimation unit 141, a region area storage unit 142, and a peak coordinates distribution-scheduling unit 143.

The region area estimation unit 141 simply estimates the size (area) of the region of surrounding pixels belonging to each pixel included in a luminance image on the basis of each set of peak coordinates stored in the peak coordinates storage unit 13. Then, the region area estimation unit 141 outputs information on the estimated area (referred to as "region area" hereinafter) of the region of the surrounding pixels belonging to each peak pixel to the region area storage unit 142.

The region area storage unit 142 stores the information on the region area output from the region area estimation unit 141.

The peak coordinate distribution-scheduling unit 143 allocates a computation for each peak pixel to each region label generation unit 16 on the basis of the information on the region area stored in the region area storage unit 42. Then, the peak coordinates distribution-scheduling unit 143 provides a distribution signal which indicates the region label generation unit 16 to which the computation has been allocated to each set of peak coordinates.

Here, each of the components included in the peak coordinates distribution signal generation unit 14 will be described. First, the region area estimation 141 will be described. For example, when pixels included in an input luminance image are determined in the raster order and computations for obtaining region areas are performed in the order of determination as peak pixels in the image-processing device 1, considerable differences are generated between computational loads of respective region label generation units 16 depending on the arrangement of respective peak pixels in the luminance image. That is, considerable differences are generated between the sizes of region areas computed by the respective region label generation units 16 and thus computational loads become unequal. Accordingly, in the image-processing device 1, first, the region area estimation 141 simply estimates a region area belonging to each peak pixel on the basis of peak coordinates stored in the peak coordinates storage unit 13. Accordingly, in the image-processing device 1, the peak coordinates distribution-scheduling unit 143 can distribute computations for respective peak pixels such that differences between the sizes of region areas on which the respective region label generation units 16 perform computations are minimized on the basis of the estimated region area. That is in the image-processing device 1, it is possible to distribute the region label generation units 16 which perform computations on respective peak pixels such that computational loads when final region areas are computed become approximately equal on the basis of the estimated region area.

Figure 6:
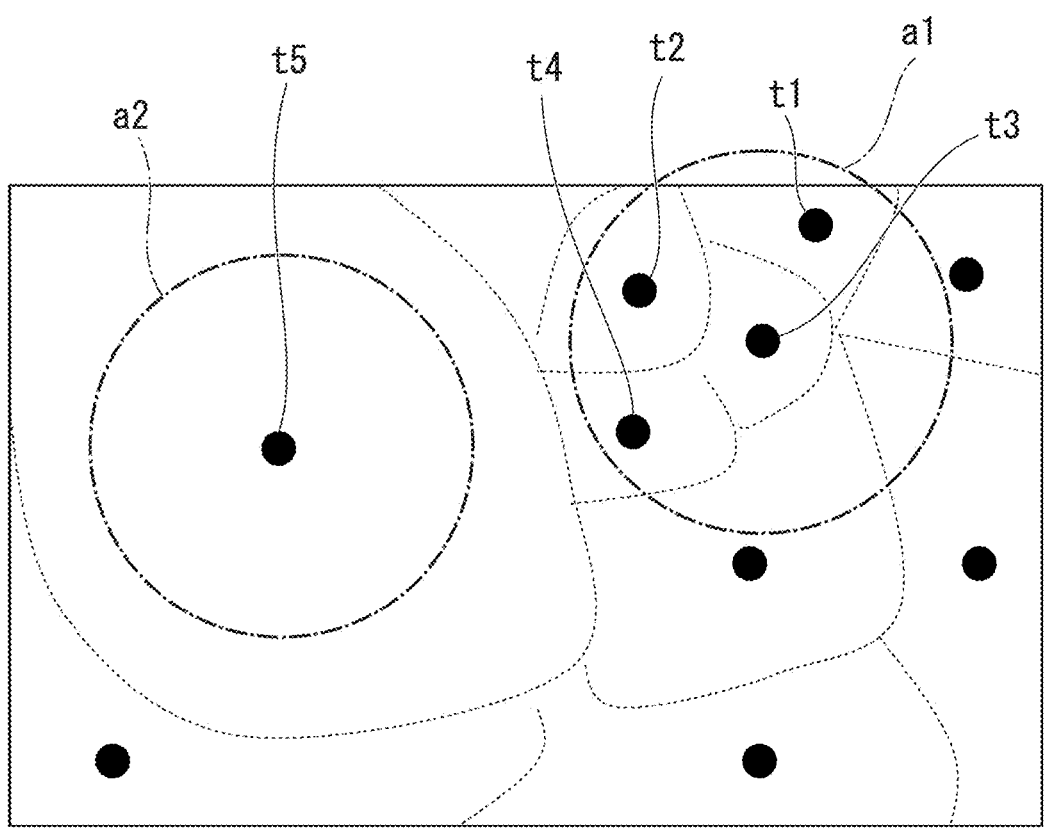
FIG. 6 is a diagram describing the concept of a region area estimation process performed in a region area estimation unit included in the image-processing device of the first embodiment of the present invention.

FIG. 6 is a diagram describing the concept of a region area estimation process performed in the region area estimation unit 141 included in the image-processing device 1 of the first embodiment of the present invention. In FIG. 6, the position of each peak pixel included in a luminance image is indicated by a black circle, and the boundary of a final region area when each region label generation unit 16 included in the image-processing device 1 performs the region division process is schematically indicated by a dotted line.

In the region area estimation process performed by the region area estimation unit 141, a region area belonging to a peak pixel is simply estimated by the number of other peak coordinates present within a threshold value which is a predetermined distance having the peak pixel as a center, that is, the density (referred to as "peak density" hereinafter) of peak pixels present within a region set using the threshold value of the predetermined distance.

In FIG. 6, the region (referred to as "threshold region" hereinafter) set using the threshold value of the predetermined distance is indicated by an alternate long and short dash line. FIG. 6 illustrates a case in which there are three other peak pixels (peak pixel t1, peak pixel t2 and peak pixel t4) within a threshold region a1 having a peak pixel t3 as a center, and there are no other peak pixels within a threshold region a2 having a peak pixel t5 as a center. This represents that the peak density of the threshold region a1 is quadruple the peak density of the threshold region a2. In this manner, the peak density, that is, the number of peak pixels present within a unit area indicated by a threshold region increases when a region area belonging to a peak pixel present in the threshold region becomes smaller and decreases when the region area becomes larger. Hence, the region area estimation unit 141 simply estimates a region area belonging to each peak pixel using a reciprocal of the peak density. For example, in the example illustrated in FIG. 6, a region area belonging to each peak pixel within the threshold region a1 is estimated to be an area equal to or less than a quarter of the threshold region, and a region area belonging to the peak pixel within the threshold region a2 is estimated to be equal to or greater than the area of the threshold region.

Figure 7:
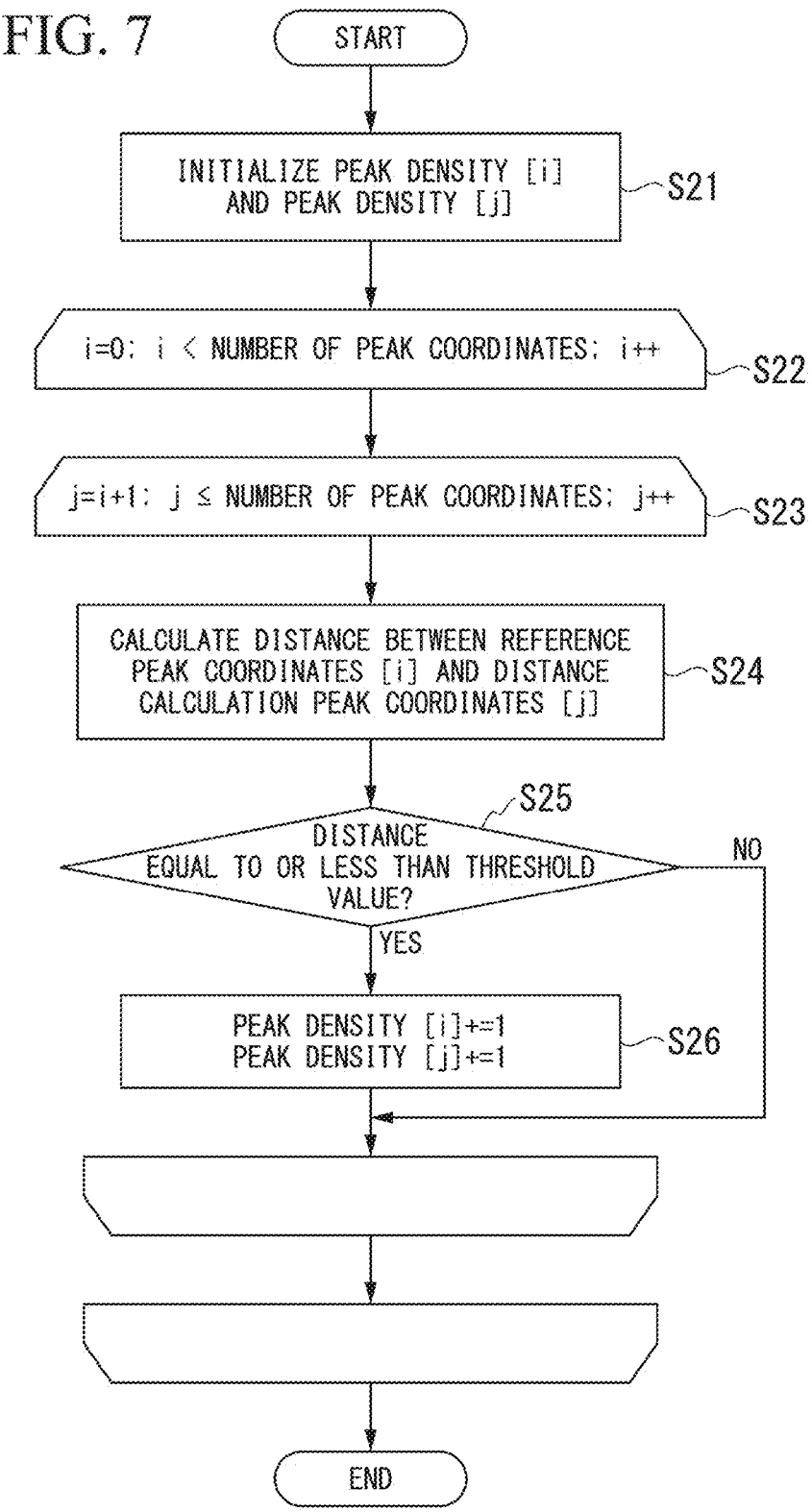
FIG. 7 is a flowchart illustrating a processing procedure in the region area estimation unit included in the image-processing device of the first embodiment of the present invention.

FIG. 7 is a flowchart illustrating a processing procedure in the region area estimation unit 141 included in the image-processing device 1 of the first embodiment of the present invention. In the region area estimation process in the region area estimation unit 141, the region area estimation unit 141 determines whether there is a peak pixel within a threshold region on the basis of a distance between two peak pixels obtained from each set of peak coordinates. More specifically, on the basis of a distance between two peak pixels, a reference peak pixel located at the center of a threshold region for which a peak density is calculated and another peak pixel, the region area estimation unit 141 determines whether the other peak pixel is within the threshold region of the other reference peak pixel. At this time, the region area estimation unit 141 does not redundantly calculate a distance with respect to two peak pixels for which distance calculation has already been finished.

In the description below, the processing procedure of the region area estimation unit 141 illustrated in FIG. 7 will be described, in which the number of peak coordinates stored in the peak coordinates storage unit 13 is "3" and there is a second peak pixel within a threshold region having the first peak pixel as a center. In addition, as an example of each peak pixel, an example in a case where the peak pixel t3 illustrated in FIG. 6 is the first peak pixel, the peak pixel t4 is the second peak pixel, and the peak pixel t5 is the third peak pixel will be described.

When the region area estimation process is initiated, first, the region area estimation unit 141 initializes (clears) the value of a peak density corresponding to each pixel to "0" (step S21). Subsequently, the region area estimation unit 141 initializes (clears) a loop counter i of the reference peak pixel to "0" in the first loop of step S22. Then, the region area estimation unit 141 initializes a loop counter j of another peak pixel for which a distance from the reference peak pixel is calculated to "loop counter i+1"="1" in the first loop of step S23.

Thereafter, the region area estimation unit 141 acquires, from the peak coordinates storage unit 13, each set of peak coordinates "0" (referred to as "reference peak coordinate [0]" hereinafter) which corresponds to the loop counter i and indicates the position of the reference peak pixel that is the initial center of the threshold region and a peak coordinate "1" (referred to a "distance calculation peak coordinate [1]" hereinafter) which corresponds to the loop counter j and indicates the position of the other peak pixel for which a distance from the reference peak pixel is calculated. Then, the region area estimation unit 141 calculates a distance between the two peak pixels from the reference peak coordinate [0] and the distance calculation peak coordinate [1] acquired from the peak coordinates storage unit 13 (step S24). Calculation of the distance between the two peak pixels in step S24 is performed, for example, using a known distance calculation method such as Euclidean distance of Manhattan distance.

For example, the region area estimation unit 141 acquires the peak coordinates indicating the position of the first peak pixel t3 as the reference peak coordinate [0] and the peak coordinates indicating the position of the second peak pixel t4 as the distance calculation peak coordinate [1] from the peak coordinates storage unit 13 and calculates the distance between the first peak pixel t3 and the second peak pixel t4.

Subsequently, the region area estimation unit 141 determines whether the calculated distance between the peak pixels is equal to or less than a threshold value of a predetermined distance, that is, whether the distance calculation peak coordinate [1] is within a threshold region having the reference peak coordinate [0] as a center (step S25).

For example, in the process of step S25, the region area estimation unit 141 determines whether the distance calculation peak coordinate [1] corresponding to the second peak pixel t4 is within the threshold region a1 having the reference peak coordinate [0] corresponding to the first peak pixel t3 as a center.

When it is determined that the distance between the peak pixels is equal to or less than the threshold value, that is, the distance calculation peak coordinate [1] is within the threshold region having the reference peak coordinate [0] as a center in step S25 ("YES" in step S25), the region area estimation unit 141 adds "1" to the peak density [0] corresponding to the reference peak pixel. In addition, the region area estimation unit 141 adds "1" to the peak density [1] corresponding to the other peak pixel for which a distance from the reference peak pixel is calculated (step S26). Through the operation, it indicates the presence of another peak pixel located at the distance calculation peak coordinate [1] within the threshold region of the reference peak pixel having the reference peak coordinate [0] as a center and, simultaneously, the presence of the reference peak coordinate [0] as another peak pixel within the threshold region having the distance calculation peak coordinate [1] as a center even in a case where the distance calculation peak coordinate [1] is set to a reference peak pixel.

For example, in the process of step S26, the region area estimation unit 141 indicates that the peak pixel t3 and the peak pixel t4 are present within respective threshold regions by adding "1" to the value of the peak density [0] corresponding to the first peak pixel t3 and adding "1" to the value of the peak density [1] corresponding to the second peak pixel t4.

In this manner, peak densities corresponding to two peak pixels having a distance equal to or less than a threshold value therebetween are simultaneously updated to indicate that mutual peak pixels are present within the threshold regions thereof.

Then, the region area estimation unit 141 ends the first loop of step S23. Subsequently, the region area estimation unit 141 adds "1" to the loop counter j to set the loop counter j to "1+1"="2" and performs the process of the second loop of step S23. In the process of the second loop of step S23, the region area estimation unit 141 acquires a distance calculation peak coordinate [2] corresponding to the loop counter j from the peak coordinates storage unit 13 and calculates a distance between two peak pixels from the reference peak coordinate [0] and the distance calculation peak coordinate [2] in step S24.

For example, in the process of step S24 in the second loop of step S23, the region area estimation unit 141 acquires the peak coordinates indicating the position of the third peak pixel t5 as the distance calculation peak coordinate [2] from the peak coordinates storage unit 13 and calculates a distance between the first peak pixel t3 and the third peak pixel t5.

Subsequently, the region area estimation unit 141 determine whether the calculated distance between the peak pixels is equal to or less than a threshold value of a predetermined distance, that is, whether the distance calculation peak coordinate [2] is within the threshold region having the reference peak coordinate [0] as a center in step S25.

For example, in the process of step S25 in the second loop of step S23, the region area estimation unit 141 determines whether the distance calculation peak coordinate [2] corresponding to the third peak pixel t5 is within the threshold region a1 having the reference peak coordinate [0] corresponding to the first peak pixel t3 as a center.

When it is determined that the distance between the peak pixels is not equal to or less than the threshold value, that is, the distance calculation peak coordinate [2] is not present within the threshold region having the reference peak coordinate [0] as a center in step S25 ("NO" in step S25), the region area estimation unit 141 ends the second loop of step S23. Then, the region area estimation unit 141 adds "1" to the loop counter j to set the loop counter j to "2+1"="3" and performs the third loop of step S23. However, since the number of coordinates is "3" in this case, the region area estimation unit 141 ends the loop of step S23 under the condition (j<the number of peak coordinates) of ending the process of the loop of stop S23.

Subsequently, the region area estimation unit 141 adds "1" to the loop counter i to be set to the loop counter i to "0+1"="1" and performs the process of the second loop of step S22. In addition, the region area estimation unit 141 initialize the loop counter j of another peak pixel for which a distance from the reference peak pixel is calculated to "loop counter i+1"="2" in the first loop of step S23 in the process of the second loop of step S22.

Thereafter, the region area estimation unit 141 acquires, from the peak coordinates storage unit 13, a reference peak coordinate [1] which corresponds to the loop counter i and indicates the position of a reference peak pixel that is the center of the second threshold region, and a distance calculation peak coordinate [2] corresponding to the loop counter j="2" in step S24. Then, the region area estimation unit 141 calculates a distance between the two peak pixels from the reference peak coordinate [1] and the distance calculation peak coordinate [2] acquired from the peak coordinates storage unit 13.

For example, in the process of step S24 in the first loop of step S23 in the second loop of step S22, the region area estimation unit 141 acquires the peak coordinates indicating the position of the second peak pixel t4 as the reference peak coordinate [1] and the peak coordinates indicating the position of the third peak pixel t5 as the distance calculation peak coordinate [2] from the peak coordinates storage unit 13, and calculates a distance between the second peak pixel t4 and the third peak pixel t5.

Further, in the presence of the second loop of step S22, a distance between the second peak pixel t4 and the first peak pixel t3 is not calculated in the first loop of step S23. This is for the purpose of preventing redundant calculation of the distance between the same two peak pixels because calculation of the distance between the first peak pixel t3 and the second peak pixel t4 has ended in the process of the first loop of step S22.

Subsequently, the region area estimation unit 141 determines whether the calculated distance between the peak pixels is equal to or less than a threshold value of a predetermined distance, that is, whether the distance calculation peak coordinate [2] is within a threshold region having the reference peak coordinate [1] as a center in step S25.

For example, in the process of step S25 in the first loop of step S23 in the second loop of step S22, the region area estimation unit 141 determines whether the distance calculation peak coordinate [2] corresponding to the third peak pixel t5 is within the threshold region, which is not shown, having the reference peak coordinate [1] corresponding to the second peak pixel t4 as a center.

Then, the region area estimation unit 141 updates the value of the corresponding peak density [1] and peak density [2] depending on the determination result of step S25 as in the first loop of step S22.

Thereafter, the region area estimation unit 141 ends the first loop of step S23, adds "1" to the loop counter j to set the loop counter j to "2+1"="3" and performs the process of the second loop of step S23. Here, the region area estimation unit 141 ends the loop of step S23 under the condition (j<the number of peak coordinates) of ending the process of the loop of step S23.

Subsequently, the region area estimation unit 141 adds "1" to the loop counter i to be set to the loop counter i to "1+1"="2" and performs the process of the third loop of step S22. However, since the number of peak coordinates is "3"

in this case, the region area estimation unit 141 ends the loop of step S22 under the condition (i<the number of peak coordinates) of ending the process of the loop of step S22.

In this manner, the region area estimation unit 141 determines whether there is another peak pixel within the threshold region of the reference peak pixel by sequentially changing the reference peak pixel located at the center of the threshold region in the loop of step S22 and calculating a distance between two peak pixels which are the reference peak pixel and the other peak pixel in the loop of step S23. In addition, when it is determined that the other peak pixel is within the threshold region of the reference peak pixel, a peak density of the reference peak pixel and the other pixel is undated. Accordingly, the region area estimation unit 141 can simply estimate a region area belonging to a peak pixel corresponding to each peak set of peak coordinates stored in the peak coordinates storage unit 13 using a reciprocal of the updated peak density. In addition, the region area estimation unit 141 correlates information on the estimated region area (the reciprocal of the peak density) with each set of peak coordinates and stores the same in the region area storage unit 142.

The peak coordinates distribution-scheduling unit 143 reads peak coordinates correlated with information on region areas (reciprocals of peak densities) stored in the region area storage unit 142, provides distribution signals to the read peak coordinates such that differences in total sums of region areas on which the respective region label generation units 16 perform computations are minimized, that is, total sums of loads of computations performed by the respective region label generation units 16 are approximately equalized, and outputs the peak coordinates provided with the distribution signals to the peak coordinates distribution unit 15.

Figure 8:
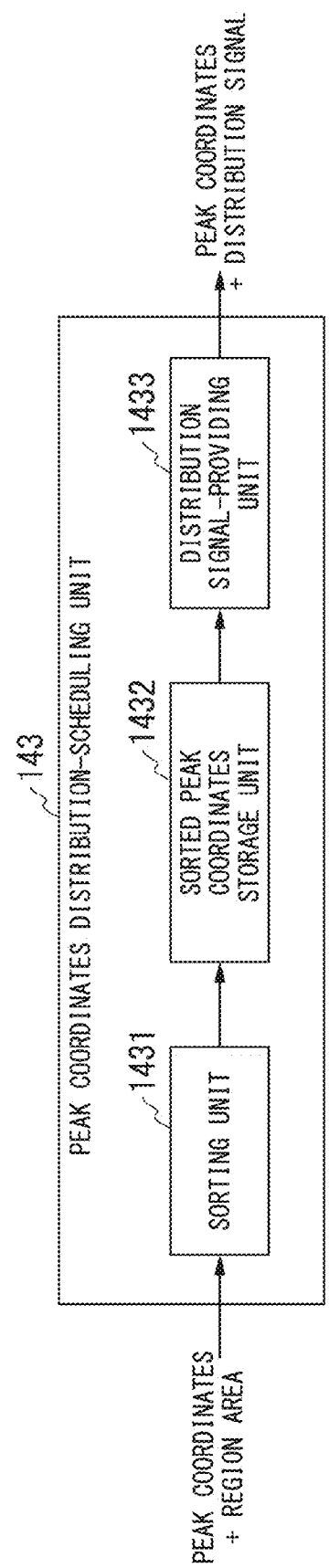
FIG. 8 is a block diagram illustrating a configuration of a peak coordinates distribution-scheduling unit included in the image-processing device of the first embodiment of the present invention.

Next, the peak coordinates distribution-scheduling unit 143 will be described. FIG. 8 is a block diagram illustrating a configuration of the peak coordinates distribution-scheduling unit 143 included in the image-processing device 1 of the first embodiment of the present invention. The peak coordinates distribution-scheduling unit 143 illustrated in FIG. 8 includes a sorting unit 1431, a sorted peak coordinates storage unit 1432, and a distribution signal-providing unit 1433.

The sorting unit 1431 rearranges (sorts) respective peak coordinates in a predetermined order on the basis of information on region areas correlated with peak coordinates read from the region area storage unit. For example, the sorting unit 1431 may sort the respective peak coordinates in the order of increasing size of region areas belonging to corresponding peak pixels. More specifically, the sorting unit 1431 sorts reciprocals of peak densities which are the information on the region areas correlated with the peak coordinates in an ascending order. Then, the sorting unit 1431 outputs each set of peak coordinates to the sorted peak coordinates storage unit 1432 in the sorted order.

The order of sorting the respective peak coordinates by the sorting unit 1431 may be the order of decreasing size of the region areas belonging to the peak pixels, that is, a descending order of the reciprocals of the peak densities.

The sorted peak coordinates storage unit 1432 stores the respective peak coordinates sequentially output from the sorting unit 1431.

The distribution signal-providing unit 1433 sequentially reads the respective peak coordinates stored in the sorted peak coordinates storage unit 1432 in an order stored in the sorted peak coordinates storage unit 1432, provides distribution signals indicating region label generation units 16 to which computations have been allocated to the read peak coordinates and outputs the peak coordinates provided with the distribution signals to the peak coordinates distribution unit 15.

Figure 9A:
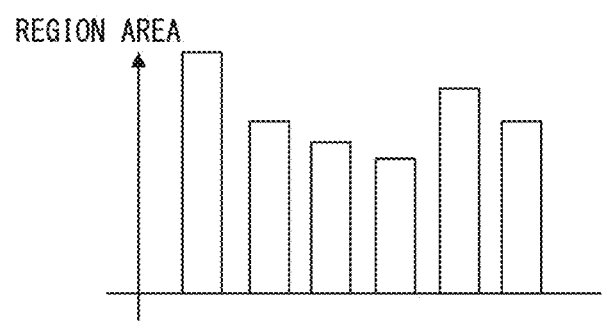
FIG. 9A is a diagram describing the concept of a process of providing a distribution signal by the peak coordinates distribution-scheduling unit included in the image-processing device of the first embodiment of the present invention.
Figure 9B:
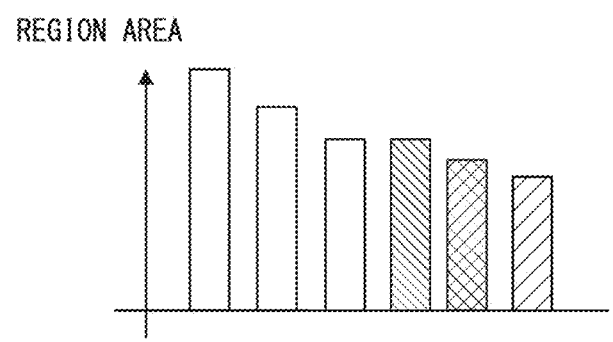
FIG. 9B is a diagram describing the concept of a process of providing a distribution signal by the peak coordinates distribution-scheduling unit included in the image-processing device of the first embodiment of the present invention.
Figure 9C:
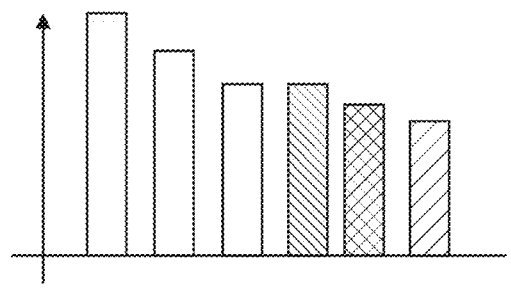
FIG. 9C is a diagram describing the concept of a process of providing a distribution signal by the peak coordinates distribution-scheduling unit included in the image-processing device of the first embodiment of the present invention.

Here, operation of the peak coordinates distribution-scheduling unit 143 will be described. FIGS. 9A to 9D are diagrams describing the concept of the distribution signal-providing process performed by the peak coordinates distribution-scheduling unit 143 included in the image-processing device 1 of the first embodiment of the present invention. In FIGS. 9A to 9C, the horizontal axis represents an arrangement of respective peak coordinates and the vertical axis represents the size of a region area estimated in each set of peak coordinates. In addition, in FIG. 9D, the horizontal axis represents each region label generation unit 16 and the vertical axis represents a computational load allocated to each region label generation unit 16 using the size of a region area.

The sorting unit 1431 in the peak coordinates distribution-scheduling unit 143 reads peak coordinates from the region area storage unit 142. Here, when the respective peak coordinates read by the sorting unit 1431 are rearranged in the read order and the sizes of the region areas based on the information on the region areas correlated with the respective peak coordinates are represented, the region areas are not in a specific order as illustrated in FIG. 9A. Thus, the sorting unit 1431 sorts the respective peak coordinates in the order of decreasing size of the region areas. Accordingly, the respective peak coordinates rearranged in the order of decreasing size of the region areas are stored in the sorted peak coordinates storage unit 1432 in the peak coordinates distribution-scheduling unit 143, as illustrated in FIG. 9B.

In addition, the distribution signal-providing unit 1433 in the peak coordinates distribution-scheduling unit 143 provides a distribution signal to each of the peak coordinates stored in the sorted peak coordinates storage unit 1432. In the example illustrated in FIG. 9C, when the image-processing device 1 includes three region label generation units 16 (region label generation units 16-0 to 16-2), for the distribution signal allocated to each se of peak coordinates, a numeral part following "-" in a symbol provided to each region label generation unit 16 indicates information for identifying each region label generation unit 16. In addition, the example shown in FIG. 9C illustrates a case in which the respective peak coordinates rearranged by the sorting unit 1431 are allocated in an order such that the order of the region label generation units 16 alternately repeats an ascending order and a descending order.

More specifically, in the example illustrated in FIG. 9C, the first to third peak coordinates are allocated to the region label generation units 16-0 to 16-2 in an ascending order, and the fourth to sixth peak coordinates are allocated to the region label generation units 16-2 to 16-0 in a descending order. Accordingly, in the example illustrated in FIG. 9C, the first peak coordinate and the sixth peak coordinate are allocated to the region label generation unit 16-0, the second peak coordinate and the fifth peak coordinate are allocated to the region label generation unit 16-1, and the third peak coordinate and the fourth peak coordinate are allocated to the region label generation unit 16-2.

Figure 9D:
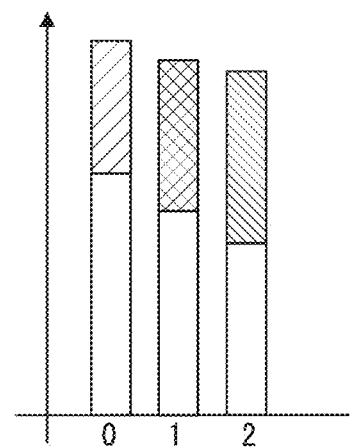
FIG. 9D is a diagram describing the concept of a process of providing a distribution signal by the peak coordinates distribution-scheduling unit included in the image-processing device of the first embodiment of the present invention.

By allocating each set of peak coordinates as illustrated in FIG. 9C, total sums of computational loads (region areas) of the respective region label generation units 16 are approximately equalized. FIG. 9D represents computational loads of the region label generation units 16-0 to 16-2 in a case where each set of peak coordinates is allocated as in the example illustrated in FIG. 9C using sizes of region areas. As in the example illustrated in FIG. 9C, a computational load is allocated to each region label generation unit 16 in such a manner that a peak coordinate having the largest region area size and a peak coordinate having the smallest region area size are combined, and thus total sums of computational loads of the respective region label generation units 16 are approximately equalized as illustrated in FIG. 9D.

Figure 10:
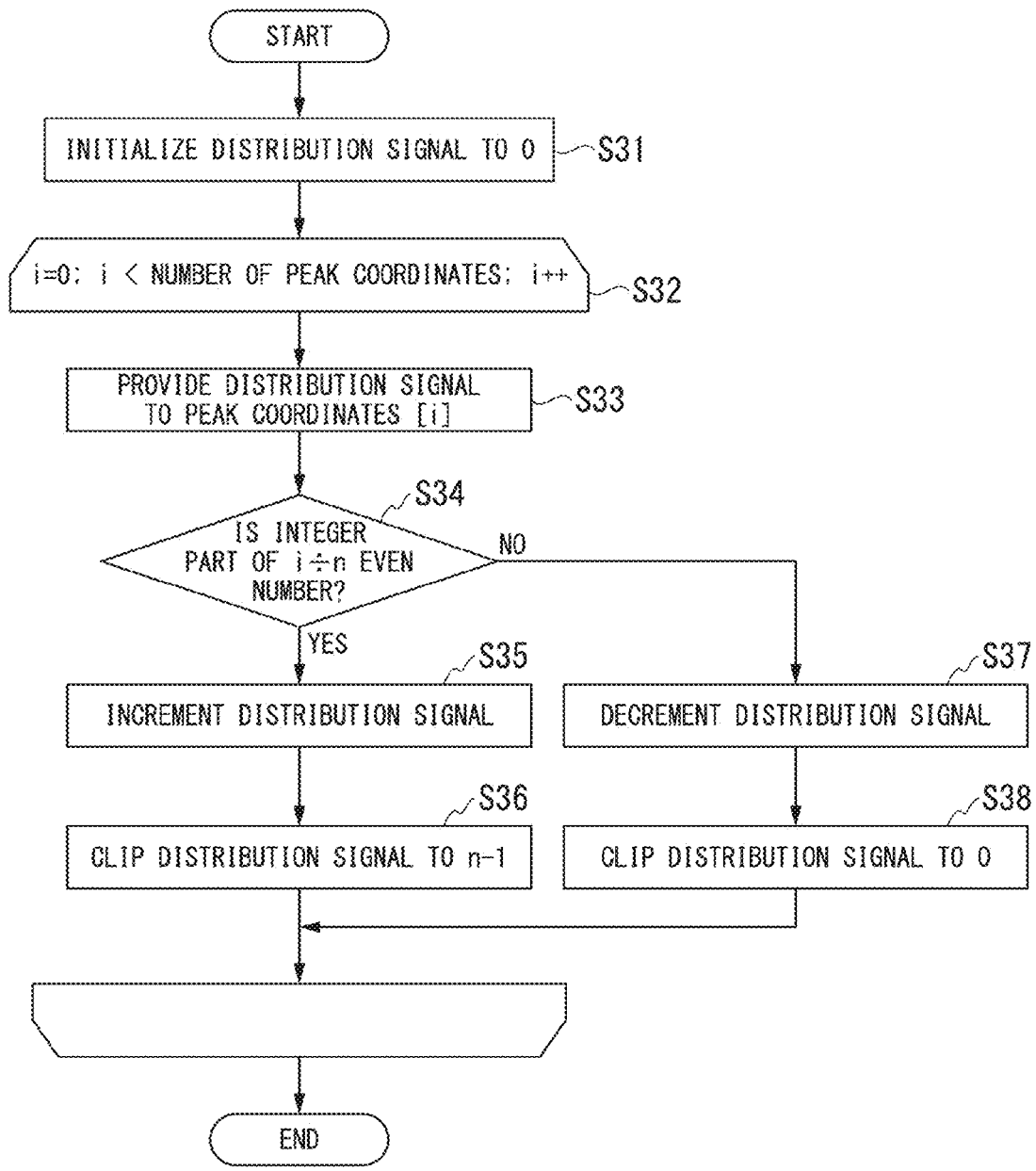
FIG. 10 is a flowchart illustrating a processing procedure in a distribution signal-providing unit included in the image-processing device of the first embodiment of the present invention.

Next, the distribution signal-providing process performed by the distribution signal-providing unit 1433 included in the image-processing device 1 will be described. FIG. 10 is a flowchart illustrating a processing procedure in the distribution signal-providing unit 1433 included in the image-processing device 1 of the first embodiment of the present invention. In the description below, the image-processing device 1 includes n region label generation units 16 which are the region label generation unit 16-0 to the region label generation unit 16-(n−1).

When the distribution signal-providing process is initiated, first, the distribution signal-providing unit 1433 initializes values of distribution signals (step S31). Here, the distribution signal-providing unit 1433 sets the initial values of distribution signals to "0."

Subsequently, the distribution signal-providing unit 1433 clears the loop counter i of peak pixels whose peak coordinates are read to "0" in the loop of step S32.

Thereafter, the distribution signal-providing unit 1433 acquires a peak coordinate "i" (referred to as "distribution peak coordinate [i] hereinafter) corresponding to the loop center i from the sorted peak coordinates storage unit 1432. Then, the distribution signal-providing unit 1433 provides a distribution signal (here, a distribution signal having the initial value="0") to the distribution peak coordinate [i] acquired from the sorted peak coordinates storage unit 1432 and outputs the peak coordinates provided with the distribution signal to the peak coordinates distribution unit 15 (step S33).

Subsequently, the distribution signal-providing unit 1433 determines whether the inter part of a value obtained by dividing the value of the loop counter i by the number n of region label generation units 16 (i÷n) is an even number (step S34).

When the integer part of (i÷n) is an even number in step S34 ("YES" in step S34), the distribution signal-providing unit 1433 adds "1" to the current distribution signal value to increment the distribution signal value (step S35).

Subsequently, when the incremented distribution signal value is equal to or greater than the number n of region label generation units 16, the distribution signal-providing unit 1433 subtracts "1" from the incremented distribution signal value and fixes (clip) the distribution signal value to the number (n−1) (step S36). On the other hand, when the incremented distribution signal value is not equal to or greater than the number n of region label generation units 16, the process of step S36 is not performed. Then, the distribution signal-providing unit 1433 returns to step S32 and performs the distribution signal-providing process on the next peak coordinates.

When the integer part of (i÷n) is not an even number, that is, the integer part is an odd number in step S34 ("NO" in step S34), the distribution signal-providing unit 1433 subtracts "1" from the current distribution signal value to decrement the distribution signal value (step S37).

Subsequently, when the decremented distribution signal value is equal to or less than "0," the distribution signal-providing unit 1433 adds "1" to the decremented distribution signal value and fixes (clip) the distribution signal value to "0" (step S38). On the other hand, when the decremented distribution signal value is not equal to or less than "0," the process of step S38 is not performed. Then, the distribution signal-providing unit 1433 returns to step S32 and performs the distribution signal-providing process on the next peak coordinates.

The distribution signal-providing unit 1433 performs the distribution signal-providing process represented by the loop of step S32 on all peak coordinates stored in the sorted peak coordinates storage unit 1432 to provide a distribution signal to each set of peak coordinates.

According to this configuration and operation, the peak coordinates distribution signal generation unit 14 outputs, to the peak coordinates distribution unit 15, peak coordinates provided with distribution signals for distributing computations for providing a region label to surrounding pixels belonging to the same peak pixel in a luminance image such that the computations are approximately equalized in the region label generation units 16 which are respective computation resources included in the image-processing device 1.

In addition, the peak coordinates distribution unit 15 distributes (apportions) each set of peak coordinates to the corresponding region label generation unit 16 on the basis of distribution signals provided to peak coordinates input from the peak coordinates distribution signal generation unit 14. Accordingly, the total sums of computational loads of the respective region label generation units 16 are approximately equalized, as illustrated in FIG. 9D, and thus the respective region label generation units 16 can be operated without making the respective region label generation units 16 idle. Therefore, a total processing time in the image-processing device 1 can be reduced.

Here, the region label generation unit 16 included in the image-processing device 1 will be described. FIGS. 11A to 11G are diagrams schematically illustrating an example of a region label generation process performed by the region label generation unit 16 included in the image-processing device 1 of the first embodiment of the present invention. FIGS. 11A to 11G illustrate a process of providing a region label to surrounding pixels belonging to the same peak pixel by the region label generation unit 16 in stages.

Figure 11A:
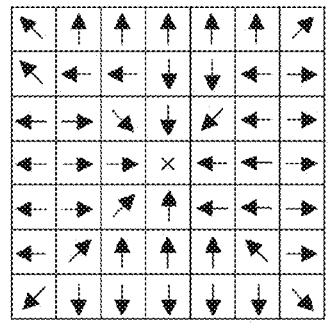
FIG. 11A is a diagram schematically illustrating an example of a region label generation process of a region label generation unit included in the image-processing device of the first embodiment of the present invention.

FIG. 11A illustrates an example of gradient data stored in the gradient data storage unit 12. In the gradient data illustrated in FIG. 11A, a peak pixel is located at the center and a gradient label is provided to each of surrounding pixels located around the peak pixel. In the gradient data illustrated in FIG. 11A, the peak pixel is indicated by a sign "x" and the gradient label is schematically indicated by an arrow like the gradient data illustrated in FIG. 1B.

Figure 11B:
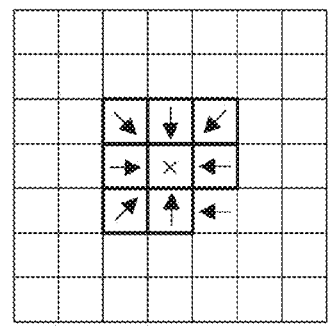
FIG. 11B is a diagram schematically illustrating an example of a region label generation process of a region label generation unit included in the image-processing device of the first embodiment of the present invention.

When peak coordinates indicating the position of the peak pixel (sign "x") which is a computation target are input, the region label generation unit 16 reads a peak label of the peak pixel located at the peak coordinates and gradient data of surrounding pixels corresponding to eight pixels around the peak pixel from the gradient data storage unit 12. Then, the region label generation unit 16 determines whether gradient labels provided to the gradient data of the read eight surrounding pixels represent gradient directions toward the read peak pixel. The example illustrated in FIG. 11B shows a state in which gradient data other than the gradient data of the right bottom surrounding pixel of the peak pixel in the gradient data of the eight surrounding pixels represents gradient directions toward the peak pixel.

Figure 11C:
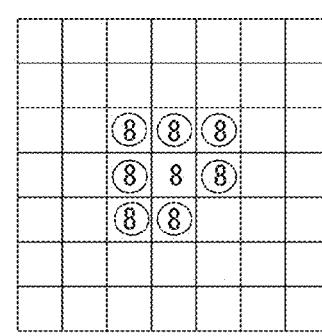
FIG. 11C is a diagram schematically illustrating an example of a region label generation process of a region label generation unit included in the image-processing device of the first embodiment of the present invention.

The region label generation unit 16 provides a region label having the same value as the peak label of the peak pixel to each of the surrounding pixels corresponding to the gradient data which represents the gradient directions toward the peak pixel. The example illustrated in FIG. 11C shows a state in which a region label having the same value (here, "8" encircled by a circle) as the peak label of the peak pixel is provided to the surrounding pixels representing the gradient directions toward the peak pixel, that is, the surrounding pixels other than the right bottom surrounding pixel of the peak pixel.

Figure 11D:
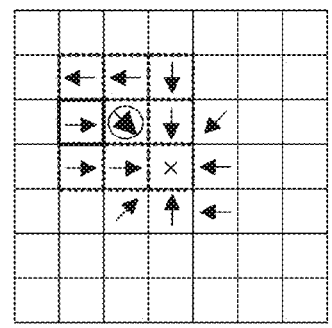
FIG. 11D is a diagram schematically illustrating an example of a region label generation process of a region label generation unit included in the image-processing device of the first embodiment of the present invention.

Then, the region label generation unit 16 sequentially sets each of the surrounding pixels provided with the same region label as a center, reads gradient data of eight surrounding pixels around each of the surrounding pixels which is set to a center from the gradient data storage unit 12, and determines whether gradient labels provided to the read gradient data of the eight surrounding pixels represent gradient directions toward the surrounding pixel set to a center. The example shown in FIG. 11D illustrates a case in which a surrounding pixel which is located at the right top of the peak pixel and encircled by a circle is set to a center and gradient data of eight surrounding pixels around the surrounding pixel is read from the gradient data storage unit 12. In addition, the example shown in FIG. 11D illustrates a state in which only gradient data of a left central surrounding pixel represents a gradient direction toward the surrounding pixel set to the center in the read gradient data of the eight surrounding devices.

Figure 11E:
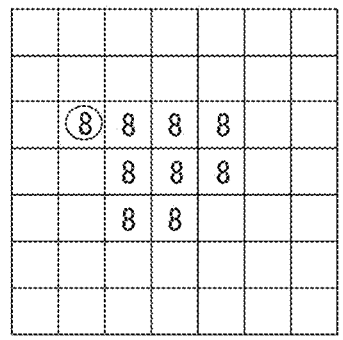
FIG. 11E is a diagram schematically illustrating an example of a region label generation process of a region label generation unit included in the image-processing device of the first embodiment of the present invention.

The region label generation unit 16 provides a region label having the same value as the region label provided to the surrounding pixel set to the center to each surrounding pixel corresponding to gradient data representing a gradient direction toward the surrounding pixel set to the center. The example shown in FIG. 11E illustrates a state in which a region label having the same value (here, "8" encircled by a circle) is provided only to the left central surrounding pixel which represents a gradient direction toward the surrounding pixel set to the center.

Figure 11F:
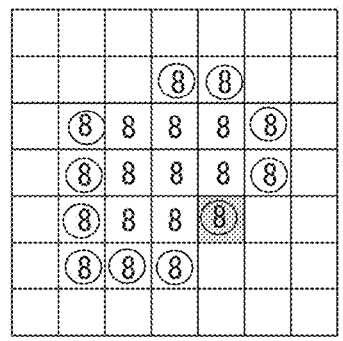
FIG. 11F is a diagram schematically illustrating an example of a region label generation process of a region label generation unit included in the image-processing device of the first embodiment of the present invention.

In the same manner, the region label generation unit 16 provides the region label having the same value (here, "8" encircled by a circle) as the peak label of the peak pixel to surrounding pixels of a region as illustrated in FIG. 11F by sequentially setting each of surrounding pixels provided with the same region label ("8" encircled by a circle in FIG. 11C) to a center and determining whether gradient data of surrounding pixels around the surrounding pixel set to the center represents gradient directions toward the surrounding pixels set to the center.

In FIG. 11F, the region label having the same value is also provided to the right bottom surrounding pixel (surrounding pixel represented as a halftone portion) of the peak pixel, which is determined to be a surrounding pixel which does not represent a gradient direction toward the peak pixel in FIG. 11B. This is because the right bottom surrounding pixel of the peak pixel is determined to represent a gradient direction toward a bottom central surrounding pixel of the peak pixel from the result of determination of whether the right bottom surrounding pixel of the peak pixel represents a gradient direction toward the bottom central surrounding pixel of the peak pixel having the bottom central surrounding pixel as a center.

Thereafter, in the same manner, the region label generation unit 16 newly sequentially sets each of surrounding pixels provided with the same region label to a center, determines whether surrounding pixels represent gradient directions toward a surrounding pixel set to the center, and provides the region label having the same value to surrounding pixels determined to represent gradient direction toward the surrounding pixel set to the center.

Figure 11G:
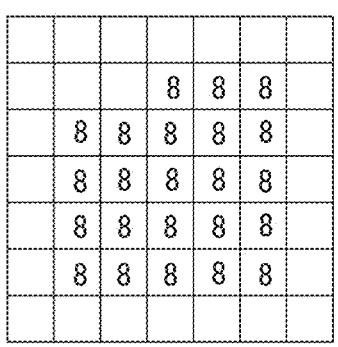
FIG. 11G is a diagram schematically illustrating an example of a region label generation process of a region label generation unit included in the image-processing device of the first embodiment of the present invention.

In this manner, the region label generation unit 16 sequentially extends a region for which gradient directions are determined from the peak pixel located at the center, and when it is finally determined that all surrounding pixels do not represent gradient directions toward a surrounding pixel as a center, ends the process of providing a region label to surrounding pixels belonging to the same peak pixel, that is, the region label generation process. FIG. 11G illustrates an example of final region label data obtained by providing the region label depending on results of determination of gradient directions sequentially setting surrounding pixels encircled by a circle in FIG. 11F as centers and then ending the region label generation process for the peak pixel (peak pixel indicated by the sign "x" in FIGS. 11A, 11B and 11D).

Figure 12:
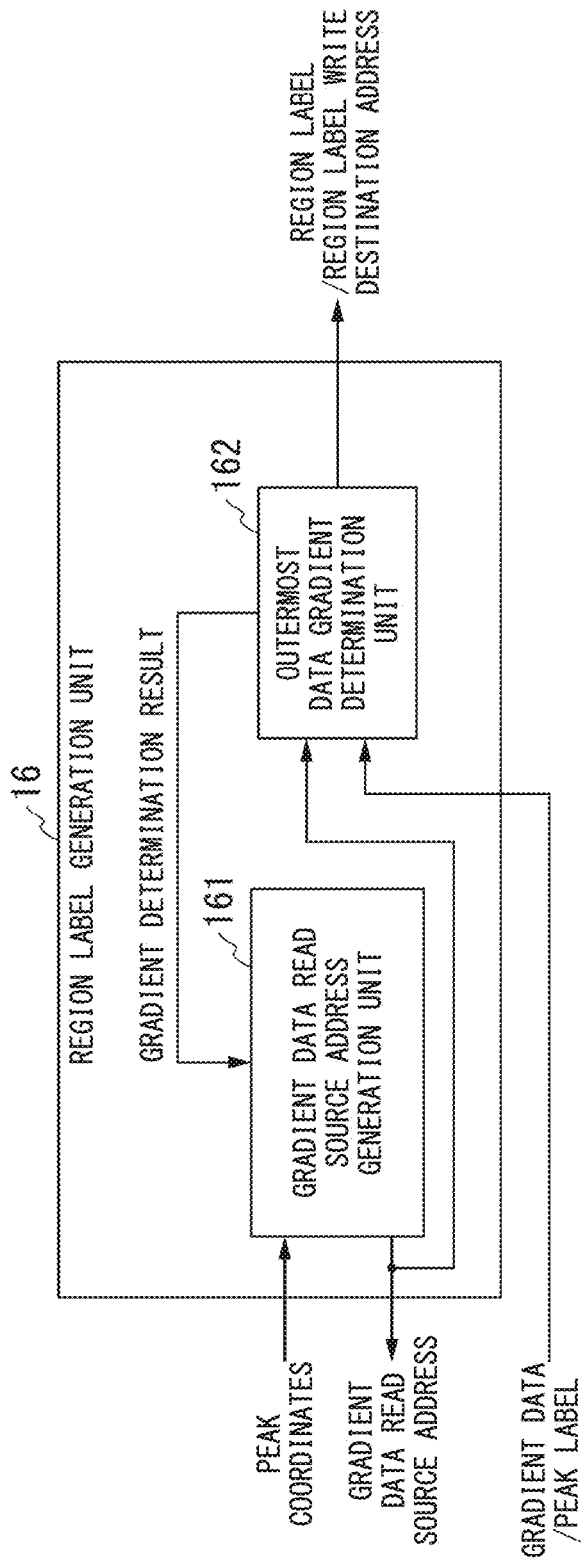
FIG. 12 is a block diagram illustrating a configuration of the region label generation unit included in the image-processing device of the first embodiment of the present invention.

Next, the configuration and operation of the region label generation unit 16 included in the image-processing device 1 will be described. FIG. 12 is a block diagram illustrating the configuration of the region label generation unit 16 included in the image-processing device 1 of the first embodiment of the present invention. The region label generation unit 16 illustrated in FIG. 12 includes a gradient data read source address generation unit 161 and an outermost data gradient determination unit 162.

The gradient data read source address generation unit 161 generates a gradient data read source address for reading a gradient label or a peak label from the gradient data storage unit 12 in order to provide a region label to each of surrounding pixels belonging to a peak pixel corresponding to peak coordinates allocated by the peak coordinates distribution unit 15. In addition, the gradient data read source address generation unit 161 outputs the generated gradient data read source address to the gradient data storage unit 12 and causes a gradient label or a peak label stored in a storage region corresponding to the gradient data read source address to be output to the outermost data gradient determination unit 162. Further, the gradient data read source address generation unit 161 outputs the generated gradient data read source address to the outermost data gradient determination unit 162. In addition, the gradient data read source address generation unit 161 generates another different gradient data read source address on the basis of a gradient determination result input from the outermost data gradient determination unit 162 and outputs the generated gradient data read source address to the gradient data storage unit 12 and the outermost data gradient determination unit 162.

The outermost data gradient determination unit 162 determines each of surrounding pixels belonging to the same peak pixel on the basis of a gradient data read source address input from the gradient data read source address generation unit 161 and a gradient label and a peak label input from the gradient data storage unit 12. Then, the outermost data gradient determination unit 162 outputs gradient data read source addresses of surrounding pixels determined to belong to the same peak pixel to the gradient data read source address generation unit 161 as gradient determination results representing coordinates indicting the positions of surrounding pixels determined to belong to the same peak pixel. Accordingly, the gradient data read source address generation unit 161 reads another different gradient label. In addition, the outermost data gradient determination unit 162 generates a region label write destination address representing the position of each of surrounding pixels belonging to the same peak pixel and outputs the generated region label write destination address and a region label to be stored in a recording region corresponding to the region label write destination address to the region label storage unit 17.

Accordingly, the corresponding region label is stored in the recording region corresponding to the region label write destination address of the region label storage unit 17.

Figure 13:
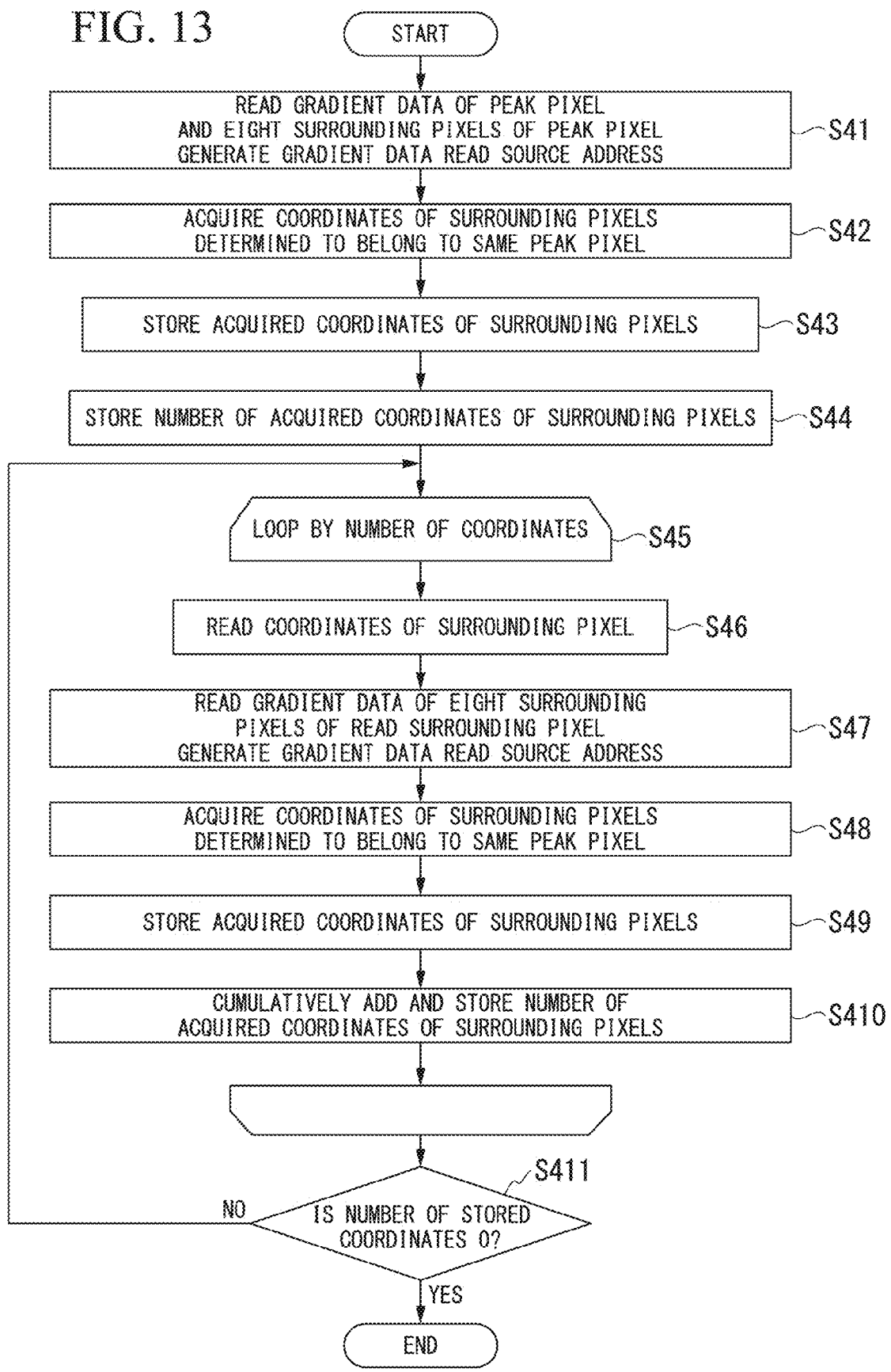
FIG. 13 is a flowchart illustrating a processing procedure in a gradient data read source address generation unit included in the image-processing device of the first embodiment of the present invention.

Here, operation of each component included in the region label generation unit 16 will be described. First, the gradient data read source address generation unit 161 will be described. FIG. 13 is a flowchart illustrating a processing procedure in the gradient data read source address generation unit 161 included in the image-processing device 1 of the first embodiment of the present invention.

When peak coordinates indicating the position of a peak pixel which is a target for which computation will be performed are input to the region label generation unit 16, first, the gradient data read source address generation unit 161 generates a gradient data read source address for reading gradient data of the peak pixel corresponding to the input peak coordinates and gradient data read source addresses for reading gradient data of eight surrounding pixels located around the peak pixel. Then, the gradient data read source address generation unit 161 outputs the generated gradient data read source addresses to the gradient data storage unit 12 (step S41).

Accordingly, the gradient data storage unit 12 outputs the gradient data (peak label) of the peak pixel and the gradient data (gradient labels) of the eight surrounding pixels located around the peak pixel, which are stored in the storage regions designated by the gradient data read source addresses, to the outermost data gradient determination unit 162. In addition, the gradient data read source address generation unit 161 outputs the generated gradient data read source addresses to the outermost data gradient determination unit 162. Accordingly, the outermost data gradient determination unit 162 determines surrounding pixels which represent gradient directions toward the peak pixel according to a processing procedure which will be described below and outputs the gradient determination result to the gradient data read source address generation unit 161.

Subsequently, the gradient data read source address generation unit 161 acquires the gradient determination result output from the outermost data gradient determination unit 162, that is, coordinates indicating the position of surrounding pixels determined to belong to the same peak pixel (step S42).

Thereafter, the gradient data read source address generation unit 161 stores the coordinates of each surrounding pixel included in the gradient determination result (step S43). In addition, the gradient data read source address generation unit 161 stores the number of coordinates of surrounding pixels included in the gradient determinations result (step S44). For example, when the gradient determination result is a state in which gradient data of surrounding pixels other than the gradient data of the right bottom surrounding pixel of the peak pixel represents gradient directions toward the peak pixel in the gradient data of the eight surrounding pixels, as illustrated in FIG. 11B, the gradient data read source address generation unit 161 stores "7" as the number of coordinates of the surrounding pixels in the process of step S44.

Subsequently, the gradient data read source address generation unit 161 performs as many gradient data read source address generation processes having each surrounding pixel as a center as the stored number of coordinates of surrounding pixels (seven times in the example illustrated in FIG. 11B) in the loop of step S45. In the loop of step S45, first, the coordinates of any one surrounding pixel are read among the stored coordinates of surrounding pixels (step S46).

Thereafter, when the surrounding pixel of the read coordinates is a center, the gradient data read source address generation unit 161 generates gradient data read source addresses for reading gradient data of eight surrounding pixels located around the surrounding pixel and outputs the generated gradient data read source addresses to the gradient data storage unit 12 (step S47). For example, the gradient data read source address generation unit 161 generates gradient data read source addresses for reading gradient data of eight surrounding pixels located around any one surrounding pixel which is a center, as illustrated in FIG. 11D, and outputs the generated gradient data read source addresses to the gradient data storage unit 12. In addition, the gradient data read source address generation unit 161 outputs the generated gradient data read source addresses to the outermost data gradient determination unit 162.

Accordingly, the gradient data storage unit 12 outputs the gradient data (gradient labels) of the surrounding pixels stored in storage regions designated by the gradient data read source addresses to the outermost data gradient determination unit 162 as in the process of step S41. Then, the outermost data gradient determination unit 162 determines surrounding pixels which represent gradient directions toward the surrounding pixel which is a center as in a processing procedure which will be described below, and outputs the new gradient determination result to the gradient data read source address generation unit 161.

Subsequently, the gradient data read source address generation unit 161 acquires the new gradient determination result output from the outermost data gradient determination unit 162, that is, coordinates indicating the positions of outer surrounding pixels determined to belong to the same peak pixel (step S48).

Then, the gradient data read source address generation unit 161 stores the coordinates of each surrounding pixel included in the gradient determination result (step S49). Here, the coordinates of the surrounding pixel to be stored in the process of step S49 are stored by being added to the coordinates of the surrounding pixels which have been stored in the process of step S43. In this cases, as a storage region in which the coordinates of the surrounding pixels are stored, for example, a storage region in the first-input first-output (FIFO) format may be conceived. Further, the storage region in which the coordinates of the surrounding pixels are stored in the process of step S49 may be different from the storage region in which the coordinates of the surrounding pixels are stored in the process of step S43.

In addition, the gradient data read source address generation unit 161 stores the number of coordinates of surrounding pixels included in the gradient determination result (step S410). For example, when the gradient determination result is a state in which only the gradient data of the left central surrounding pixel in the gradient data of the eight surrounding pixels represents a gradient direction toward the surrounding pixel which is a center, as illustrated in FIG. 11D, the gradient data read source address generation unit 161 stores "1" as the number of surrounding pixels in the process of step S410.

The number of coordinates of surrounding pixels to be stored in the process of step S410 is stored by being cumulatively added to the number of coordinates of surrounding pixels stored in the process of step S44. Accordingly, the loop of step S45 is repeated by "the number of coordinates of surrounding pixels="7"" stored in the process of step S44, and when reading of the gradient data of the region of the surrounding pixels provided with the region label, encircled by the circle in FIG. 11C, is completed, the number of coordinates of surrounding pixel stored in the process of step S410 which is the number of surrounding pixels encircled by the circle in FIG. 11F becomes "11."

As the storage region in which the number of coordinates of surrounding pixels is stored, for example, a storage region having a different counter format from the storage region in which the number of coordinates of surrounding pixels has been stored in the process of step S44 may be conceived. However, in a case in which the number of coordinates of surrounding pixels stored in the process of step S44 is transferred to the loop counter of step S45 and becomes a vacant state when the present loop of step S45 is initiated, the storage region in which the number of coordinates of surrounding pixels will be stored in the process of step S410 and the storage region in which the number of coordinates of surrounding pixels has been stored in the process of step S44 may be shared. Further, the number of coordinates of surrounding pixels stored in the process of step S410 is used to determine whether the process of the loop of step S45 is repeated again after the process of the present loop of step S45 ends.

Thereafter, when the loop of step S45 which corresponds to the number of coordinates of surrounding pixels="7" stored in the process of step S44 ends, the gradient data read source address generation unit 161 determines whether the number of coordinates of surrounding pixels stored in the process of step S410 is "0" (step S411).

When it is determined that the stored number of coordinates of surrounding pixels is not "0," that is, reading of gradient data of surrounding pixels determined to belong to the same peak pixel has not been completed in step S411 ("NO" in step S411), the gradient data read source address generation unit 161 returns to step S45 and continues to generate gradient data read source addresses for reading gradient data of surrounding pixels. Here, the number of repetitions of the loop of step S45 corresponds to the number of coordinates of surrounding pixels stored in the process of step S410 (11 times in the example illustrated in FIG. 11F). Accordingly, for example, the gradient data of the region of the surrounding pixels provided with the region label, which are encircled and indicated by the circle in FIG. 11F, is read.

On the other hand, when the stored number of coordinates of surrounding pixels is "0," that is, reading of gradient data of surrounding pixels determined to belong to the same peak pixel has been completed in step S411 ("YES" in step S411), the gradient data read source address generation unit 161 ends the process of generating a gradient data read source address. Accordingly, for example, the final region label data provided with the region label as illustrated in FIG. 11G is generated.

Figure 14:
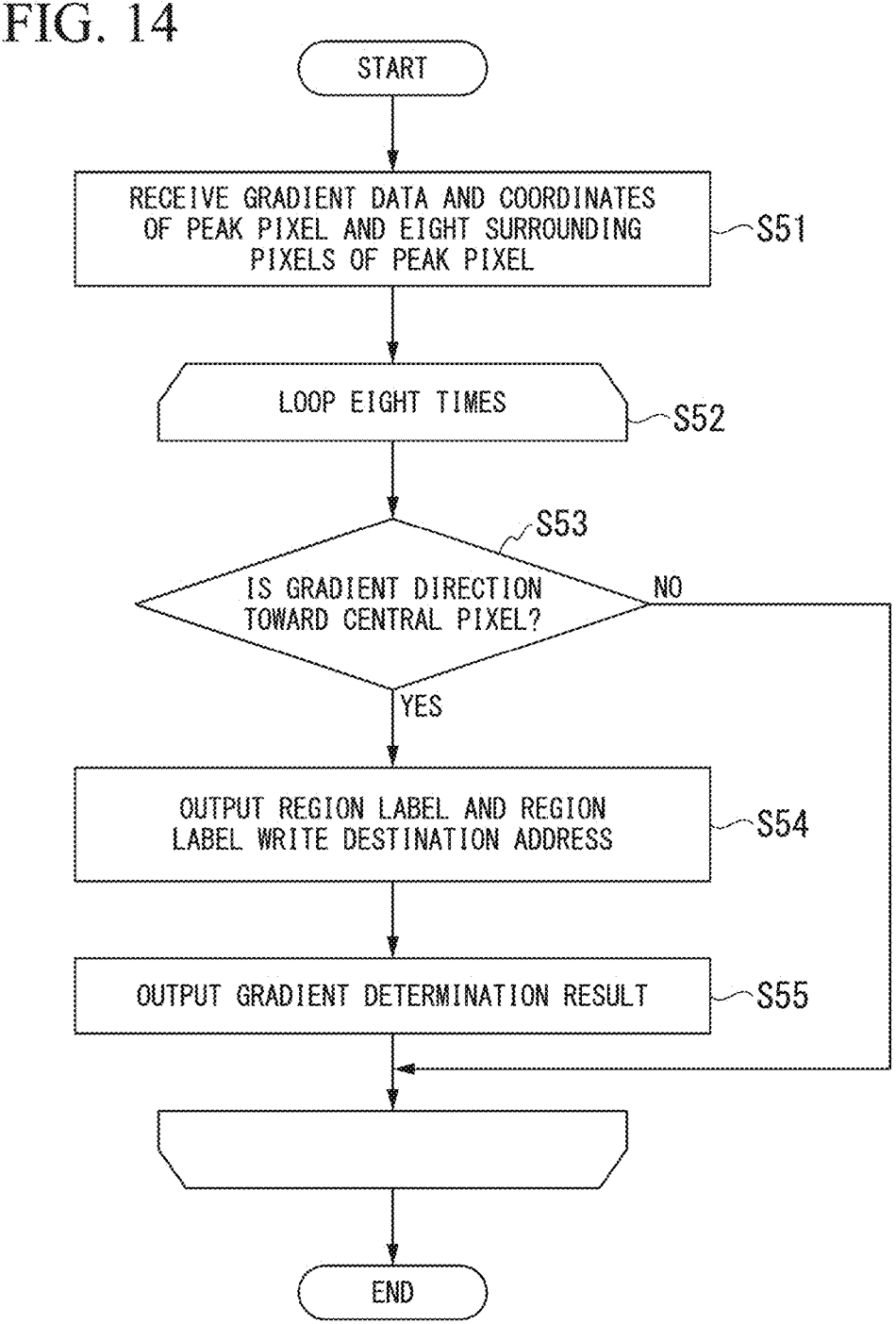
FIG. 14 is a flowchart illustrating a processing procedure in an outermost data gradient determination unit included in the image-processing device of the first embodiment of the present invention.

Subsequently, the outermost data gradient determination unit 161 will be described. FIG. 14 is a flowchart illustrating a processing procedure in the outermost data gradient determination unit 162 included in the image-processing device 1 of the first embodiment of the present invention. The outermost data gradient determination unit 162 performs the processing procedure illustrated in FIG. 14 in response to each of step S41 and step S47 in the processing procedure of the gradient data read source address generation unit 161 illustrated in FIG. 13. In the following description, the outermost data gradient determination unit 162 executes the processing procedure in response to step S41.

The outermost data gradient determination unit 162 acquires the gradient data (peak label) of the peak pixel corresponding to the gradient data read source address and the gradient data (gradient labels) of the eight surrounding pixels located around the peak pixel from the gradient data storage unit 12. In addition, the outermost data gradient determination unit 162 receives the gradient data read source addresses generated by the gradient data read source address generation unit 161 as coordinates indicating the position so the peak pixel and the surrounding pixels (step S51).

Subsequently, the outermost data gradient determination unit 162 performs a process of determining a gradient direction for each piece of the received gradient data of the eight surrounding pixels in the loop of step S52. In the loop of step S52, first, whether the gradient label provided to gradient data of any one surrounding pixel represents a gradient direction toward the central pixel in the received gradient data of the eight surrounding pixels, that is, whether the surrounding pixel belongs to the same peak pixel is determined (step S53).

When it is determined that the gradient label provided to the gradient data of the current surrounding pixel does not represent a gradient direction toward the central pixel, that is, the current surrounding pixel does not belong to the same peak pixel in step S53 ("NO" in step S53), the outermost data gradient determination unit 162 performs the process of the loop of step S53 for any one of the next surrounding pixels.

On the other hand, when it is determined that the gradient label provided to the gradient data of the current surrounding pixel represents a gradient direction toward the central pixel, that is, the current surrounding pixel belongs to the same peak pixel in step S53 ("YES" in step S53), the outermost data gradient determination unit 162 outputs the region label having the same value as the peak label provided to the received gradient data of the peak pixel to the region label storage unit 17 as the region label of the current surrounding pixel in step S54. In addition, the outermost data gradient determination unit 162 outputs the coordinates indicating the position of the surrounding pixel having the region label which is output to the region label storage unit 17 as a region label write destination address.

Subsequently, the outermost data gradient determination unit 162 outputs the coordinates indicating the position of the surrounding pixel having the region label which is output to the gradient data read source address generation unit 161 as a gradient determination result (step S55). In addition, the outermost data gradient determination unit 162 performs the process of the loop of step S52 for any one of the next surrounding pixels.

In this manner, the outermost gradient determination unit 162 performs the gradient direction determination process for each piece of the received gradient data of the eight surrounding pixels. Accordingly, for example, the region in which the region label is provided to the surrounding pixels belonging to the same peak pixel is sequentially extended as illustrated in FIGS. 11C, 11E and 11F, and the region label data is finally stored in the region label storage unit 17 as illustrated in FIG. 11G.

According to the aforementioned configuration and operation, the region label generation unit 16 performs the region division process for providing the same region label to surrounding pixels belonging to the same peak pixel. In the region division process, the region label generation unit 16 provides a region label such that a region is extended from a peak pixel to surrounding pixels. Accordingly, the plurality of region label generation units 16 included in the image-processing device 1 can perform the region division process for different peak pixels in parallel. In addition, the image-processing device 1 can reduce an expected total processing time depending on the number of region label generation unit 16 included therein.

In the above description, the case in which the processing procedure of the outermost data gradient determination unit 162 illustrated in FIG. 14 is executed in response to step S41 of the processing procedure of the gradient data read source address generation unit 161 illustrated in FIG. 13 has been described. However, the processing procedure illustrated in FIG. 14 may be executed in response to each of step S41 and step S47 of the processing procedure of the gradient data read source address generation unit 161 illustrated in FIG. 13 as described above. When the processing procedure illustrated in FIG. 14 is executed in response to step S47 of the processing procedure of the gradient data read source address generation 161 illustrated in FIG. 13, the outermost data gradient determination unit 162 receives gradient data and coordinates obtained when a surrounding pixel determined to belong to the same peak pixel through the previous processing procedure illustrated in FIG. 14 is set to a center as gradient data and coordinates of a peak pixel. Accordingly, the peak label is not provided to the received gradient data of the peak pixel. Therefore, the outermost data gradient determination unit 162 outputs the region label having the same value as the region label which was output in the process of step S54 of the previous processing procedure illustrated in FIG. 14 to the region label storage unit 17 in the present process of step S54.

According to the first embodiment, an image-processing device (image-processing device 1) includes: a gradient data generation unit (gradient data generation unit 11) which sequentially targets each pixel included in an input image (luminance image), and on the basis of a luminance value of a targeted pixel (target pixel) and luminance values of other pixels (surrounding pixels) located around the target pixel, generates gradient data in which each pixel included in the luminance image is represented using a first label (gradient label) of a value indicating a direction toward a pixel having a higher luminance value or a second label (peak label) of a value indicating that the luminance value of one pixel is higher than all pixels (surrounding pixels) located around the pixel; a plurality of region label generation units (region label generation units 16) which set target pixels represented by the peak label as peak pixels, divide a region within the luminance image into regions including pixels (surrounding pixels) that belong to the same peak pixel on the basis of peak coordinates indicating the positions of the peak pixels, and generate region label data in which each of surrounding pixels included in a divided region is represented by a third label (region label) which is a value indicating that the pixels belong to the same peak pixel; and a peak pixel distribution unit (peak coordinates distribution signal generation unit 14 and peak coordinates distribution unit 15) which distributes peak pixels on which computation executed by the region label generation units 16 to divide a region within the luminance image into regions each including surrounding pixels belonging to the same peak pixel will be executed to the region label generation units 16 such that the load of computation is equalized.

In addition, according to the first embodiment, the image-processing device 1 includes the peak pixel distribution unit (peak coordinates distribution signal generation unit 14) that includes: a region area estimation unit (region area estimation unit 141) which estimates a region area that represents the size of the region of surrounding pixels belonging to a peak pixel set to a center for each peak pixel on the basis of the number of other peak pixels located in a region within a predetermined range from the peak pixel set to the center when the peak pixel is set to the center; a peak coordinates distribution-scheduling unit (peak coordinates distribution-scheduling unit 143) which allocates each peak pixel to each of the region label generation units 16 on the basis of each region area such that a difference between region areas corresponding to target peak pixels on which the computation will be executed is minimized, and provides distribution signals representing the allocated region label generation units 16 to peak coordinates corresponding to the peak pixels; and a peak coordinates distribution unit (peak coordinates distribution unit 15) which, on the basis of the distribution signal provided to each set of peak coordinates, outputs the peak coordinates to the region label generation unit 16 indicated by the distribution signal.

In addition, according to the first embodiment, the image-processing device 1 includes the region area estimation unit 141 which calculates a distance between two peak pixels on the basis of peak coordinates of a peak pixel set to a center and peak coordinates of another peak pixel, counts the number of other peak pixels located in a region (threshold region) within a range of a predetermined distance from the position of the peak pixel set to a center on the basis of the calculated distance between the two peak pixels, and estimates a region area corresponding to each peak pixel using a reciprocal of the counted number of other peak pixels.

Furthermore, according to the first embodiment, the image-processing device 1 includes the peak coordinates pixel unit 143 which allocates peak pixels to the region label generation units 16 in a predetermined order.

Moreover, according to the first embodiment, the image-processing device 1 includes the peak coordinates distribution-scheduling unit 143 that includes a sorting unit (sorting unit 1431) which rearranges peak pixels in a predetermined order on the basis of corresponding region areas, and allocates the peak pixels rearranged by the sorting unit 1431 to the region label generation units 16.

In addition, according to the first embodiment, image-processing device 1 includes the peak coordinates distribution-scheduling unit 143 which allocates peak pixels to the region label generation units 16 such that the order of the plurality of region label generation units 16 alternately repeats an ascending order and a descending order.

Furthermore, according to the first embodiment, the image-processing device 1 includes the region label generation units 16 each of which includes: a gradient data acquisition unit (gradient data read source address generation unit 161) which sets a peak pixel corresponding to peak coordinates as a center and acquires gradient data representing each pixel (surrounding pixel) located around the peak pixel; and a gradient determination unit (outermost data gradient determination unit 162) which determines whether the value of a gradient label representing each surrounding pixel included in the acquired gradient data is a value indicating a direction toward the peak pixel, and generates region label data in which a surrounding pixel represented using a gradient label of a value indicating a direction toward the peak pixel is expressed using a region label of the same value as a peak label that represents the peak pixel.

Further, according to the first embodiment, the image-processing device 1 includes the gradient data read source address generation unit 161 which sequentially sets surrounding pixels determined by the outermost data gradient determination 162 to have a gradient label of a value indicating directions toward the peak pixel as centers, and further acquires gradient data representing each of pixels (surrounding pixels) located around the surrounding pixels set to centers, and the outermost data gradient determination unit 162 which sequentially determines whether the values of the gradient labels representing pixels included in the further acquired gradient data are values indicating directions toward the surrounding pixels set to centers, and sequentially generates region label data in which surrounding pixels represented using gradient labels which are values indicating directions toward the surrounding pixels set to centers are expressed using region labels of the same values as the values of the region labels that represent the surrounding pixels set to centers.

Further, according to the first embodiment, the image-processing device 1 includes the gradient data read source address generation unit 161 which acquires gradient data representing each surrounding pixel such that a region of surrounding pixels sequentially set to centers is sequentially extended from the position of peak coordinates corresponding to a peak pixel to outer surrounding pixels, and the outermost data gradient determination unit 162 which generates region label data in which a region represented using a region label of the same value as a peak label that represents the peak pixel is sequentially extended from the position of the peak coordinates corresponding to the peak pixel to outer surrounding pixels.

In this manner, in the image-processing device 1 of the first embodiment, the peak coordinates distribution signal generation unit 14 provides distribution signals representing allocation of the region label generation units 16 in advance to peak coordinates of peak pixels which are targets on which computation will be executed such that the total sums of computational loads of the region label generation units 16, that is, the total sums of areas of regions of surrounding pixels to which the region label generation units 16 provide region labels are approximately equalized. In addition, in the image-processing device 1 of the first embodiment, the peak coordinates distribution unit 15 distributes (apportions) peak coordinates to corresponding region label generation units 16 on the basis of the distribution signals provided to the peak coordinates. Accordingly, it is possible to operate each region label generation unit 16 without making each region label generation unit 16 idle to reduce a total processing time in the image-processing device 1.

(First Modified Example of First Embodiment)

In the image-processing device 1 of the first embodiment, a case in which the peak coordinates distribution signal generation unit 14 provides distribution signals which allocate peak coordinates such that the order of the region label generation units 16 is alternately repeated between an ascending order and a descending order, as illustrated in FIG. 9C, has been described. However the order of allocation of peak pixels by the peak coordinates distribution signal generation unit 14 is not limited to the order illustrated in FIG. 9C, that is, the processing procedure illustrated in FIG. 10. For example, the distribution signal-providing unit 1433 included in the peak coordinates distribution-scheduling unit 143 in the peak coordinates distribution signal generation unit 14 may provide distribution signals which allocate peak coordinates such that the order of the region label generation units 16 repeats any one of an ascending order and a descending order.

Figure 15A:
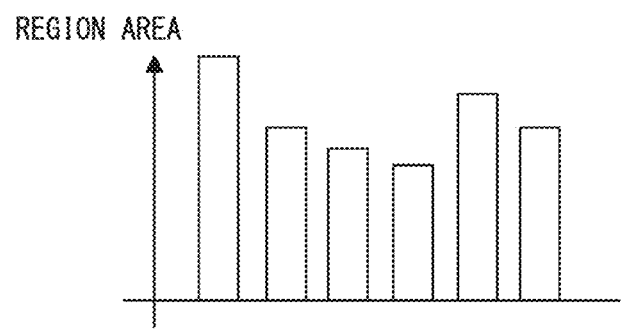
FIG. 15A is a diagram describing another method of the process of providing a distribution signal by the peak coordinates distribution-scheduling unit included in the image-processing device of the first embodiment of the present invention.
Figure 15B:
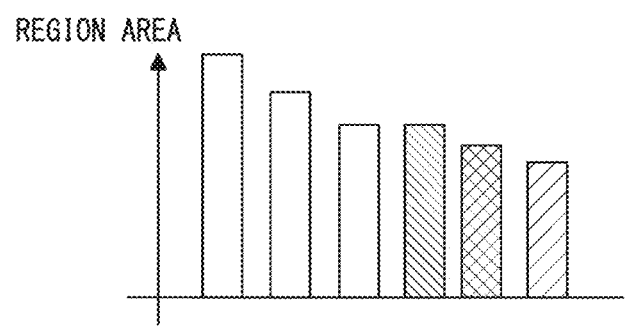
FIG. 15B is a diagram describing another method of the process of providing a distribution signal by the peak coordinates distribution-scheduling unit included in the image-processing device of the first embodiment of the present invention.
Figure 15C:
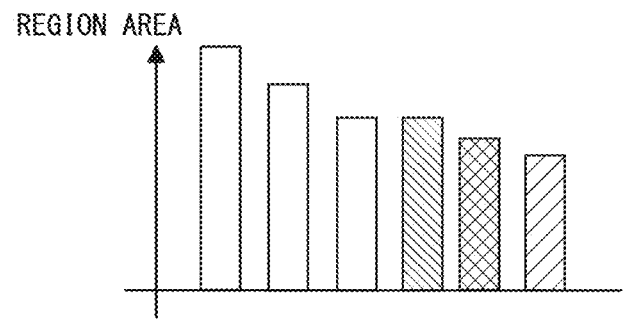
FIG. 15C is a diagram describing another method of the process of providing a distribution signal by the peak coordinates distribution-scheduling unit included in the image-processing device of the first embodiment of the present invention.

Here, operation of the peak coordinates distribution-scheduling unit 143 in this case will be described. FIGS. 15A to 15D are diagrams describing another method of the distribution signal-providing process of the peak coordinates distribution-scheduling unit 143 included in the image-processing device 1 of the first embodiment of the present invention. In FIGS. 15A to 15C, the horizontal axis represents the arrangement of peak pixels and the vertical axis represents the sizes of region area estimated in the peak coordinates as in FIGS. 9A to 9C. In addition, in FIG. 15D, the horizontal axis represents the region label generation units 16 and the vertical axis represents computational loads allocated to the region label generation units 16 using the sizes of region areas as in FIG. 9D. FIGS. 15A and 15B are identical to FIGS. 9A and 9B and thus detailed description thereof is omitted.

The example shown in FIG. 15C illustrates a case in which the distribution signal-providing unit 1433 allocates peak pixels rearranged by the sorting unit 1431 in an order such that an ascending order is repeated as the order of the region label generation units 16. More specifically, in the example illustrated in FIG. 15C, first to third peak coordinates are allocated to the region label generation units 16-0 to 16-2 in an ascending order and fourth to sixth peak coordinates are allocated to the region label generation units 16-0 to 16-2 in an ascending order. Accordingly, in the example illustrated in FIG. 15C, the first and fourth peak coordinates are allocated to the region label generation unit 16-0, the second and fifth peak coordinates are allocated to the region label generation unit 16-1, and the third and sixth peak coordinates are allocated to the region label generation unit 16-2.

Figure 15D:
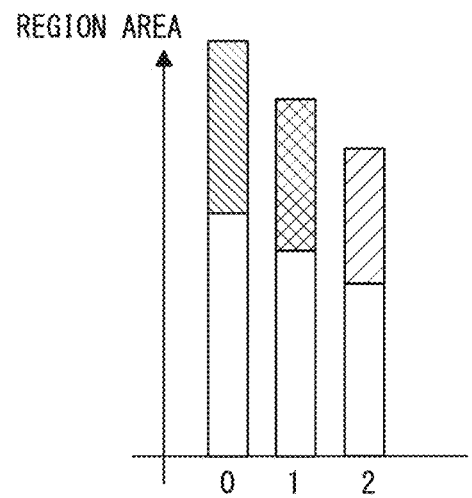
FIG. 15D is a diagram describing another method of the process of providing a distribution signal by the peak coordinates distribution-scheduling unit included in the image-processing device of the first embodiment of the present invention.

Also when the peak coordinates are allocated as illustrated in FIG. 15C, total sums of computational loads (region areas) of the region label generation units 16 are approximately equalized. In FIG. 15D, the computational loads of the region label generation units 16-0 to 16-2 in a case where peak coordinates are allocated as in the example illustrated in FIG. 15C are represented using the sizes of region areas. Here, as can be understood from a comparison of the example illustrated in FIG. 15D with the example illustrated in FIG. 9D, the total sum of the computational loads (region areas) in the example illustrated in FIG. 9D is better equalized than in the example illustrated in FIG. 15D. However, the processing procedure for apportionment as illustrated in FIG. 15C is simpler than the processing procedure for apportionment as illustrated in FIG. 9C (refer to FIG. 10).

(Second Modified Example of First Embodiment)

In addition, for example, the peak coordinates distribution-scheduling unit 143 may change (correct) allocation of peak coordinates on the basis of the sum (total sum) of region areas simply estimated for the peak coordinates allocated to the region label generation units 16 after the distribution signals are provided. In this case, the distribution signal-providing unit 1433 included in the peak coordinates distribution-scheduling unit 143 changes allocation of the peak coordinates on the basis of differences in the total sums of region areas allocated to the region label generation units 16.

Figure 16A:
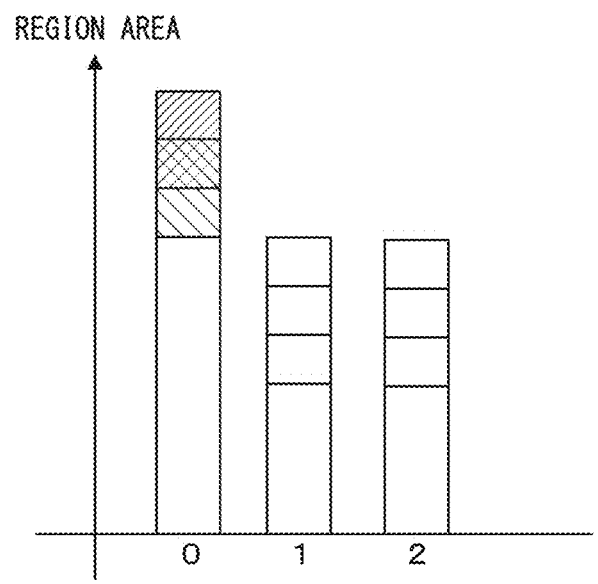
FIG. 16A is a diagram describing yet another method of the process of providing a distribution signal by the peak coordinates distribution-scheduling unit included in the image-processing device of the first embodiment of the present invention.
Figure 16B:
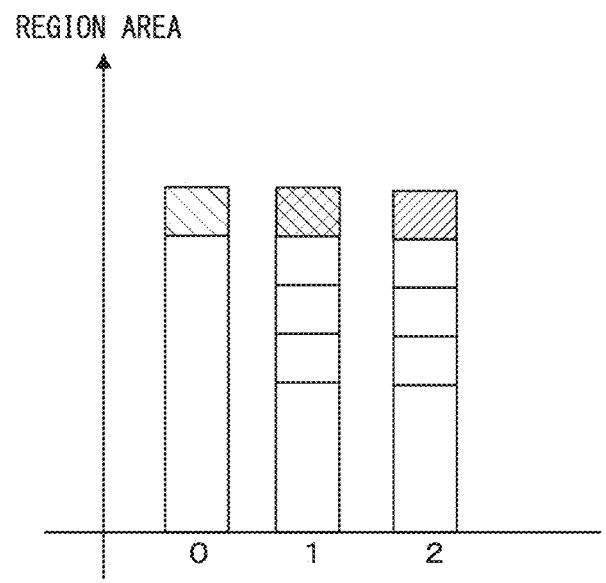
FIG. 16B is a diagram describing yet another method of the process of providing a distribution signal by the peak coordinates distribution-scheduling unit included in the image-processing device of the first embodiment of the present invention.

An example in this case will be described. FIGS. 16A and 16B are diagrams describing yet another method of the distribution signal-providing process of the peak coordinates distribution-scheduling unit 143 included in the image-processing device 1 of the first embodiment of the present invention. In FIGS. 16A and 16B, the horizontal axis represents the region label generation units 16 and the vertical axis represents computational loads allocated to the region label generation units 16 using the sizes of region areas as in FIGS. 9D and 15D. In addition, FIG. 16A illustrates a state before allocation of peak coordinates is changed (corrected) and FIG. 16B illustrates a state after allocation of peak coordinates is changed (corrected).

As illustrated in FIG. 16A, a case in which a total sum of region areas estimated for peak coordinates allocated to a specific region label generation unit 16 (region label generation unit 16-0 in FIG. 16A) is greater than total sums of region areas estimated for peak coordinates allocated to other region label generation units 16 (region label generation units 16-1 and 16-2 in FIG. 16A) may be conceived. In this case, the distribution signal-providing unit 1433 divides a difference between the total sums of region areas by the number of region label generation units 16. Then, the distribution signal-providing unit 1433 changes (corrects) distribution signals provided to peak coordinates corresponding to a region area which is the division result such that the peak coordinates are re-allocated to the region label generation units 16 other than the region label generation unit 16 having the large total sum of region areas.

FIG. 16B illustrates an example of a case in which peak coordinates allocated to the region label generation unit 16-0 having the largest total sum of region areas are re-allocated to the region label generation units 16-1 and 16-2 having smaller total sums of region areas. In this manner, the peak coordinates distribution-scheduling unit 143 changes (corrects) allocation of peak coordinates to the region label generation units 16 after distribution signals are provided to better equalize the total sums of region areas estimated for the peak coordinates allocated to the region label generation units 16, as illustrated in FIG. 16B, and thus it is possible to operate the region label generation units 16 more efficiently.

According to the second modified example of the first embodiment, the image-processing device 1 includes the peak coordinates distribution-scheduling unit 143 which divides a difference between the largest total sum of region areas and the smallest total sum of region areas among total sums of region areas allocated to the region label generation units 16 by the number of region label generation units 16, and re-allocates peak pixels corresponding to a region area which is the division result to the region label generation units 16 other than the region label generation unit 16 having the largest total sum of region areas.

(Third Modified Example of the First Embodiment)

With respect to the image-processing device 1 of the first embodiment, the method of simply estimating, by the peak coordinates distribution signal generation unit 14, region areas using a reciprocal of a peak density represented by the number of peak pixels located within a threshold region (unit area) set by a threshold value of a predetermined distance, as illustrated in FIG. 6, has been described. However the method of estimating region areas by the peak coordinates distribution signal generation unit 14 is not limited to the method illustrated in FIG. 6, that is, the processing procedure illustrated in FIG. 7. For example, the region area estimation unit 141 in the peak coordinates distribution signal generation unit 14 may perform simple estimation of region areas in a discrete manner by comparing the number of peak pixels located within a threshold region (unit area) with a predetermined any number of threshold values. That is, the region area estimation unit 141 may estimate region areas such that the region areas are separated into each of predetermined ranges.

Figure 17:
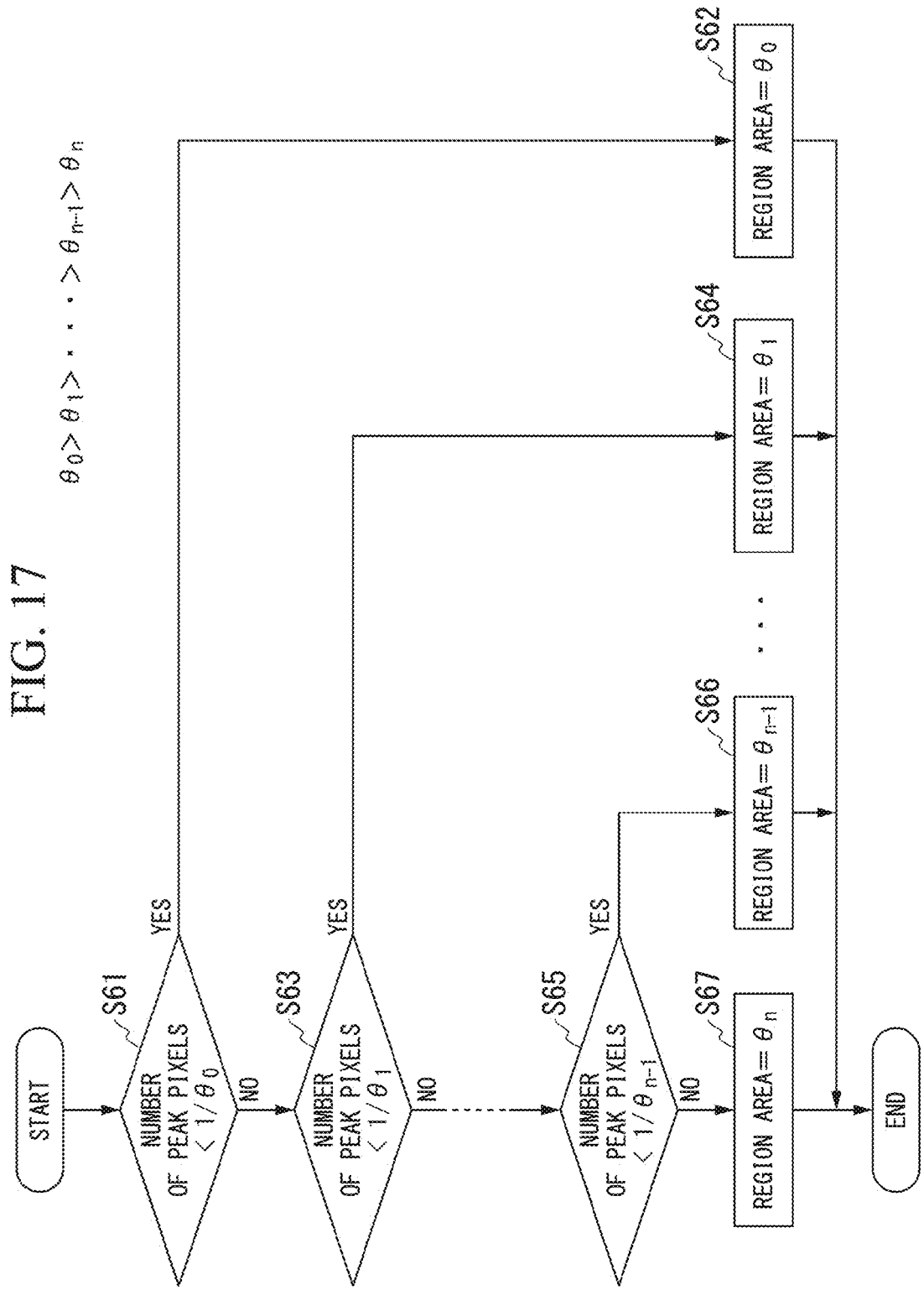
FIG. 17 is a flowchart illustrating another processing procedure in the region area estimation unit included in the image-processing device of the first embodiment of the present invention.

A processing procedure in this case will be described. FIG. 17 is a flowchart illustrating another processing procedure in the region area estimation unit 141 included in the image-processing device 1 of the first embodiment of the present invention. In the region area estimation process in the region area estimation unit 141 illustrated in FIG. 17, a plurality of region areas θ (referred to as "estimated region areas θ" hereinafter) are set in a discrete manner using predetermined threshold values of region areas. The region area estimation unit 141 estimates a region area belonging to each peak pixel as any one of the estimated region areas θ by comparing the number of peak pixels located within a threshold region with the number of peaks represented using reciprocals of the estimated region areas θ. In the following description, a case in which n estimated region areas θ (estimated region areas $\theta_0$ to $\theta_n$, $\theta_n > \theta_n$) are set and a region area is estimated as any one of the estimated region areas θ after completion of detection of the number of peak pixels located within the threshold region through the processing procedure illustrated in FIG. 7, for example, will be described.

When detection of the number of peak pixels located within the threshold region is completed, the region area estimation unit 141 determines whether the detected number of peak pixels is less than a reciprocal of the estimated region area $\theta_0$ (the number of peaks corresponding to the estimated region area $\theta_0$) (step S61). When it is determined that the detected number of peak pixels is less than the number of peaks corresponding to the estimated region area $\theta_0$ in step S61 ("YES" in step S61), the region area estimation unit 141 estimates that region areas are equivalent to the estimated region area $\theta_0$ in step S62. That is, the region area estimation unit 141 estimates that region areas smaller than the estimated region area $\theta_0$ are equivalent to the estimated region area $\theta_0$ in step S61 and step S62. Then, the region area estimation unit 141 correlates information on the estimated region areas (=estimated region area $\theta_0$) with each set of peak coordinates located within the threshold region, stores the correlated information in the region area storage unit 142, and ends the region area estimation process.

On the other hand, when it is determined that the detected number of peak pixels is not less than the number of peaks corresponding to the estimated region area $\theta_0$, that is, the detected number of peak pixels is equal to or greater than the number of peaks corresponding to the estimated region area $\theta_0$ in step S61 ("NO" in step S61), the region area estimation unit 141 proceeds to the process of step S63.

Subsequently, the region area estimation unit 141 determines whether the detected number of peak pixels is less than a reciprocal of the estimated region area $\theta_1$ (the number of peaks corresponding to the estimated region area $\theta_1$) (step S63). When it is determined that the detected number of peak pixels is less than the number of peaks corresponding to the estimated region area $\theta_1$ in step S63 ("YES" in step S63), the region area estimation unit 14 estimates that region areas are equivalent to the estimated region area $\theta_1$ in step S64. That is, the region area estimation unit 141 estimates that region areas in a range equal to or less than the estimated region area $\theta_0$ and greater than the estimated region area $\theta_1$ are equivalent to the estimated region area $\theta_1$ in step S63 and step S64. Then, the region area estimation unit 141 correlates information on the estimated region areas (=estimated region area $\theta_1$) with each set of peak coordinates located within the threshold region, stores the correlated information in the region area storage unit 142, and ends the region area estimation process.

On the other hand, when it is determined that the detected number of peak pixels is not less than the number of peaks corresponding to the estimated region area $\theta_1$, that is, the detected number of peak pixels is equal to or greater than the number of peaks corresponding to the estimated region area $\theta_1$ in step S63 ("NO" in step S63), the region area estimation unit 141 estimates proceeds to the process of step S65.

In the same manner, the region area estimation unit 141 compares the detected number of peak pixels with reciprocals of the estimated region areas $\theta_2$ to $\theta_{n-2}$ (the numbers of peaks corresponding to the estimated region areas $\theta_2$ to $\theta_{n-2}$).

Subsequently, the region area estimation unit 141 determines whether the detected number of peak pixels is less than a reciprocal of the estimated region area $\theta_{n-1}$ (the number of peaks corresponding to the estimated region area $\theta_{n-1}$) (step S65). When it is determined that the detected number of peak pixels is less than the number of peaks corresponding to the estimated region area $\theta_{n-1}$ in step S65 ("YES" in step S65), the region area estimation unit 141 estimates that region areas are equivalent to the estimated region area $\theta_{n-1}$ in step S66. That is, the region area estimation unit 141 estimates that region areas in a range equal to or less than the estimated region area $\theta_{n-2}$ and greater than the estimated region area $\theta_{n-1}$ are equivalent to the estimated region area $\theta_{n-1}$ in step S65 and step S66. Then, the region area estimation unit 141 correlates information on the estimated region areas (=estimated region area $\theta_{n-1}$) with each set of peak coordinates located within the threshold region, stores the correlated information in the region area storage unit 142, and ends the region area estimation process.

On the other hand, when it is determined that the detected number of peak pixels is not less than the number of peaks corresponding to the estimated region area $\theta_{n-1}$, that is, the detected number of peak pixels is equal to or greater than the number of peaks corresponding to the estimated region area $\theta_{n-1}$ in step S65 ("NO" in step S65), the region area estimation unit 141 estimates that region areas are equivalent to the estimated region area $\theta_n$ in step S67. That is, the region area estimation unit 141 estimates that region areas equal to or greater than the estimated region area $\theta_{n-1}$ are equivalent to the estimated region area $\theta_n$ in step S65 and step S67. Then, the region area estimation unit 141 correlates information on the estimated region areas (=estimated region area $\theta_n$) with each set of peak coordinates located within the threshold region, stores the correlated information in the region area storage 142, and ends the region area estimation process.

In this manner, the region area estimation unit 141 can separate region areas into each of predetermined ranges and simply estimate the region area by setting the reciprocals of the predetermined estimated areas $\theta$ (the numbers of peaks corresponding to the estimated region areas $\theta$) as threshold values and comparing the threshold values with the detected number of peak pixels. Accordingly, the peak coordinates distribution-scheduling unit 143 can allocate peak coordinates to the region label generation units 16 on the basis of peak coordinates correlated with the information on region areas (=estimated region areas $\theta$) stored in the region area storage unit 142 such that total sums of loads of computations executed by the region label generation units 16 are approximately equalized.

According to the third modified example of the first embodiment, the image-processing device 1 includes the region area estimation unit 141 which estimates a region area corresponding to each peak pixel as any one of the estimated region areas $\theta$ predetermined on the basis of the number of other peak pixels located in a region within a predetermined range from a peak pixel set as a center and the number of peak pixels indicated by threshold value (estimated region areas $\theta$) of a plurality of predetermined region areas.

(Fourth Modified Example of First Embodiment)

In the image-processing device 1 of the first embodiment, as illustrated in FIG. 9 or 15, the configuration in which the peak coordinates distribution signal generation unit 14 rearranges (sorts) peak coordinates in a predetermined order by the sorting unit 1431 included in the peak coordinates distribution-scheduling unit 143 in the peak coordinates distribution signal generation unit 14, and the distribution signal-providing unit 1433 allocates the peak coordinates to the region label generation units 16 in the order has been described. However the configuration in which the peak coordinates distribution signal generation unit 14 allocates the peak coordinates to the region label generation units 16 is not limited to the configuration illustrated in FIG. 5 that is, the configuration for performing the processes illustrated in FIGS. 9, 10 and 15. For example, the configuration may be a configuration for realizing the same function as the sorting unit 1431 included in the peak coordinates distribution-scheduling unit 143 in the peak coordinates distribution signal generation unit 14 using the configuration of the region area storage unit 142 included in the peak coordinates distribution signal generation unit 14.

More specifically, the storage region (memory space) of the region area storage unit 142 may be configured as a configuration in which the storage region is discretely divided for each of corresponding region areas. In addition, the configuration may be a configuration in which, when the region area estimation unit 141 included in the peak coordinates distribution signal generation unit 14 correlates information on an estimated region area with each set of peak coordinates and stores the information in the region area storage unit 142, the region area estimation unit 141 statically stores the information in a memory space of the corresponding region area to realize the same function as the sorting unit 1431. That is, it is possible to employ a configuration in which the same function as the sorting unit 1431 is realized according to address control when the region area estimation unit 141 correlates information on an estimated region area with each set of peak coordinates and stores the information in the region area storage unit 142.

Figure 18:
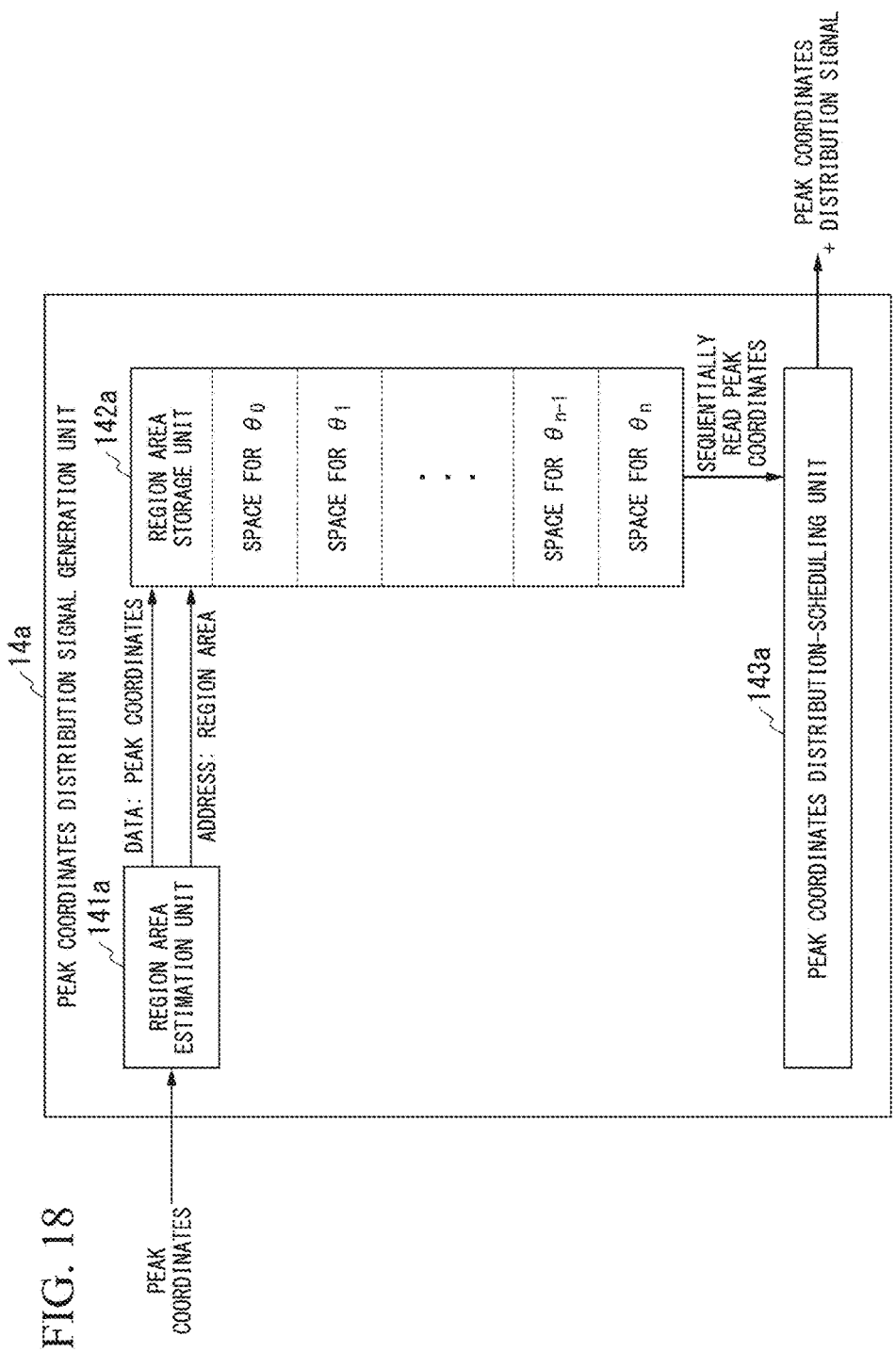
FIG. 18 is a block diagram illustrating another configuration of the peak coordinates distribution signal generation unit included in the image-processing device of the first embodiment of the present invention.

The configuration of the peak coordinates distribution signal generation unit 14 in this case will be described. FIG. 18 is a block diagram illustrating another configuration of the peak coordinates distribution signal generation unit 14 included in the image-processing device 1 of the first embodiment of the present invention. The peak coordinates distribution signal generation unit 141a illustrated in FIG. 18 includes a region area estimation unit 141a, a region area storage unit 142a, and a peak coordinates distribution-scheduling unit 143a.

The region area estimation unit 141a simply estimates region areas of surrounding pixels belonging to each peak pixel included in a luminance image on the basis of each set of peak coordinates stored in the peak coordinates storage unit 13 like the region area estimation unit 141. Then, the region area estimation unit 141a sets information on the estimated region areas of the surrounding pixels belonging to each peak pixel as addresses of the region area storage unit 142a, sets the peak coordinates of each peak pixel as data to be stored in the region area storage unit 142a, and outputs the information and the peak coordinates to the region area storage unit 142a.

The region area storage unit 142a stores the peak coordinates of each peak pixel output from the region area estimation unit 141a in a memory space corresponding to a region area designated as an address. FIG. 18 illustrates the region area storage unit 142a having a configuration in which the memory space of the region area storage unit 142a is divided into n memory spaces (spaces for estimated region areas $\theta_0$ to $\theta_n$) corresponding to predetermined n estimated region areas $\theta$ (estimated region areas $\theta_0$ to $\theta_n$, $\theta_0 > \theta_n$).

The peak coordinates distribution-scheduling unit 143a sequentially reads the peak coordinates of peak pixels stored in the memory spaces of the region area storage unit 142a in a predetermined order and allocates computation for each of the read peak pixels to the region label generation units 16. Here, the order of reading the peak coordinates of the peak pixels by the peak coordinates distribution-scheduling unit 143a realizes the same function as the sorting unit 1431 included in the peak coordinates distribution-scheduling unit 143.

For example, when the function of the sorting unit 1431 is a function of rearranging (sorting) region areas belonging to peak pixels in the order of larger sizes of the region areas, the peak coordinates distribution-scheduling unit 143a reads the peak coordinates of the peak pixels in an order from the memory space (space for the estimated region area $\theta_0$) corresponding to the estimated region area $\theta_0$ having the largest region area. Accordingly, the peak coordinates distribution-scheduling unit 143a can read the peak coordinates of the peak pixels in the order of larger sizes of the region areas belonging to the peak pixels, that is, in the same order as that in a state in which the region areas are rearranged (sorted) in an ascending order.

On the other hand, the peak coordinates distribution-scheduling unit 143a can read the peak coordinates of the peak pixels in the order of decreasing size of region areas, that is, a descending order by reading the peak coordinates of the peak pixels from the memory space (space for the estimated region area $\theta_n$) corresponding to the estimated region area $\theta_n$ having the smallest region area.

Then, the peak coordinates distribution-scheduling unit 143a provides distribution signals to the read peak coordinates such that the total sums of loads of computations executed by the region label generation units 16 are approximately equalized, and outputs the peak coordinates provided with the distribution signals to the peak coordinates distribution unit 15, like the peak coordinates distribution-scheduling unit 143.

In the configuration of the peak coordinates distribution signal generation unit 14a illustrated in FIG. 18, the peak coordinates distribution-scheduling unit 143a realizes the same function as the sorting unit 1431 according to the order of reading peak coordinates of peak pixels from the region area storage unit 142a, as described above. Accordingly, the peak coordinates distribution-scheduling unit 143a may not include the components of the sorting unit 1431 and the sorted peak coordinates storage unit 1432 included in the peak coordinates distribution-scheduling unit 143 illustrated in FIG. 8.

According to the fourth modified example of the first embodiment, the image-processing device 1 includes: the region area estimation unit (region area storage unit 142a) which rearranged estimate peak pixels in a predetermined order when estimating region areas corresponding to peak pixels; and the peak coordinates distribution-scheduling unit (peak coordinates distribution-scheduling unit 143a) which allocates the rearranged peak pixels to the region label generation units 16 in a predetermined order.

According to this configuration and operation, in the image-processing device 1 of the first embodiment, the peak coordinates of peak pixels which are targets on which computational will be executed are allocated to the region label generation units 16 such that the computational loads of the region label generation units 16 are approximately equalized. Accordingly, it is possible to efficiently operate the region label generation units 16 while minimizing occurrence of idle region label generation units 16. Therefore, a total processing time required for the region division process in the image-processing device 1 can be reduced.

Second Embodiment

Next, an image-processing device of a second embodiment of the present invention will be described. For example, the image-processing device of the second embodiment (referred to as "image-processing device 2" hereinafter) divides regions of a luminance image such as a grayscale image into a plurality of regions and performs computations of a region division process in parallel using a plurality of computation resources like the image-processing device 1 of the first embodiment. Further, the concept of the region division process performed by the image-processing device 2 of the second embodiment is also equivalent to the concept of the region division process in the image-processing device 1 of the first embodiment illustrated in FIG. 1. Accordingly, detailed description of the concept of the region division process performed by the image-processing device 2 of the second embodiment is omitted.

Figure 19:
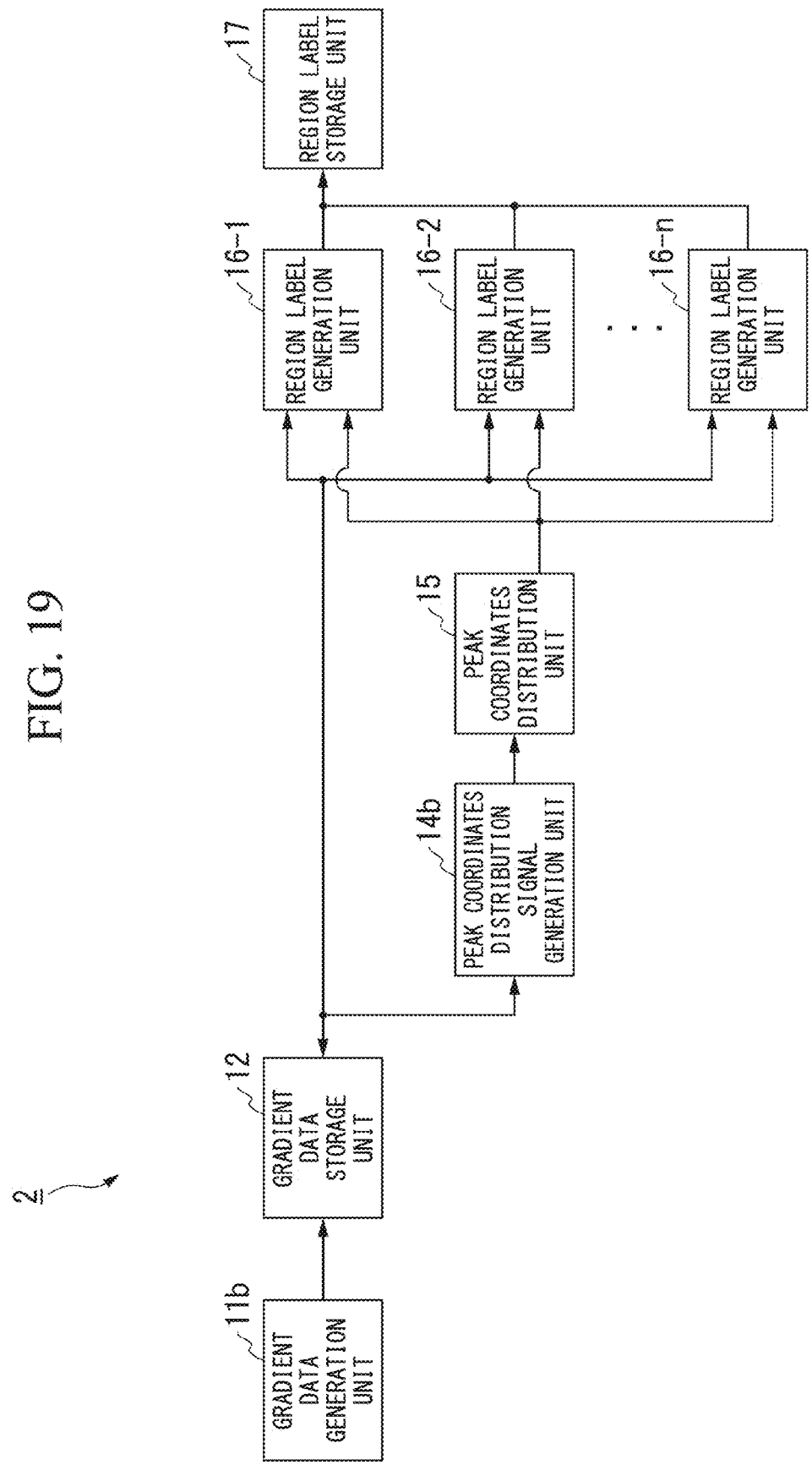
FIG. 19 is a block diagram illustrating an example of a schematic configuration of an image-processing device in a second embodiment of the present invention.

Next, the configuration of the image-processing device 2 will be described FIG. 19 is a block diagram illustrating an example of a schematic configuration of the image-processing device 2 in the second embodiment of the present invention. The image-processing device 2 illustrated in FIG. 19 includes a gradient data generation unit 11b, a gradient data storage unit 12, a peak coordinates distribution signal generation unit 14b, a peak coordinates distribution unit 15, n region label generation units 16-1 to 16-n, and a region label storage unit 17.

The components of the image-processing device 2 in the second embodiment include the same components as the image-processing device 1 of the first embodiment. Accordingly, in the components of the image-processing device 2 in the second embodiment, components the same as in the image-processing device 1 of the first embodiment are provided with the same signs and detailed description of each of such components is omitted.

The gradient data generation unit 11b generates gradient data corresponding to an input luminance image and outputs the generated gradient data to the gradient data storage unit 12, like the gradient data generation unit 11 included in the image-processing device 1 of the first embodiment. However, the gradient data generation unit 11b does not output peak coordinates which were output by the gradient data generation unit 11 included in the image-processing device 1 of the first embodiment. Other operations of the gradient data generation unit 11b are identical to the gradient data generation unit 11 of the first embodiment and thus detailed description of the operations of the gradient data generation unit 11b is omitted.

The peak coordinates distribution signal generation unit 14b distributes computations for providing region labels to surrounding pixels belonging to the same peak pixel in the luminance to respective computation resources included in the image-processing device 2 on the basis of peak labels provided to peak pixels included in gradient data stored in the gradient data storage unit 12. Then, the peak coordinates distribution signal generation unit 14b outputs information about distribution of the computations to the computation resources to the peak coordinates distribution unit 15, like the peak coordinates distribution signal generation unit 14 included in the image-processing device 1 of the first embodiment.

More specifically, the peak coordinates distribution signal generation unit 14b detects the position of a peak pixel provided with a peak label from gradient data read from the gradient data storage unit 12. Then, the peak coordinates distribution signal generation unit 14b sets the coordinates which indicate the detected position of the peak pixel as peak coordinates, and simply estimates region areas of surrounding pixels belonging to each peak pixel from the number of other peak pixels which are provided with the peak label and located within a predetermined unit area having the detected position of the peak pixel as a center on the basis of the peak coordinates. In addition, the peak coordinates distribution signal generation unit 14b allocates computation resources which will execute computations for the respective peak pixels on the basis of the estimated region areas and outputs peak coordinates provided with distribution signals indicating the allocated computation resources to the peak coordinates distribution unit 15, like the peak coordinates distribution signal generation unit 14 included in the image-processing device 1 of the first embodiment.

The configuration of the peak coordinates distribution signal generation unit 14b is equivalent to the configuration of the peak coordinates distribution signal generation unit 14 included in the image-processing device 1 of the first embodiment illustrated in FIG. 5. However, the operation of the region area estimation unit 141 (referred to as "region area estimation unit 141b" hereinafter) included in the peak coordinates distribution signal generation unit 14b differs from the region area estimation unit 141 included in the peak coordinates distribution signal generation unit 14 of the first embodiment. The operation of the region area estimation unit 141b will be described in detail below.

According to the aforementioned configuration, the image-processing device 2 performs the region division process for generating region label data in which a region label identical to the peak label is provided to surrounding pixels belonging to the same peak pixel in parallel using a plurality of computation resources, like the image-processing device 1 of the first embodiment.

Figure 20:
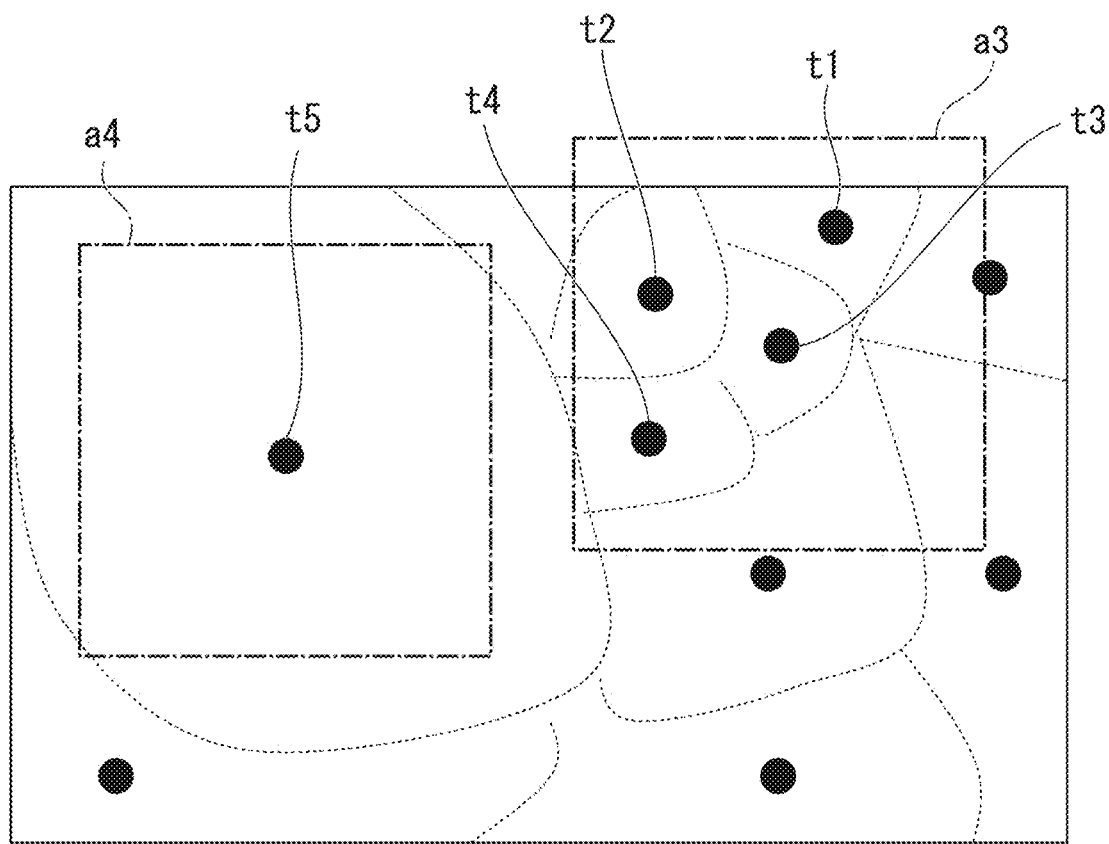
FIG. 20 is a diagram describing the concept of a region area estimation process performed in a region area estimation unit included in the image-processing device of the second embodiment of the present invention.

Next, the peak coordinates distribution signal generation unit 14b included in the image-processing device 2 will be described. Here, the region area estimation unit 141b included in the peak coordinates distribution signal generation unit 14b will be described. FIG. 20 is a diagram describing the concept of a region area estimation process performed in the region area estimation unit 141b included in the image-processing device 2 of the second embodiment of the present invention. In FIG. 20, the position of each peak pixel included in a luminance image is indicated by a black circle, and the boundary of a final region area when each region label generation unit 16 included in the image-processing device 2 performs the region division process is schematically indicated by dotted line as in the concept of the region area estimation process in the region area estimation unit 141 included in the image-processing device 1 of the first embodiment illustrated in FIG. 6.

In the region area estimation process performed by the region area estimation unit 141b, a region area belonging to a peak pixel is simply estimated using the number of other peak pixels which are located within a predetermined unit area having the peak pixel as a center and provided with a peak label, that is, the density (peak density) of peak pixels located within the unit area.

In FIG. 20, the region (referred to as "threshold region" hereinafter) of the predetermined unit area is indicated by an alternate long and short dash line. As can be understood from the threshold region illustrated in FIG. 20, the predetermined unit area in the region area estimation unit 141b is a rectangular region because the unit area is not set depending on a threshold value of a distance as in the region area estimation unit 141 included in the peak coordinates distribution signal generation unit 14 of the first embodiment.

Further, FIG. 20 also illustrates a case in which there are three other peak pixels (peak t1, peak pixel t2 and peak pixel t4) within a threshold region a3 having a peak pixel t3 as a center, and there are no other peak pixels within a threshold region a4 having a peak pixel t5 as a center as in the first embodiment. This also represent that the peak density of the threshold region a3 is quadruple the peak density of the threshold region a4 as in the first embodiment. The idea of region area estimation in the region area estimation unit 141b in this case is identical to the idea of region area estimation in the region area estimation unit 141 included in the image-processing device 1 of the first embodiment. Accordingly, detailed description of the idea of region area estimation in the region area estimation unit 141b is omitted.

FIG. 21 is a flowchart illustrating a processing procedure in the region area estimation unit 141b included in the image-processing device 2 of the second embodiment of the present invention. In the region area estimation process in the region area estimation unit 141b, the region area estimation unit 141b reads gradient data stored in the gradient data storage unit 12 in the raster order for each pixel and checks peak labels provided to the read gradient data to detect a peak pixel. Then, the region area estimation unit 141b sets the detected peak pixel as a target peak pixel and determines whether there are other peak pixels with a rectangular threshold region.

The method of the region area estimation process in the region area estimation unit 141b requires less computational load then the method of performing the region area estimation process by determining whether there are other peak pixels within a threshold region on the basis of a distance between two peak pixels in the region area estimation unit 141 included in the image-processing device 1 of the first embodiment when the number of pieces of gradient data present with a rectangular threshold region, that is, the number of pixels of a luminance image is less than the total number of peak pixels.

More specifically, when the total number of peak pixels included in gradient data is "n" and the number of pieces of gradient data present within a rectangular threshold region is "m," the computation quantity of the region area estimation process in the region area estimation unit 141b is n×m. On the other hand, the computation quantity of the region area estimation process in the region area estimation unit 141 included in the image-processing device 1 of the first embodiment is $n^2$. Accordingly, when the total number n of peak pixels included in the gradient data is greater than the number m of pieces of gradient data present within the rectangular threshold region, the computation quantity of the region area estimation process performed by the region area estimation unit 141b becomes less than the computation quantity of the region area estimation process performed by the region area estimation unit 141 included in the image-processing device 1 of the first embodiment.

Hereinafter, a processing procedure of the region area estimation unit 141b illustrated in FIG. 21 will be described on the assumption that the number of peak pixels provided with a peak label is "3" and the second peak pixel is present within a threshold region having the first peak pixel as a center in gradient data stored in the gradient data storage unit 12. In addition, a case in which the peak pixel t3 illustrated in FIG. 20 is the first peak pixel, the peak pixel t4 is the second peak pixel and the peak pixel t5 is the third peak pixels will be described as an example of peak pixels. Further, description will be given on the assumption that a peak label having a value of "8" is provided to gradient data corresponding to the peak pixel t3, a peak label having a value of "9" is provided to gradient data corresponding to the peak pixel t4, and a peak label having a value of "10" is provided to gradient data corresponding to the peak pixel t5.

When the region area estimate process is initiated, first, the region area estimation unit 141b initializes the value of peak density corresponding to each peak pixel to "1" (step S71). Subsequently, the region area estimation unit 141b reads gradient data stored in the gradient data storage unit 12 in the raster order from the pixel disposed at the left top in the loop of step S72.

Subsequently, the region area estimation unit 141b determines whether a peak label has been provided to the currently read gradient data (step S73). More specifically, the region area estimation unit 141b acquires the value of the label provided to the currently read gradient data and determines whether the acquired value of the label is a value indicating a peak (peak label) or a value indicating a gradient toward a peak distribution-scheduling (gradient label). That is, the region area estimation unit 141b determines whether the read gradient data is gradient data of a peak pixel or gradient data of a surrounding pixel.

When it is determined that the peak label has not been provided to the currently read gradient data, that is, the currently read gradient data is gradient data of a surrounding pixel in step S71 ("NO" in step S72), the region area estimation unit 141b returns to step S72 and performs determination for the next gradient data.

On the other hand, when it is determined that the peak label has been provided to the currently read gradient data, that is, the currently read gradient data is gradient data of a peak pixel in step S71 ("YES" in step S72), the region area estimation unit 141b sets the peak pixel corresponding to the currently read gradient data s a target peak pixel and reads gradient data within a rectangular threshold region having the target peak pixel as a center (step S74). In addition, the region area estimation unit 141b sets the coordinates which indicate the position of the peak pixel corresponding to the currently read gradient data as peak coordinates.

For example, when it is determined that the peak label has been provided to gradient data corresponding to the first peak pixel t3, the region area estimation unit 141b sets the first peak pixel t3 as a target peak pixel and reads gradient data within the threshold region a3. In addition, the region area estimation unit 141b sets the coordinates which indicate the position of the first peak pixel t3 as peak coordinates of the first peak pixel t3.

Subsequently, the region area estimation unit 141b calculates (counts) the number of peak labels provided to the gradient data within the rectangular threshold region (step S75). More specifically, the region area estimation unit 141b acquires the value of a label provided to read gradient data and determines whether the acquired value of the label is a value of a peak label or a value of a gradient label. Then, the region area estimation unit 141b counts the number of times values of labels are determined to be the value of the peak label.

For example, in the process of step S75, the value of the label (here, "9") provided to the gradient data corresponding to the second peak pixel t4 included in the threshold region a3 having the first peak pixel t3 as a center is determined to be the value of the peak label, and "1" is added to the counter value of the peak label. Accordingly, the counter value of the peak label becomes "1+1"="2."

Subsequently, the region area estimation unit 141b stores the counted number of peak labels in a peak density [t] corresponding to the target peak pixel (step S76). Here, the index t in the peak density [t] is an index for identifying currently read gradient data corresponding to a target peak pixel. As the index t, for example, the value of the peak label provided to the target peak pixel is used.

For example, the value (="8") of the peak label provided to the first peak pixel t3 is set as the index t and the counter value (="2") of the peak label is stored in the peak density [8] corresponding to the first peak pixel t3. This represents that there are two peak pixels including the peak pixel t3 within the threshold region a3 having the first peak pixel t3 as a center.

Thereafter, the region area estimation unit 141b returns to step S72 and performs determination for the next gradient data.

In this manner, the region area estimation unit 141b sequentially reads gradient data stored in the gradient data storage unit 12 in the raster order in the loop of step S72, and when gradient data of a peak pixel is detected, counts the number of other peak pixels present within a rectangular threshold region having the position of the peak pixel as a center to acquire a peak density. Accordingly, the region area estimation unit 141b can acquire as many peak densities as the number of peak pixel stored in the gradient data storage unit 12.

For example, the region area estimation unit 141b can obtain the peak density corresponding to the first peak pixel t3, [8]="2", the peak density corresponding to the second peak pixel t4, [9]="2", and the peak density corresponding to the third peak pixel t5, [10]"1". In addition, the region area estimation unit 141b sets the coordinates which indicate the positions of the first, second and third peak pixels t3, t4 and t5 as peak coordinates.

Accordingly, the region area estimation unit 141b can simply estimate region areas which belong to the peak pixel corresponding to the peak coordinate stored in the gradient data storage unit 12 using the reciprocals of the obtained peak densities, like the region area estimation unit 141 included in the image-processing device 1 of the first embodiment. In addition, the region area estimation unit 141b correlates information on the estimated region areas (the reciprocals of the peak densities) with the peak coordinates and stores the information correlated with the peak coordinates in the region area storage unit 142, like the region area estimation unit 141 included in the image-processing device 1 of the first embodiment.

The peak coordinates distribution-scheduling unit 143 reads the peak coordinates correlated with the information on the region areas (the reciprocals of the peak densities) stored in the region area storage unit 142, provides distribution signals to the read peak coordinates such that the total sums of loads of computations executed by the region label generation units 16 are approximately equalized, and outputs the peak coordinates provided with the distribution signals to the peak coordinates distribution unit 15.

In this manner, in the image-processing device 2 of the second embodiment, the peak coordinates distribution signal generation unit 14b provides distribution signals representing allocation of the region label generation units 16 in advance to peak coordinates of peak pixels which are targets on which computation will be executed such that the total sums of computational loads of the region label generation units 16 are approximately equalized, as in the image-processing device 1 of the first embodiment. At this time, in the image-processing device 2 of the second embodiment, when the region area estimation unit 141*b* included in the peak coordinates distribution signal generation unit 14*b* obtains peak densities corresponding to peak pixels in order to estimate region areas, the region area estimation unit 141*b* counts the number of other peak pixels present within a rectangular threshold region having a peak pixel detected from gradient data as a center. Accordingly, in the image-processing device 2 of the second embodiment, computation costs necessary to estimate region areas become lower than those in the image-processing device of the first embodiment, and thus a total processing time of region division processes in the image-processing device 2 can be reduced when the number m of pieces of gradient data present within the rectangular threshold region is less than the total number n of peak pixels included in gradient data.

A case in which a predetermined unit area for which the region area estimation unit 141*b* counts the number of peak pixels to obtain peak densities is a rectangular region (rectangular threshold region) having a peak pixel (target peak pixel) as a center in the image-processing device 2 of the second embodiment has been described. However, the shape of the unit area is not limited to a rectangular region. For example, the shape of the unit area may be a shape such as a circular or diamond shape in addition to a rectangular shape if a peak pixel (target peak pixel) is set as a center.

Third Embodiment

Next, an image-processing device of a third embodiment of the present invention will be described. For example, the image-processing device (referred to as "image-processing device 3" hereinafter) of the third embodiment divides a region of a luminance image such as a grayscale image into a plurality of regions and performs computations of a region division process in parallel using a plurality of computation resources like the image-processing device 1 of the first embodiment and the image-processing device 2 of the second embodiment. Further, the concept of the region division process performed by the image-processing device 3 of the third embodiment is also identical to the concept of the region division process performed by the image-processing device 1 of the first embodiment illustrated in FIG. 1. Accordingly, detailed description of the concept of the region division process performed by the image-processing device 3 of the third embodiment is omitted.

The configuration of the image-processing device 3 has a peak coordinates distribution signal generation unit different from the peak coordinates distribution signal generation unit 14 included in the image-processing device 1 of the first embodiment illustrated in FIG. 2 or the peak coordinates distribution signal generation unit 14*b* included in the image-processing device 2 of the second embodiment illustrated in FIG. 19. Accordingly, in the following description, the peak coordinates distribution signal generation unit 14 included in the image-processing device 3 is referred to as "peak coordinates distribution signal generation unit 14*c*," and other components are represented by the same signals as those of the corresponding components of the image-processing device 1 of the first embodiment and detailed description is omitted.

The peak coordinate distribution signal generation unit 14*c* distributes computations for providing region labels to surrounding pixels belonging to the same peak pixel in a luminance image to computation resources included in the image-processing device 2 on the basis of peak coordinates stored in the peak coordinates storage unit 13, like the peak coordinates distribution signal generation unit 14 included in the image-processing device 1 of the first embodiment. In addition, the peak coordinates distribution signal generation unit 14*c* outputs information about distribution of computations to the computation resources to the peak coordinates distribution unit 15 like the peak coordinates distribution signal generation unit 14 included in the image-processing device 1 of the first embodiment.

Next, the configuration of the peak coordinates distribution signal generation unit 14*c* will be described. FIG. 22 is a block diagram illustrating the configuration of the peak coordinates distribution signal generation unit 14*c* included in the image-processing device 3 of the third embodiment of the present invention. The peak coordinates distribution signal generation unit 14*c* illustrated in FIG. 22 includes a region area estimation unit 141 and a peak coordinates distribution-scheduling unit 143*c*.

The region area estimation unit 141 is identical to the region area estimation unit 141 in the peak coordinates distribution signal generation unit 14 included in the image-processing device 1 of the first embodiment. However, the region area estimation unit 141 in the peak coordinates distribution signal generation unit 14*c* included in the image-processing device 3 correlates information about simply estimated region areas (reciprocals of peak densities) with peak and sequentially outputs the peak coordinates correlated with the information to the peak coordinates distribution-scheduling unit 143*c*.

The peak coordinates distribution-scheduling unit 143*c* sequentially distributes the peak coordinates correlated with the information about the region areas (reciprocals of peak densities) sequentially output from the region area estimation unit 141 to the region label generation units 16. At this time, the peak coordinates distribution-scheduling unit 143*c* provides distribution signals to the peak coordinates sequentially output from the region area estimation unit 141 and outputs the peak coordinates provided with the distribution signals to the peak coordinates distribution unit 15 such that the peak coordinates are allocated to a region label generation unit 16 having a smallest computation load.

Figure 23A:
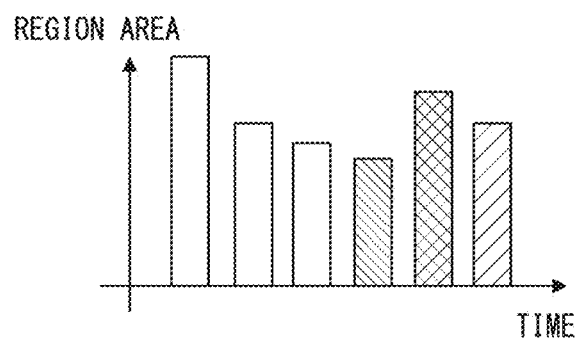
FIG. 23A is a diagram describing the concept of a process of providing a distribution signal by the peak coordinates distribution-scheduling unit included in the image-processing device of the third embodiment of the present invention.

Next, the operation of the peak coordinates distribution-scheduling unit 143*c* will be described. FIGS. 23A to 23D are diagrams describing the concept of a distribution signal-providing process of the peak coordinates distribution-scheduling unit 143*c* included in the image-processing device 3 of the third present invention of the present invention. In FIG. 23A, the horizontal axis represents the order of outputting peak coordinates and the vertical axis represents the sizes of estimated region areas in the peak coordinates. In addition, in FIGS. 23B to 23D, the horizontal axis represents region label generation units 16 and the vertical axis represents computational loads allocated to the region label generation units 16 using the sizes of region areas. FIG. 23 illustrates an example of the concept of the distribution signal-providing process performed by the peak coordinates distribution-scheduling unit 143*c* when the image-processing device 3 includes three region label generation units 16 (region label generation units 16-0 to 16-2).

Figure 23B:
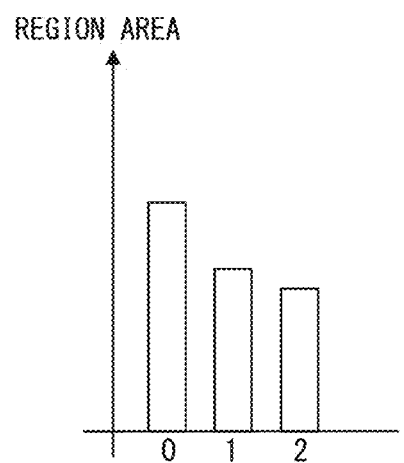
FIG. 23B is a diagram describing the concept of a process of providing a distribution signal by the peak coordinates distribution-scheduling unit included in the image-processing device of the third embodiment of the present invention.

Peak coordinates correlated with information on region areas (reciprocals of peak densities) are sequentially (time-serially) input to the peak coordinates distribution-scheduling unit 143*c* from the region area estimation unit 141, as illustrated in FIG. 23A. The peak coordinates distribution-scheduling unit 143*c* sequentially allocates the input peak coordinates to the region label generation units 16. FIG. 23B illustrates a state in which the first to third peak coordinates input from the region area estimation unit 141 are sequentially allocated to the region label generation units 16-0 to 16-2. More specifically, FIG. 23B illustrates a state in which the first peak coordinate is allocated to the region label generation unit 16-0, the second peak coordinate is allocated to the region label generation unit 16-1, and the third peak coordinate is allocated to the region label generation unit 16-2.

Figure 23C:
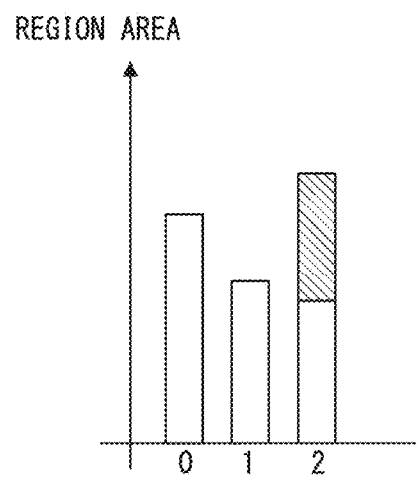
FIG. 23C is a diagram describing the concept of a process of providing a distribution signal by the peak coordinates distribution-scheduling unit included in the image-processing device of the third embodiment of the present invention.

Subsequently, when the peak coordinates distribution-scheduling unit 143c allocates the fourth and the following peak coordinates to any one of the region label generation units 16-0 to 16-2, the peak coordinates distribution-scheduling unit 143c allocates the peak coordinates sequentially input from the region area estimation unit 141 to the region label generation unit 16 having the smallest computational load at that time. FIG. 23C illustrates a state in which the fourth peak coordinate input from the region area estimation unit 141 is allocated to the region label generation unit 16-2 having the smallest computational load in the previous state (refer to FIG. 23B).

Figure 23D:
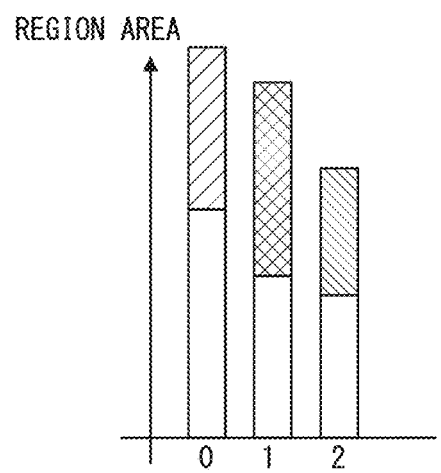
FIG. 23D is a diagram describing the concept of a process of providing a distribution signal by the peak coordinates distribution-scheduling unit included in the image-processing device of the third embodiment of the present invention.

In this manner, the peak coordinates distribution-scheduling unit 143c sequentially allocates the peak coordinates sequentially input from the region area estimation unit 141 to the region label generation units 16 having the smallest computational load. Accordingly, the total sums of the computational loads (region areas) of the region label generation units 16 included in the image-processing device 3 are approximately equalized as illustrated in FIG. 23D.

Figure 24:
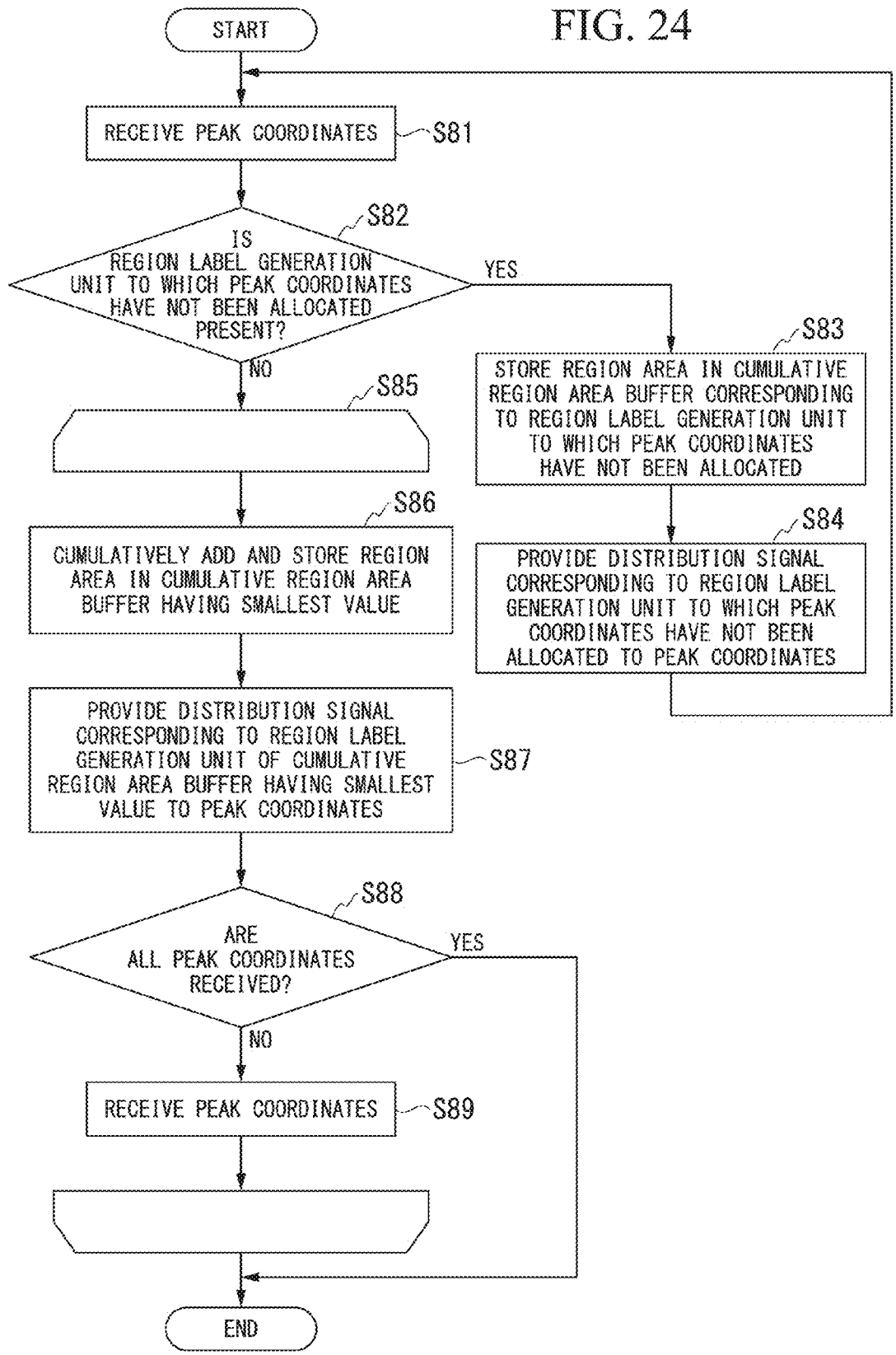
FIG. 24 is a flowchart illustrating a processing procedure in the peak coordinates distribution-scheduling unit included in the image-processing device of the third embodiment of the present invention.

Here, the distribution signal-providing process in the peak coordinates distribution-scheduling unit 143c will be described. FIG. 24 is a flowchart illustrating a processing procedure in the peak coordinates distribution-scheduling unit 143c included in the image-processing device 3 of the third embodiment of the present invention. A description will be given below on the assumption that the image-processing device 3 includes the three region label generation units 16 of region label generation units 16-0 to 16-2 with reference to FIG. 23.

The peak coordinates distribution-scheduling unit 143c acquires the first peak coordinate correlated with information on a region area (reciprocal of peak density) (step S81). The peak coordinates distribution-scheduling unit 143c determines whether there is a region label generation unit 16 to which peak coordinates have not been allocated (step S82).

In the image-processing device 3, a cumulative region area buffer which is a storage region for storing a total sum of computational loads, that is, region areas allocated to each region label generation unit 16 is installed corresponding to each region label generation unit 16 included in the image-processing device 3. Accordingly, the determination of step S82 is performed on the basis of the total sum of region areas stored in the cumulative region area buffer corresponding to each region label generation unit 16.

More specifically, the peak coordinates distribution-scheduling unit 143c determines that there is a region label generation unit 16 to which peak coordinates have not been allocated when the total sum of region areas stored in a cumulative region area buffer corresponding to any region label generation unit 16 is "0." In addition, the peak coordinates distribution-scheduling unit 143c determines that there is no region label generation unit 16 to which peak coordinates have not been allocated when the total sum of region areas stored in a cumulative region area buffer corresponding to any region label generation unit 16 is not "0."

When it is determined that there is a region label generation unit 16 to which peak coordinates have not been allocated in step S82 ("YES" in step S82), the peak coordinates distribution-scheduling unit 143c stores the value of the size of a region area belonging to a peak pixel corresponding to received peak coordinates, that is, a reciprocal of a peak density, in a cumulative region area buffer corresponding to the region label generation unit 16 to which peak coordinates have not been allocated (step S83). In the example illustrated in FIG. 23B, first, the value of the size of the region area belonging to the peak pixel corresponding to the first peak coordinate is stored in a cumulative region area buffer [0] corresponding to the region label generation unit 16-0. In FIGS. 23B to 23D, the region areas representing the sizes of computational loads indicated on the vertical axis correspond to the total sums of region areas stored in cumulative region area buffers.

Subsequently, the peak coordinates distribution-scheduling unit 143c provides a distribution signal (here, a distribution signal of "0") representing the region label generation unit 16 to which peak coordinates have not been allocated to the received peak coordinates and outputs the peak coordinates provided with the distribution signal to the peak coordinates distribution unit 15 (step S84).

Then, the peak coordinates distribution-scheduling unit 143c returns to step S81 and repeats the process of steps S81 to S84. Accordingly, the first to third peak coordinates are sequentially allocated to the region label generation units 16-0 to 16-2 included in the image-processing device 3 as illustrated in FIG. 23B. In this case, for example, the value of the size of the region area belonging to the peak pixel corresponding to the second peak coordinate is stored in a cumulative region area buffer [1] corresponding to the region label generation unit 16-1. In addition, for example, the value of the size of the region area belonging to the peak pixel corresponding to the third peak coordinate is stored in a cumulative region area buffer [2] corresponding to the region label generation unit 16-2.

On the other hand, when the next peak coordinates correlated to information on a region area (reciprocal of peak density) are received in step S81 and it is determined that there is no region label generation unit 16 to which peak coordinates have not been allocated in step S82 ("NO" in step S82), the peak coordinates distribution-scheduling unit 143c performs the distribution signal-providing process represented by the loop of step S85.

In the loop of step S85, the cumulative region area buffers corresponding to the region label generation units 16 included in the image-processing device 3 are checked and a region label generation unit 16 having the smallest total sum of region areas, that is, the smallest computational load is detected. Then, the peak coordinates distribution-scheduling unit 143c adds the value of the size of a region area belonging to a peak pixel corresponding to received peak coordinates to the cumulative region area buffer corresponding to the region label generation unit 16 having the smallest total sum of region areas and store the value therein (step S86). Here, for example, the fourth peak coordinate correlated to information on a region area (reciprocal of peak density) is received and the process of the loop of step S85 is performed to add the value of the size of the region area belonging to the peak pixel corresponding to the fourth peak coordinate to the cumulative region area buffer [2] corresponding to the region label generation unit 16-2 and store the value therein, as illustrated in FIG. 23C.

Subsequently, the peak coordinates distribution-scheduling unit 143c provides a distribution signal (here, a distribution signal of "2") representing the region label generation unit 16 having the smallest total sum of region areas to received peak coordinates and outputs the peak coordinate provided with the distribution signal to the peak coordinates distribution unit 15 (step S87).

Then, the peak coordinates distribution-scheduling unit 143c determines whether all peak coordinates correlated with information on region areas (reciprocals of peak densities) have been received from the region area estimation unit 141 (step S88).

When it is determined that all peak coordinates have not been received from the region area estimation unit 141 in step S88 ("NO"), the peak coordinates distribution-scheduling unit 143c receives the next peak coordinates correlated with information on a region area (reciprocal of peak density) in step S89 and repeats the loop process of step S85.

Here, for example, a case in which the peak coordinates distribution-scheduling unit 143c performs the process of the loop of step S85 by receiving the fifth peak coordinate correlated with information on a region area (reciprocal of peak density) and performs the process of the loop of step S85 by receiving the sixth peak coordinate correlated with information on a region area (reciprocal of peak density) in step S89 may be conceived. In this case, in the process of the loop of step S85 for the fifth peak coordinate, the peak coordinates distribution-scheduling unit 143c adds the value of the size of the region area belonging to the peak pixel corresponding to the fifth peak coordinate to the cumulative region area buffer [1] corresponding to the region label generation unit 16-1 and stores the value therein, as illustrated in FIG. 23D, in step S86. Then, the peak coordinates distribution-scheduling unit 143c, provides a distribution signal indicating the region label generation unit 16-1 to the received fifth peak coordinate and outputs the fifth peak coordinate provided with the distribution signal to the peak coordinates distribution unit 15 in step S87. In addition, in the process of the loop of step S85 for the sixth peak coordinate, the peak coordinates distribution-scheduling unit 143c adds the value of the size of the region area belonging to the peak pixel corresponding to the sixth peak coordinate to the cumulative region area buffer [0] corresponding to the region label generation unit 16-0 and stores the value therein, as illustrated in FIG. 23D, in step S86. Then, the peak coordinates distribution-scheduling unit 143c provides a distribution signal indicating the region label generation unit 16-0 to the received sixth peak coordinate and outputs the sixth peak coordinate provided with the distribution signal to the peak coordinates distribution unit 15 in step S87.

On the other hand, when it is determined that all peak coordinates have been received from the region area estimation unit 141 in step S88 ("YES" in step S88), the peak coordinates distribution-scheduling unit 143c finishes the process of the loop of step S85 and ends the distribution signal-providing process.

According to the aforementioned configuration and operation, when a larger number of peak coordinates than the number of region label generation units 16 included in the image-processing device 3 are received from the region area estimation unit 141, the peak coordinates distribution-scheduling unit 143c allocates each of the input peak coordinates to a region label generation unit 16 having the smallest computational load at that time. Accordingly, when the peak coordinates distribution-scheduling unit 143c allocates peak coordinates correlated with information on region areas (reciprocals of peak densities) input from the region area estimation unit 141 to the region label generation units 16, the peak coordinates distribution-scheduling unit 143c can distribute the peak coordinates such that the total sums of loads of computations executed by the region label generation units 16 are approximately equalized, and output the peak coordinates provided with distribution signals to the peak coordinates distribution unit 15.

According to the third embodiment, an image-processing device (image-processing device 3) includes a peak coordinates distribution-scheduling unit (peak coordinates distribution-scheduling unit 143c) which sequentially allocates peak pixels to a region label generation unit (region label generation unit 16) to which a peak pixel has not been allocated, and when there is no region label generation unit 16 to which a peak pixel has not been allocated, sequentially allocates peak pixels to a region label generation unit 16 having a smallest total sum of allocated region areas.

In this manner, the peak coordinates distribution signal generation unit 14c provides distribution signals indicating allocation of the region label generation units 16 in advance to peak coordinates of peak pixels which are targets on which computation will be executed such that the total sums of computational loads of the region label generation units 16 are approximately equalized in the image-processing device 3 of the third embodiment like the image-processing device 1 of the first embodiment. In this case, in the image-processing device 3 of the third embodiment, the peak coordinates distribution-scheduling unit 143c included in the peak coordinates distribution signal generation unit 14c sequentially allocates peak coordinates sequentially input from the region area estimation unit 141 to a region label generation unit 16 having the smallest computational load at that time. That is, the image-processing device 3 of the third embodiment does not perform the process of rearranging (sorting) peak coordinates in a predetermined order performed by the peak coordinates distribution-scheduling unit 143 in the peak coordinates distribution signal generation unit 14 included in the image-processing device 1 of the first embodiment. Accordingly, in the image-processing device 3 of the third embodiment, processes up to the process of distributing peak coordinates to the region label generation units 16 can be performed through a pipeline process in a unit smaller than a frame of a luminance image. Accordingly, in the image-processing device 3 of the third embodiment, a delay amount in the processes from the process of generating gradient data by the gradient data generation unit 11 to the process of distributing peak coordinates to the region label generation units 16 can be reduced, that is, throughput can be quickened, and a total processing time of the region division process in the image-processing device 3 can be reduced.

In the image-processing device 3 of the third embodiment, the configuration and operation of the peak coordinates distribution signal generation unit 14c instead of the peak coordinates distribution signal generation unit 14 included in the image-processing device 1 of the first embodiment illustrated in FIG. 2 has been described. However, the peak coordinates distribution signal generation unit 14c may be a component instead of the peak coordinates distribution signal generation unit 14b included in the image-processing device 2 of the second embodiment illustrated in FIG. 19, as described above. However, even in the image-processing device 3 including the peak coordinates distribution signal generation unit 14c having the configuration included in the image-processing device 2 of the second embodiment illustrated in FIG. 19, the configuration and operation of the peak coordinates distribution signal generation unit 14c can be considered to be the same as the above-described configuration and operation and thus detailed description thereof is omitted.

As described above, according to each embodiment of the present invention, gradient data is generated on the basis of an input luminance image and the area of a region (region area) of surrounding pixels belonging to each peak pixel is simply estimated on the basis of peak coordinates indicating the positions of peak pixels included in the generated gradient data. In addition, in each embodiment of the present invention, computations for peak pixels are distributed to a plurality of computation resources which perform a region division process in parallel on the basis of the estimated region area. Accordingly, in each embodiment of the present invention, it is possible to suppress generation of an idle computation resource and to efficiently operate each computation resource when the region division process is performed using the plurality of computation resources in parallel. Therefore, in each embodiment of the present invention, a total processing time necessary for the region division process in the image-processing device 1 can be reduced.

Configurations of image-processing devices including different components are illustrated in the embodiments of the present invention. However, the components of the embodiments are not exclusive, and any one of the components illustrated in the embodiments may be included in an image-processing device of each embodiment.

In addition, although several methods (distribution signal-providing processes) for allocating peak coordinates to the region label generation units 16 by the peak coordinates distribution-scheduling unit 143 and the peak coordinates distribution-scheduling unit 143c have been described in each embodiment of the present invention, the methods for allocating peak coordinates to the region label generation units 16 are not limited to the method illustrated in each embodiment.

Furthermore, although a case in which the position of a pixel is represented using coordinates such as peak coordinates has been described in each embodiment of the present invention, information representing the position of a pixel is not limited to coordinates as illustrated in each embodiment.

Although the embodiments of the present invention have been described above with reference to the attached drawings specific configurations are not limited to such embodiments and include various modifications without departing from the spirit or scope of the present invention.

What is claimed is:

1. An image-processing device, comprising:
  a gradient data generation unit which sequentially targets pixels included in an input image, and on the basis of a luminance value of a target pixel and luminance values of other surrounding pixels located around the target pixel, generates gradient data in which a pixel included in the image is represented using a first label which is a value indicating a direction toward one of the surrounding pixels having a higher luminance value than the target pixel or a second label which is a value indicating that the luminance value of the target pixel is higher than all surrounding pixels located around the target pixel;
  a plurality of region label generation units which set pixels represented by the second label as peak pixels, divide a region within the image into regions including pixels belonging to the same peak pixel on the basis of peak coordinates indicating the positions of the peak pixels, and generate region label data in which pixels included in a divided region are represented by a third label which is a value indicating that the pixels belong to the same peak pixel; and
  a peak pixel distribution unit which distributes the peak pixels which are a target on which computation will be executed to each of the region label generation units such that loads of computations performed by the region label generation units to divide a region within the image into regions including pixels belonging to the same peak pixel are approximately equalized.

2. The image-processing device according to claim 1, wherein the peak pixel distribution unit comprises:
  a region area estimation unit which estimates region areas representing the sizes of regions of pixels belonging to a peak pixel set as a center on the basis of the number of other peak pixels located in a region within a predetermined range from the peak pixel set as a center for each of the peak pixels when the peak pixels are set as centers;
  a peak coordinates distribution-scheduling unit which allocates the peak pixels to the region label generation units on the basis of the region areas such that differences in the region areas corresponding to the peak pixels which are targets on which computation will be executed are minimized, and provides distribution signals indicating the allocated region label generation units to the peak coordinates corresponding to the peak pixels; and
  a peak coordinates distribution unit which outputs the peak coordinates to the region label generation units indicated by the distribution signals on the basis of the distribution signals provided to the peak coordinates.

3. The image-processing device according to claim 2, wherein, on the basis of the peak coordinates of the peak pixel set as a center and the peak coordinates of another peak pixel, the region area estimation unit calculates a distance between the two peak pixels, counts the number of other peak pixels located in a region within a range of a predetermined distance from the position of the peak pixel set as a center on the basis of the calculated distance between the two peak pixels, and estimates the region area corresponding to each of the peak pixels using a reciprocal of the counted number of other peak pixels.

4. The image-processing device according to claim 2, wherein, on the basis of the number of other peak pixels located in the region within the predetermined range from the peak pixel set as the center and the number of the peak pixels represented by threshold values of a plurality of predetermined region areas, the region area estimation unit estimates the region area corresponding to each of the peak pixels as any one of the threshold values of the plurality of predetermined region areas.

5. The image-processing device according to claim 4, wherein the region area estimation unit rearranges the peak pixels of which the corresponding region areas are estimated in a predetermined order when the region areas corresponding to the peak pixels are estimated, and
  the peak coordinates distribution-scheduling unit allocates the rearranged peak pixels to the region label generation units in a predetermined order.

6. The image-processing device according to claim 2, wherein the peak coordinates distribution-scheduling unit allocates the peak pixels to the region label generation units in a predetermined order.

7. The image-processing device according to claim 6, wherein the peak coordinates distribution-scheduling unit includes a sorting unit which rearranges the peak pixels in a predetermined order on the basis of the corresponding region areas, and the sorting unit allocates the peak pixels rearranged by the sorting unit to the region label generation units.

8. The image-processing device according to claim 6, wherein the peak coordinates distribution-scheduling unit allocates the peak pixels to the region label generation units such that the order of the plurality of region label generation units alternately repeats an ascending order and a descending order.

9. The image-processing device according to claim 6, wherein the peak coordinates distribution-scheduling unit divides a difference between a largest total sum of the region areas and a smallest total sum of the region areas among total sums of the region areas allocated to the region label generation unit by the number of the region label generation units, and allocates the peak pixels corresponding to the region areas of the division result to the region label generation units other than the region label generation unit having the largest total sum of the region areas.

10. The image-processing device according to claim 2, wherein the peak coordinates distribution-scheduling unit sequentially allocates the peak pixels to the region label generation units to which the peak pixels have not been allocated, and when there are no region label generation units to which the peak pixels have not been allocated, sequentially allocates the peak pixels to the region label generation unit having a smallest total sum of the allocated region areas.

11. The image-processing device according to claim 1, wherein each of the region label generation units comprises:
a gradient data acquisition unit which sets the peak pixel corresponding to the peak coordinates as a center and acquires the gradient data representing each of the pixels located around the peak pixel; and
a gradient determination unit which determines whether the value of the first label representing each of the pixels included in the acquired gradient data is a value indicating a direction toward the peak pixel, and generates the region label data in which the pixels represented using the first label of the value indicating a direction toward the peak pixel are expressed using the third label of the same value as the second label representing the peak pixel.

12. The image-processing device according to claim 11, wherein the gradient data acquisition unit sequentially sets each of the pixels determined to correspond to the first label of the value indicating a direction toward the peak pixel by the gradient determination unit as a center, and further acquires the gradient data representing each of the pixels located around the pixel set as a center, and
the gradient determination unit sequentially determines whether the value of the first label representing each of the pixels included in the further acquired gradient data is a value indicating a direction toward the pixel set as a center, and sequentially generates the region label data in which the pixels represented by the first label of the value indicating a direction toward the pixel set as a center are expressed by the third label of the same value as the third label representing the pixel set as a center.

13. The image-processing device according to claim 12, wherein the gradient data acquisition unit acquires the gradient data representing each of the pixels such that the region of each of the pixels sequentially set as centers is sequentially extended from the position of the peak coordinates corresponding to the peak pixel to the outer pixels, and
the gradient determination unit generates the region label data in which the region represented using the third label of the same value as the second label representing the peak pixel is sequentially extended from the position of the peak coordinates corresponding to the peak pixel to the outer pixels.

* * * * *